United States Patent [19]
Cronvich et al.

[11] Patent Number: 5,386,183
[45] Date of Patent: Jan. 31, 1995

[54] METHOD AND APPARATUS FOR SENSING A GROUND FAULT IN A MOTOR CONTROL SYSTEM

[75] Inventors: James T. Cronvich, Harahan, La.; Samir F. Farag, Roswell, Ga.; Daniel J. De Cicco, Glen Burnie, Md.; John J. Culligan, Alpharetta, Ga.

[73] Assignee: Siemens Energy & Automation, Inc., Alpharetta, Ga.

[21] Appl. No.: 183,106

[22] Filed: Jan. 18, 1994

Related U.S. Application Data

[63] Continuation of Ser. No. 714,282, Jun. 12, 1991, abandoned, which is a continuation-in-part of Ser. No. 462,934, Jan. 3, 1990, Pat. No. 5,206,572.

[51] Int. Cl.$^6$ .............................................. H02P 3/00
[52] U.S. Cl. ...................................... 318/434; 361/31
[58] Field of Search ................ 318/434, 432, 800–812; 361/23, 31, 85, 87, 30, 42–50, 93–97; 388/903

[56] References Cited

U.S. PATENT DOCUMENTS

| | | |
|---|---|---|
| 3,202,877 | 8/1965 | Perrault .......................... 361/31 X |
| 3,543,124 | 11/1970 | Espen et al. ...................... 361/31 X |
| 3,727,103 | 4/1973 | Finch et al. . |
| 3,809,960 | 7/1974 | Jossic . |
| 3,845,354 | 10/1974 | Boothman et al. . |
| 3,851,216 | 11/1974 | Clarke et al. ......................... 361/31 |
| 3,875,464 | 4/1975 | Gary et al. ........................... 361/31 |
| 3,890,494 | 6/1975 | Meshek et al. . |
| 3,919,600 | 11/1975 | Sons et al. ........................... 361/31 |
| 3,932,789 | 1/1976 | Sons et al. ......................... 361/31 X |
| 4,021,700 | 5/1977 | Ellis-Anwyl ......................... 361/24 |
| 4,057,842 | 11/1977 | Bauman et al. ....................... 361/93 |
| 4,096,539 | 6/1978 | Scaturro ............................. 361/93 |
| 4,099,107 | 7/1978 | Eder . |
| 4,286,303 | 8/1981 | Genheimer et al. . |
| 4,319,298 | 3/1982 | Davis et al. . |
| 4,345,288 | 8/1982 | Kampf et al. ...................... 361/85 X |
| 4,351,012 | 9/1982 | Elms et al. . |
| 4,377,836 | 3/1983 | Elms et al. ........................... 361/96 |
| 4,414,601 | 11/1983 | Conroy, Jr. ........................... 361/97 |
| 4,423,458 | 12/1983 | Stich . |
| 4,423,459 | 12/1983 | Stich et al. . |
| 4,434,390 | 2/1984 | Elms . |
| 4,446,498 | 5/1984 | Stich . |
| 4,453,117 | 6/1984 | Elms et al. . |
| 4,456,867 | 6/1984 | Mallick, Jr. et al. . |
| 4,456,871 | 6/1984 | Stich . |
| 4,467,260 | 8/1984 | Mallick, Jr. et al. . |
| 4,470,092 | 9/1984 | Lombardi . |

(List continued on next page.)

FOREIGN PATENT DOCUMENTS

| | | |
|---|---|---|
| 0057970 | 8/1982 | European Pat. Off. . |
| 2044486 | 10/1980 | United Kingdom . |
| 2066597 | 7/1981 | United Kingdom . |
| 2073973 | 10/1981 | United Kingdom . |

OTHER PUBLICATIONS

Kraus & Naimer Microelectronics; IPS 1100; 12 pages.
Startco Engineering Ltd.; MPU-16A; Jul., 1988, 6 pages.
Multilin Inc.; 139 Series Motor; Protection Relays, 8 pages.
Multilin Inc.; 169 Motor Management Relay; 94 pages.
Macrotek; Motor protection Plus; 19 pages.
European Standard Search Report; #EP 89 11 0603 (Aug. 9, 1989).
Westinghouse, IQ-2000 TM Document; 32 pages.
Gemstart Integrated Motor control Centre; General Electric Company; 1986; 8 pages.
IQ-1000 Motor Protection System User's Manual; Westinghouse; 32 pages.

Primary Examiner—Jonathan Wysocki

[57] ABSTRACT

A motor control unit for protecting a motor against ground fault currents. The unit monitors the currents in each phase of the motor to provide values representative of each phase current. The unit also includes a contactor for opening and closing each phase, wherein the unit controls the contactor based upon the values representative of the phase currents. The contactor is opened when a ground fault situation exists at the motor.

23 Claims, 33 Drawing Sheets

U.S. PATENT DOCUMENTS

| | | |
|---|---|---|
| 4,535,409 | 8/1985 | Jindrick et al. . |
| 4,539,618 | 9/1985 | Stich . |
| 4,544,982 | 10/1985 | Boothman et al. . |
| 4,547,826 | 10/1985 | Premerlani . |
| 4,571,659 | 2/1986 | Demeyer et al. ............... 361/97 X |
| 4,578,758 | 3/1986 | Muller . |
| 4,581,569 | 4/1986 | Fujioka et al. . |
| 4,608,619 | 8/1986 | Bomer et al. . |
| 4,647,825 | 3/1987 | Proflo et al. .................... 318/430 X |
| 4,672,501 | 6/1987 | Bilac et al. ............................. 361/96 |
| 4,689,710 | 8/1987 | Anzai .................................... 361/93 |
| 4,695,961 | 9/1987 | Arinobu ................................ 364/483 |
| 4,743,818 | 5/1988 | Quayle et al. . |
| 4,757,242 | 7/1988 | Prather ................................... 361/24 |
| 4,819,125 | 4/1989 | Arinobu et al. ....................... 361/93 |
| 4,891,743 | 1/1990 | May et al. . |
| 4,979,069 | 12/1990 | Simpson ................................. 361/31 |
| 4,996,646 | 2/1991 | Farrington . |
| 5,086,366 | 2/1992 | Ishii et al. ............................. 361/94 |
| 5,086,367 | 2/1992 | Ishii et al. ............................. 361/94 |

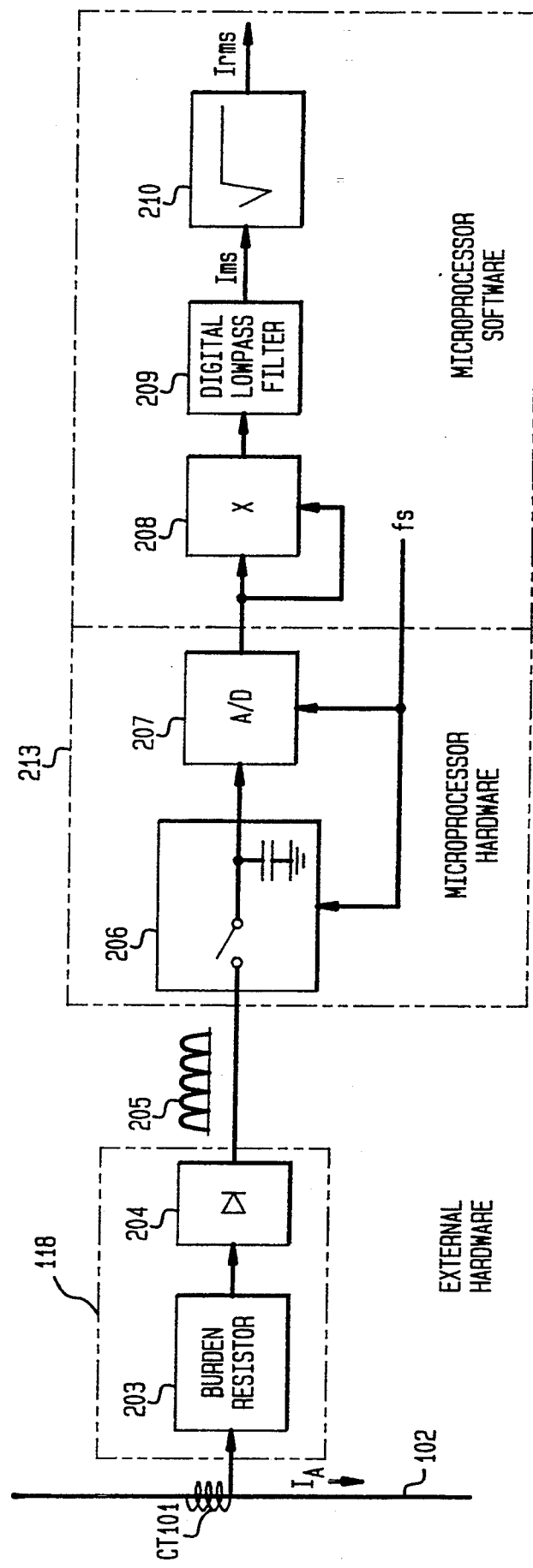

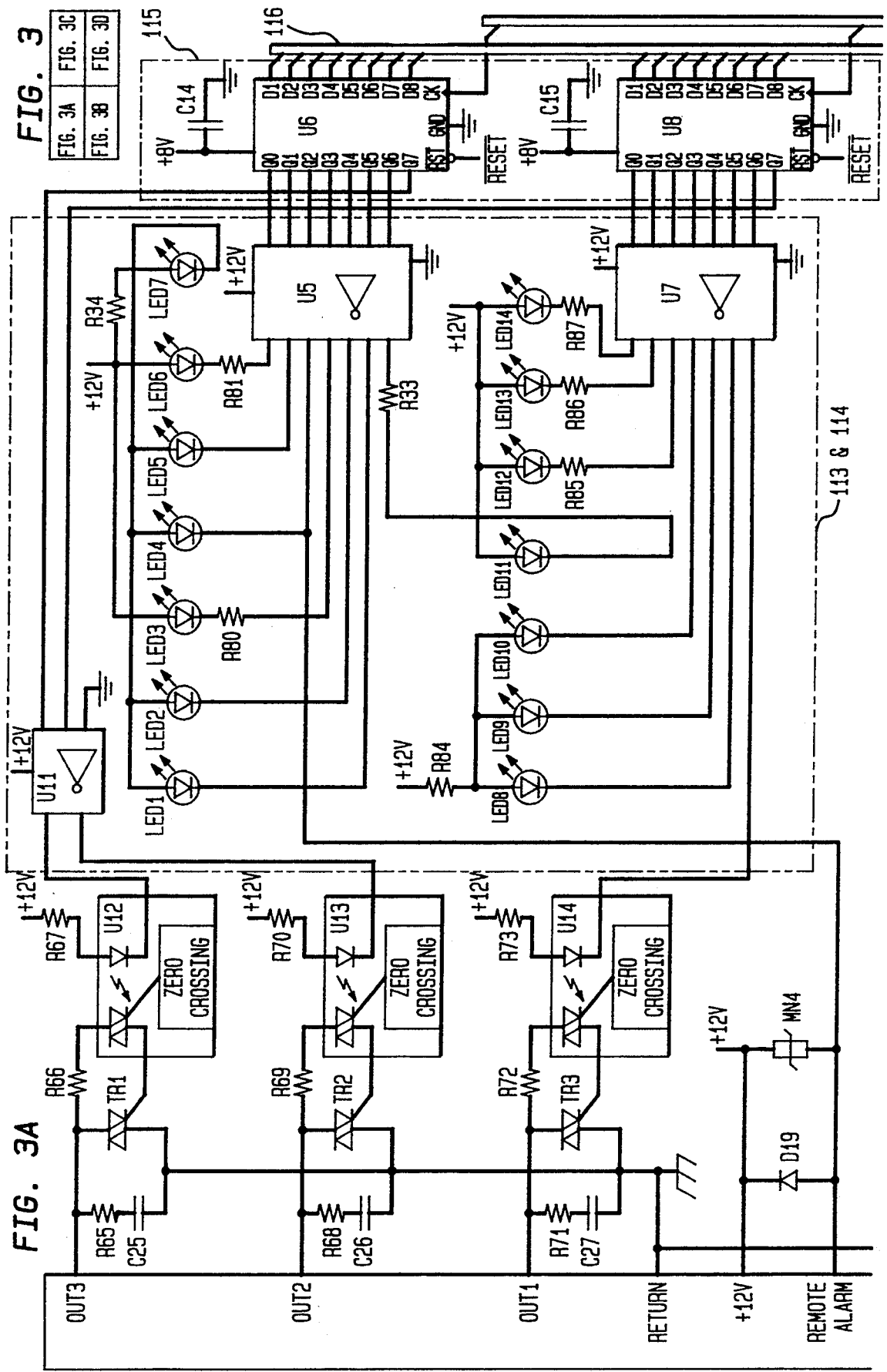

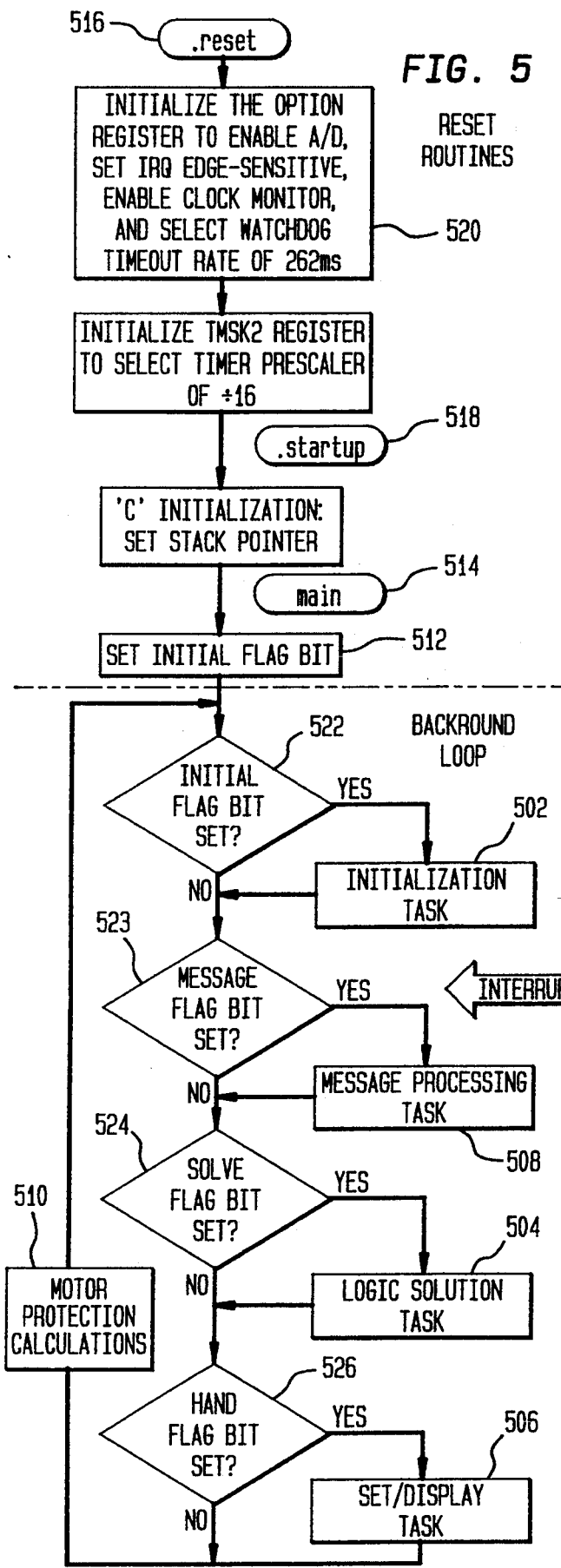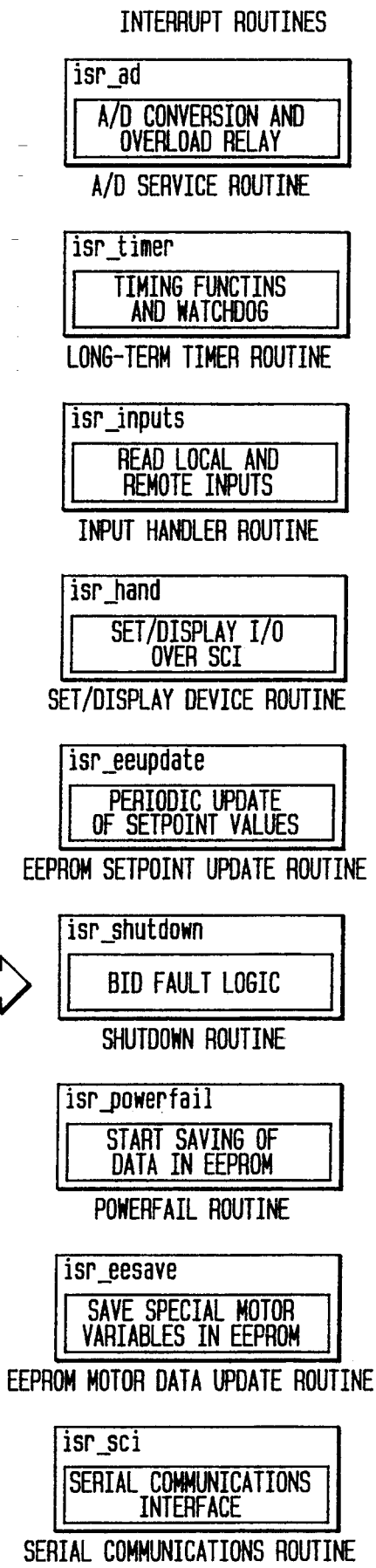
FIG. 5

MESSAGE PROCESSING TASK

LOGIC SOLUTION TASK

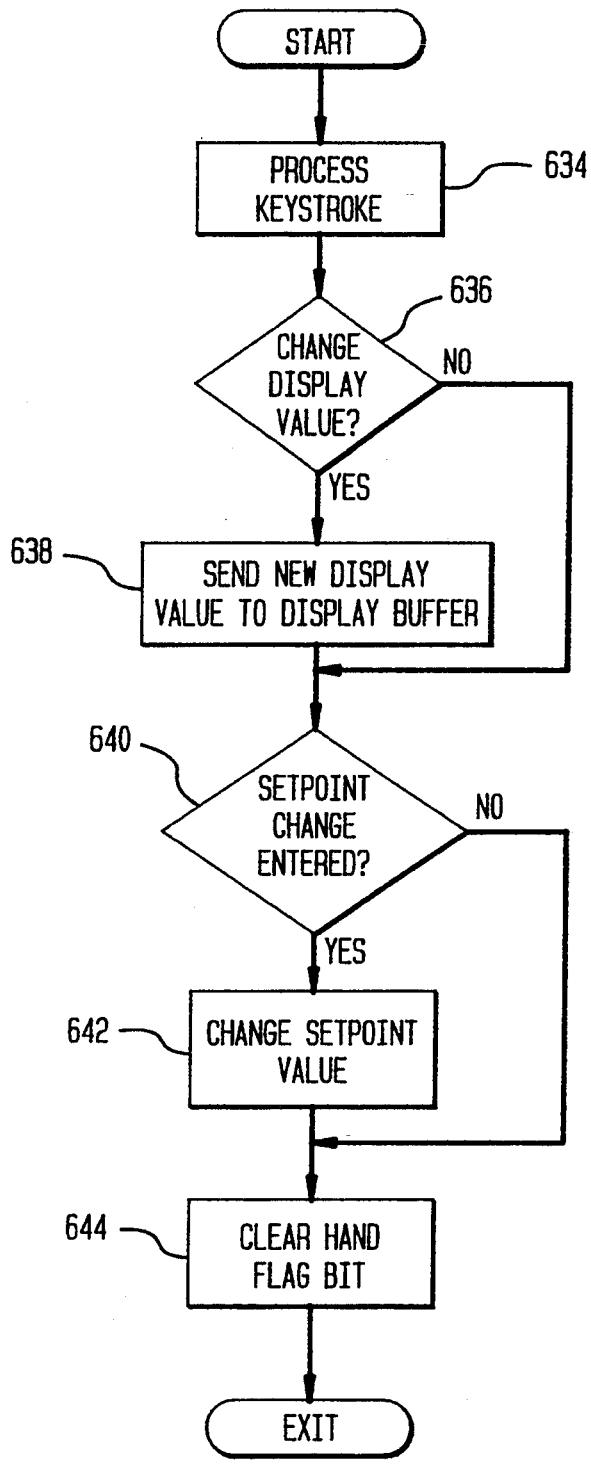

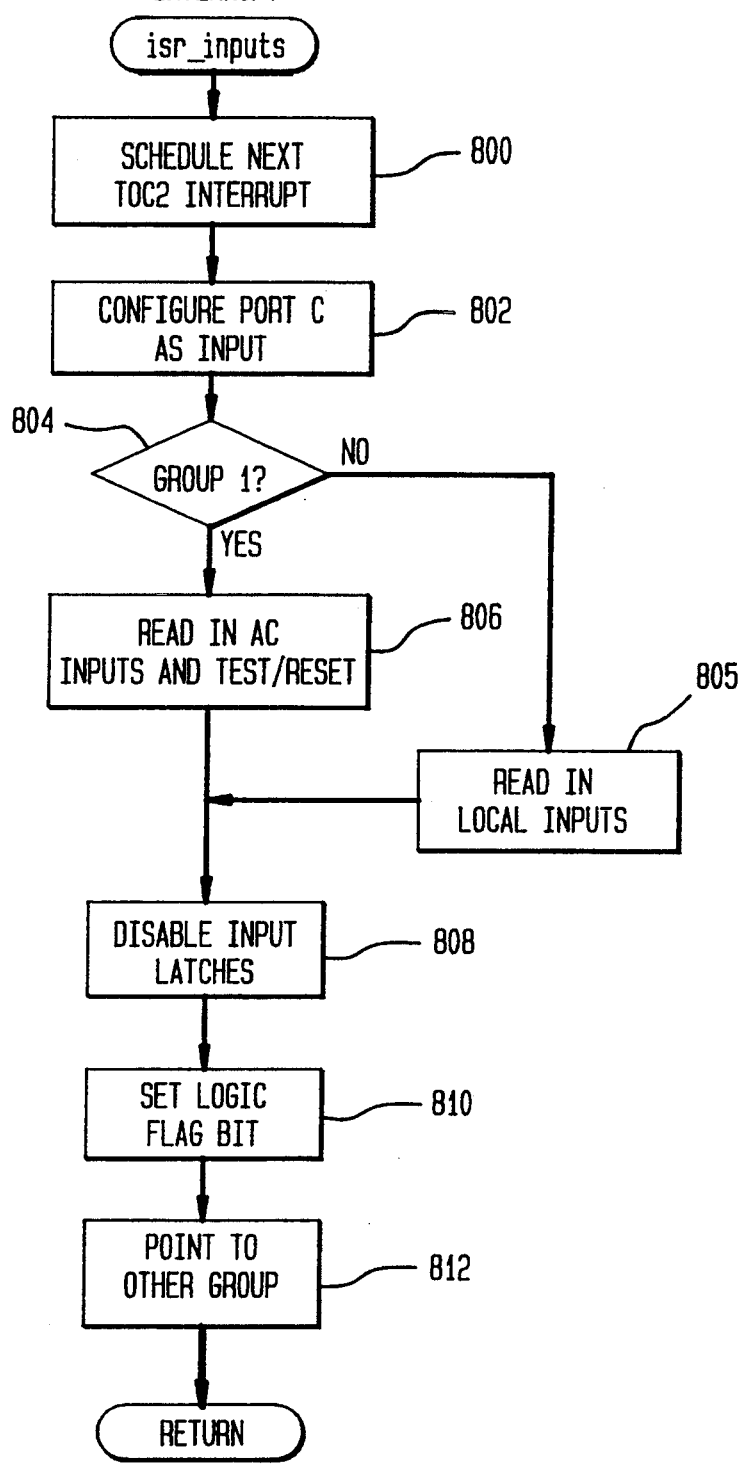

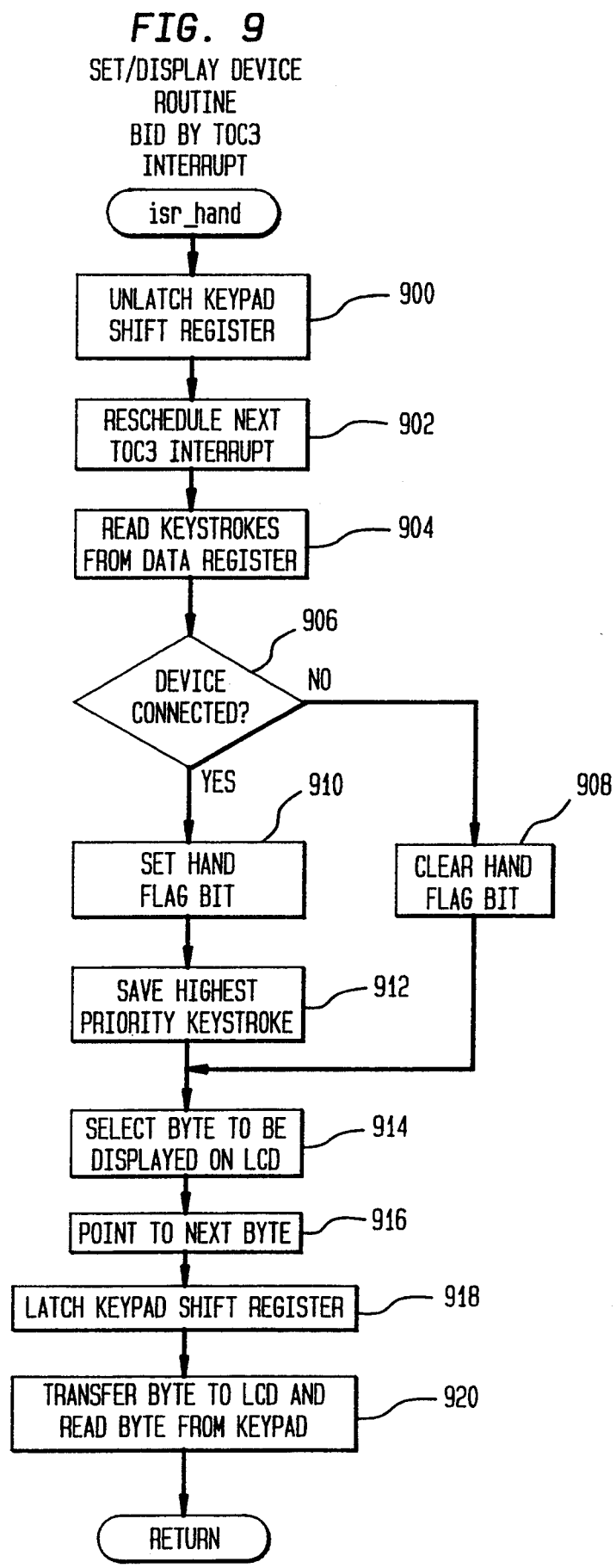

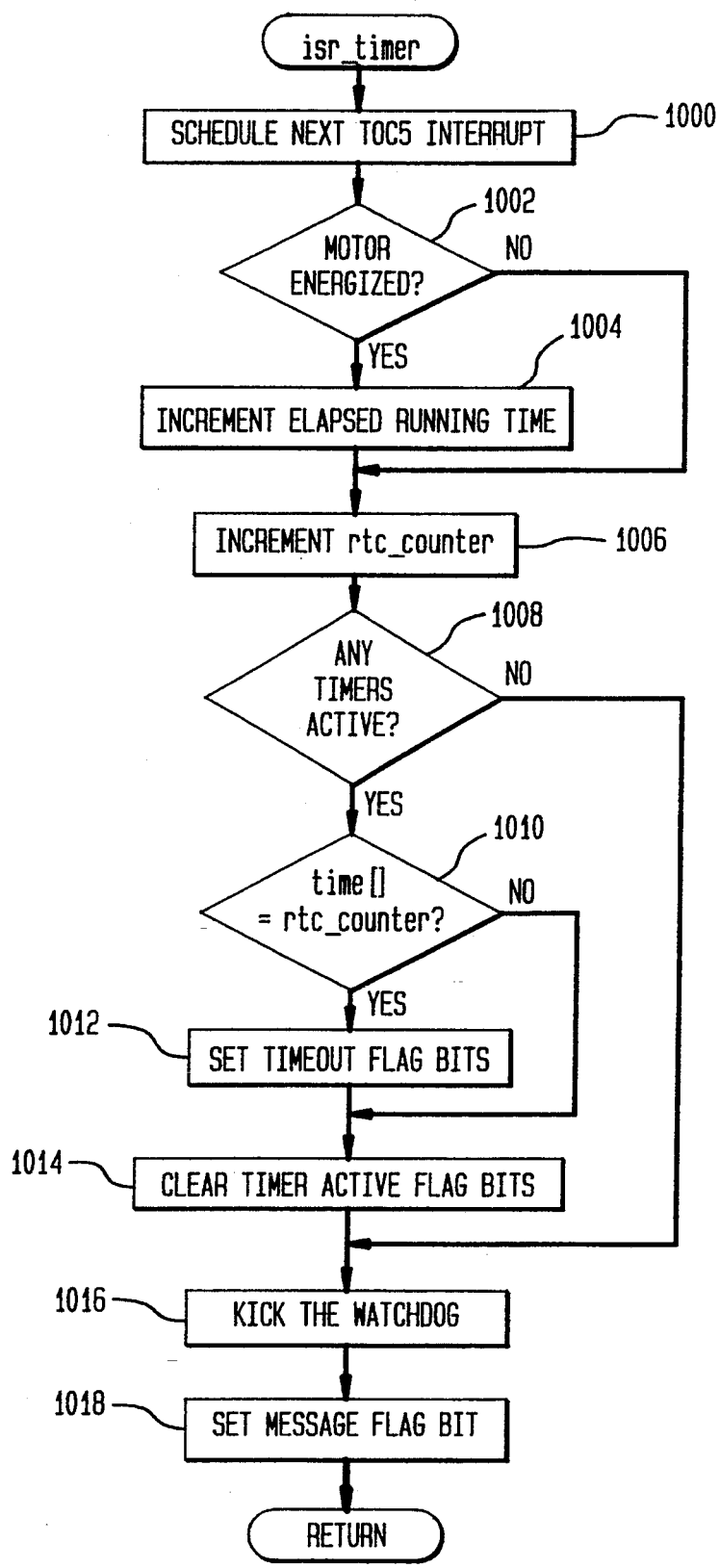

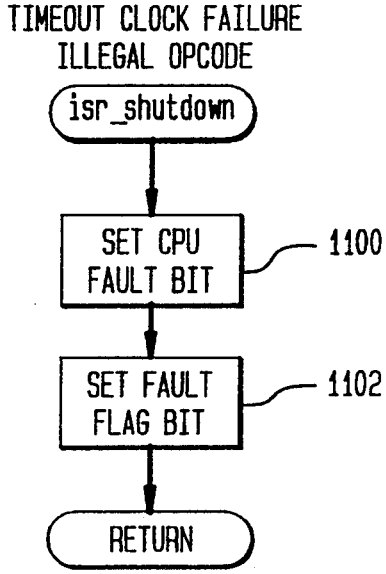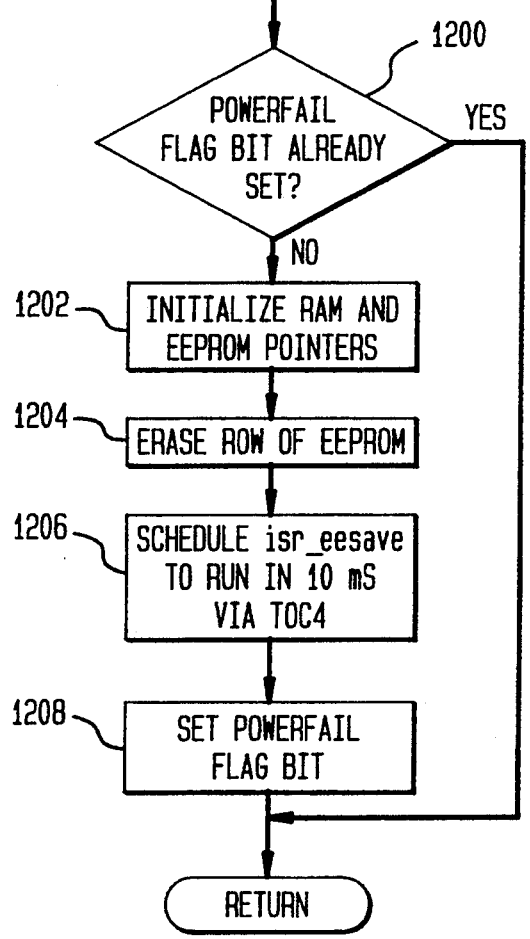

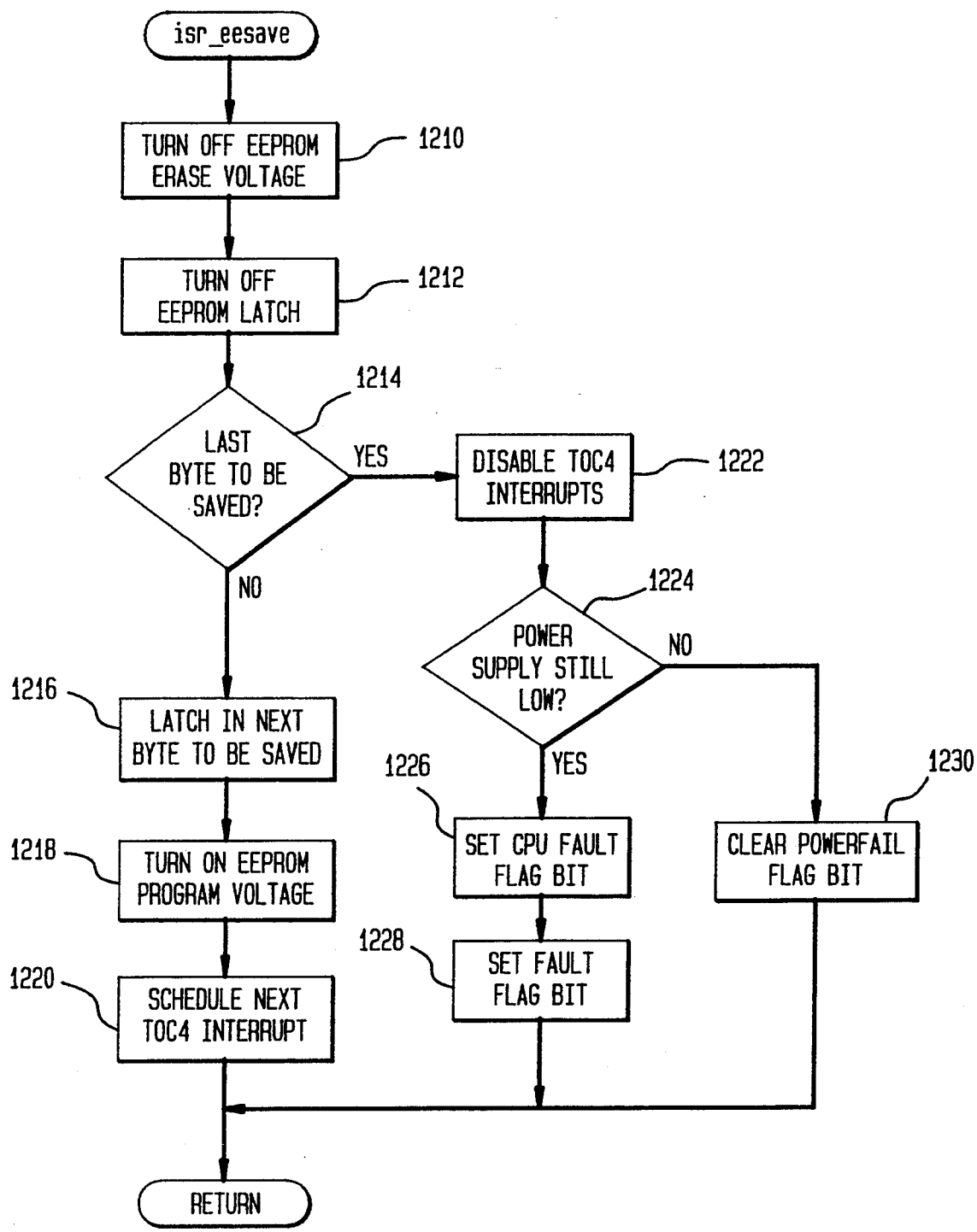

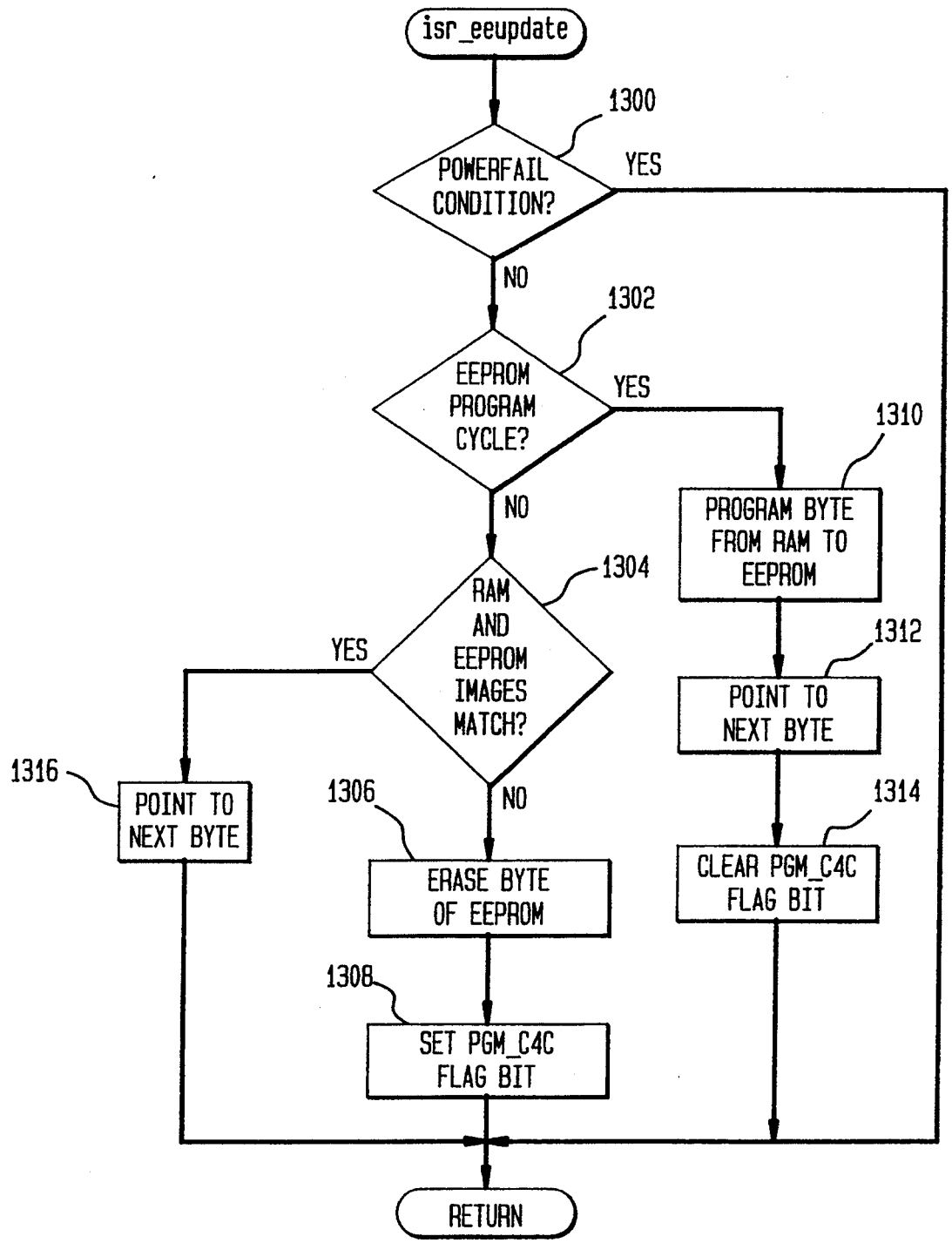

SERIAL COMMUNICATIONS ROUTINE
BID BY TRANSMITTER OR RECEIVER INTERRUPTS

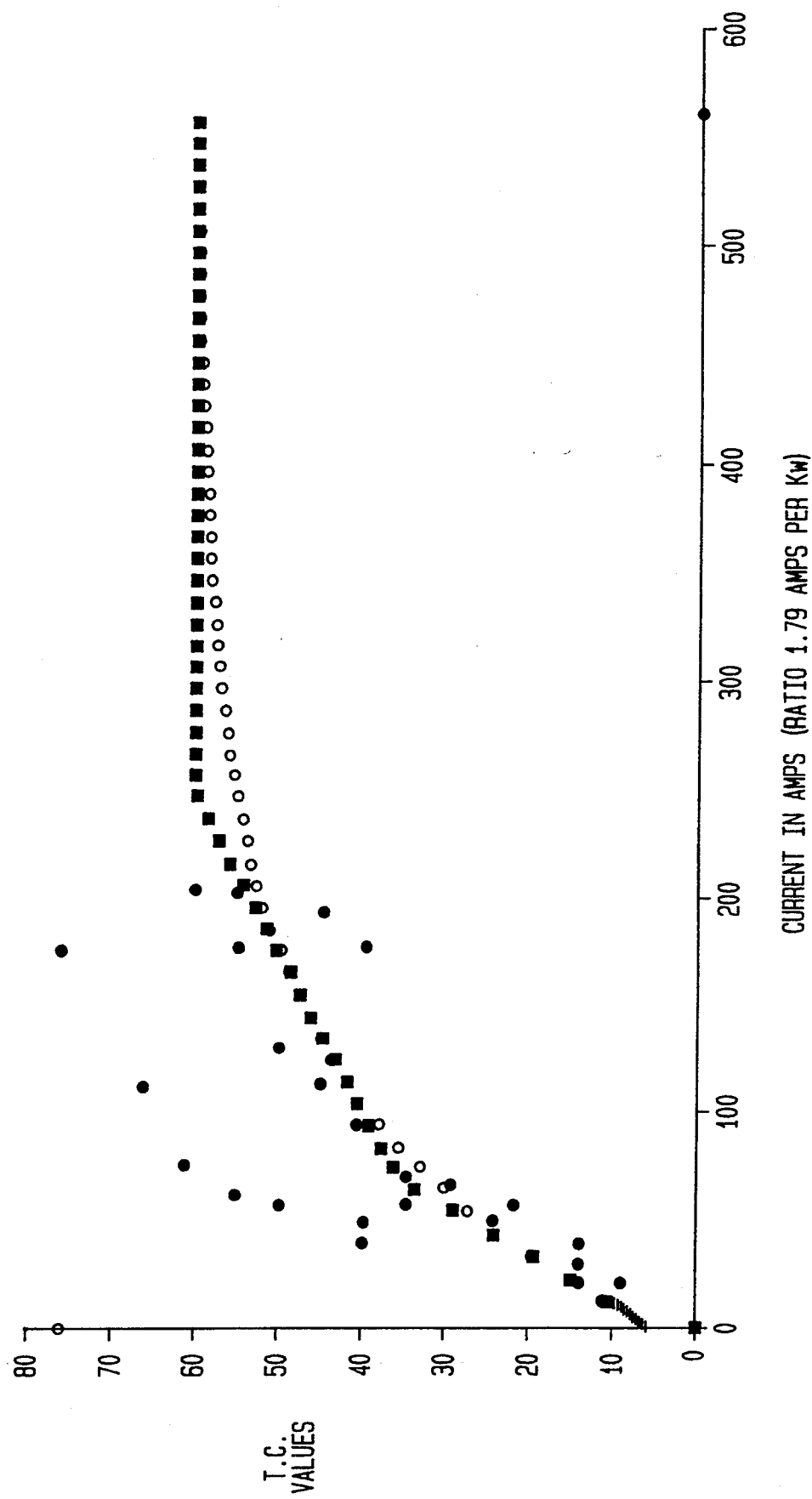

METHOD AND APPARATUS FOR SENSING A GROUND FAULT IN A MOTOR CONTROL SYSTEM

RELATED APPLICATIONS

This is a continuation of Ser. No. 07/714,282 filed Jun. 12, 1991, now abandoned, which is a continuation-in-part of application Ser. No. 07/462,934 filed on Jan. 3, 1990 for Motor Controller, now U.S. Pat. No. 5,206,572, having as a parent application Ser. No. 07/209,803 filed on Jun. 22, 1988, now abandoned. This patent application is also related to patent application docket no. 203 243 filed with The United States Patent and Trademark Office concurrently herewith, and incorporates the full disclosure of patent application docket no. 203 243 by reference.

BACKGROUND OF THE INVENTION

The invention generally relates to the protection and control of electric motors and, more particularly, to a motor control device which provides ground fault detection for an electric motor.

When operating as a motor starter, a motor device functions to start, accelerate, and stop an electric motor by causing the various windings of the motor to be connected to, or disconnected from, a source of electric power in response to manual or automatic commands. To provide a desired sequence motor function based upon external inputs, motor starter logic can be implemented in conjunction with the motor starter. In addition to controlling the connection of power to the motor with contactors, the starter typically provides annunciator functions, such as visible status indication in the form of pilot lights. Each input and output, is generally binary in nature.

Motor starter logic can be implemented with electromechanical relays wired together according to a particular application. Relays, however, are large and relatively expensive. Consequently, logic circuitry using solid-state components have replaced wired-relay logic in some applications. Both of these techniques are still widely used, but are relatively inflexible. In the case of wired-relay logic, different applications may require expensive labor-intensive operations, such as rewiring and repositioning the relays. In the case of solid-state logic, different applications may require either modification of a circuit or a change in logic. In both cases, the lack of flexibility forces the manufacturer of the starter to build and stock different versions of starters for different applications. Each version may differ from another in the quantity, layout, and interconnection of components. Different manufacturing requirements for each version frequently result in problems of quality control. It is inconvenient, difficult, and costly to control the quality of many different versions of a motor starter.

The problem of inflexibility has been approached with the use of programmable devices. Programmable logic controllers (PLCs) are devices, usually containing a digital processor and a program memory, designed to make decisions based on successive single-bit information. The program steps stored in memory replace the combinatorial logic of solid-state and the wired logic of relay-type starters. Each input and output may be programmed to perform a particular control function. As the application changes, the generic inputs and outputs can be reassigned and the sequential steps reprogrammed. One problem with PLCs, as applied to the function of motor starting, its that the cost of a PLC is difficult to justify in simple starter applications requiring only a few inputs and outputs.

In addition to PLCs, relatively low-cost programmable integrated circuits designed for use in simple starter applications are available. One problem with these circuits is that the necessary supporting circuitry elevates the cost to unattractive levels relative to the cost of wired-relay solutions. The same can be said for any application using general-purpose programmable devices, such as microcomputers. If, however, a device could combine the function of motor starting with the function of overload protection such a device would prove useful and cost effective in many applications.

Overload relays are dedicated circuit protection devices designed to interrupt the flow of current in an electric circuit upon the detection of undesirable current levels over a period of time. Such current levels can lead to serious damage to a motor through the excessive heating of the motor windings. Upon detection of an overload condition, the overload relay outputs a trip command to a circuit opening mechanism such as a contactor, which disconnects the load from its power source. Many applications using motor starters also require motor overload protection. For such applications, an overload relay is typically connected into the motor starter circuit and housed in the same control unit enclosure containing the starter.

The most common overload relays are of the thermal type, which include a heater element through which the load current flows and a bimetallic strip that deforms as it is heated by the heater. If heated sufficiently, the bimetallic strip deforms to such an extent that it forces a contact open, which commands the contactor to open the motor circuit. One problem with thermal overload relays is that a supply of different heating elements must be maintained to adjust the relays for different load conditions. In practice, few, if any, extra heater elements are available when needed. Furthermore, any adjustments made are in discrete steps that depend on the ratings of the available heaters.

Electronic overload relays containing microcomputers, which measure the load current by means of current transformers and calculate the heating therefrom, avoid the adjustment problem of thermal devices, but at a greater cost. Even the low cost electronic overload relays, however, allow only a few parameters to be adjusted. Furthermore, the tripping characteristics of the electronic devices are designed to emulate the tripping characteristics of a thermal relay, instead of being designed to more accurately control the motor. To keep the cost of simple electronic overload relays competitive with the cost of thermal devices, inexpensive, low-performance microcomputers have been used. The cost of overload devices using higher-performance microcomputers cannot be justified for simple applications, therefore it would be desirable to combine the overload function with other needed functions.

In addition to providing a device for motor control, it would be advantageous to provide the device with the ability to accurately detect ground fault currents in the motor associated with the device, without causing spurious tripping during motor start times. In general, a ground fault in a motor results when an undesired current path is established to ground. For example, in a single phase motor the sum of the phase current and the neutral current should be zero. In a three phase motor, the sum of the three phase currents should be zero. Accordingly, when these sums are not zero a ground fault is assumed. During motor starting, it is not uncommon for transient phase imbalances to exist.

SUMMARY OF THE INVENTION

The invention provides an apparatus for sensing a ground fault in a motor control system. The apparatus includes means for generating a first unrectified signal indicative of the current level in a first conductor coupled to a motor, means for generating a second unrectified signal indicative of the current level in a second conductor coupled to the motor, and means for generating, from the first and second unrectified signals, an unrectified sum signal indicative of the sum of the current levels. The apparatus further includes means for rectifying the sum signal, means for comparing the rectified sum signal to a designated limit, and means for generating indicia of a ground fault upon the rectified sum signal exceeding the limit for more than a predetermined period.

The invention further provides a motor control for sensing a ground fault in an electric motor coupled to a three phase system, including a first current transformer disposed to generate an unrectified first voltage substantially proportional to the current level in the first phase, a second current transformer disposed to generate an unrectified second voltage substantially proportional to the current level in the second phase, and a third current transformer disposed to generate an unrectified third voltage proportional to the current level in the third phase. The motor control further includes means for generating, from the first, second and third voltages, an unrectified sum signal indicative of the sum of the current levels, means for rectifying the sum signal, means for comparing the rectified sum signal to a designated limit, and means for generating indicia of a ground fault upon the rectified sum signal exceeding the limit for more than a predetermined period. The motor control further includes means responsive to a control signal for selectively engaging and disengaging the motor from the first, second and third phases and means responsive to the generation of indicia of a ground fault for applying a control signal to the means for selectively engaging.

The invention also provides a method for sensing a ground fault in a motor control system including a motor coupled to at least two conductors. The method includes the steps of generating a first unrectified signal indicative of the current level in a first conductor, generating a second unrectified signal indicative of the current level in a second conductor, and generating from the first and second unrectified signals, an unrectified sum signal indicative of the sum of the current levels. The method further includes rectifying the sum signal, comparing the rectified sum signal to a designated limit, and generating indicia of a ground fault upon the rectified sum signal exceeding the limit for more than a predetermined time period.

BRIEF DESCRIPTION OF THE DRAWINGS

A preferred exemplary embodiment of a motor controller in accordance with the present invention will hereinafter be described in conjunction with the appended drawings wherein like designations denote like elements, and wherein:

FIG. 2 is a block diagram of a current detector for detecting the level of a single phase current for current-sensing management;

FIGS. 3A-3D when taken together as illustrated in FIG. 3 are a circuit diagram of the preferred embodiment of FIG. 1, excluding the parameter set/display device, the external communications device, the remote inputs, the transformers, and the motor circuit;

FIG. 5 is a flow chart giving an overview of the structure of the operating program for the microcomputer;

FIGS. 6A-6D are flow charts showing the sequence of program steps in the background tasks of FIG. 5;

FIGS. 7-13 and 14A-14B are flow charts of the interrupt service routines of FIG. 5;

FIGS. 16 and 17 are graphical representations of motor test data;

DESCRIPTION OF THE PREFERRED EXEMPLARY EMBODIMENTS

The motor controller performs two main functions: motor control (e.g. starting, stopping, sequences of starting and stopping); and motor protection (e.g. overload, ground fault, short circuit.)

Motor control is customized for particular applications by storing program steps representing control logic peculiar to the given application in a non-volatile programmable memory cell. Each set of program steps, which the microcomputer executes, includes an expandable library of program sets representing the different motor circuit applications available for configuring a starter to match its particular application. A configuration can be changed by simply loading into memory the appropriate set of program steps from the library and changing the labels of the inputs (signals from input buffer 117) and outputs (e.g. signals to coil driver 113) to match the new application.

The detection of an overload, a ground fault, a motor jam, or a loss of load is realized in the code of the microcomputer and is based upon the root-mean-square (RMS), or effective, value of the motor current and changes in the current.

The method of measuring the RMS values of the load current includes sensing: the instantaneous current in at least one phase of a single or multi-phase electric circuit; and the sum of the load and neutral currents (single phase) or the sum of the phase currents (multi-phase). The method rates each current to a range suitable for electronic processing, converts each rated value to a digital representation, squares each digital representation, or sample, and digitally filters the squares of the samples to produce a digital word representing the DC value of the square of the load current. (Each word is also the square of the RMS value of the load current.) Subsequently, the square root of the resulting word yields the RMS value of the load current. As will be discussed below, the method described actually combines the filter and square-root procedures into a single procedure, obviating the need for a separate, time-consuming square-root procedure.

Figure 1:
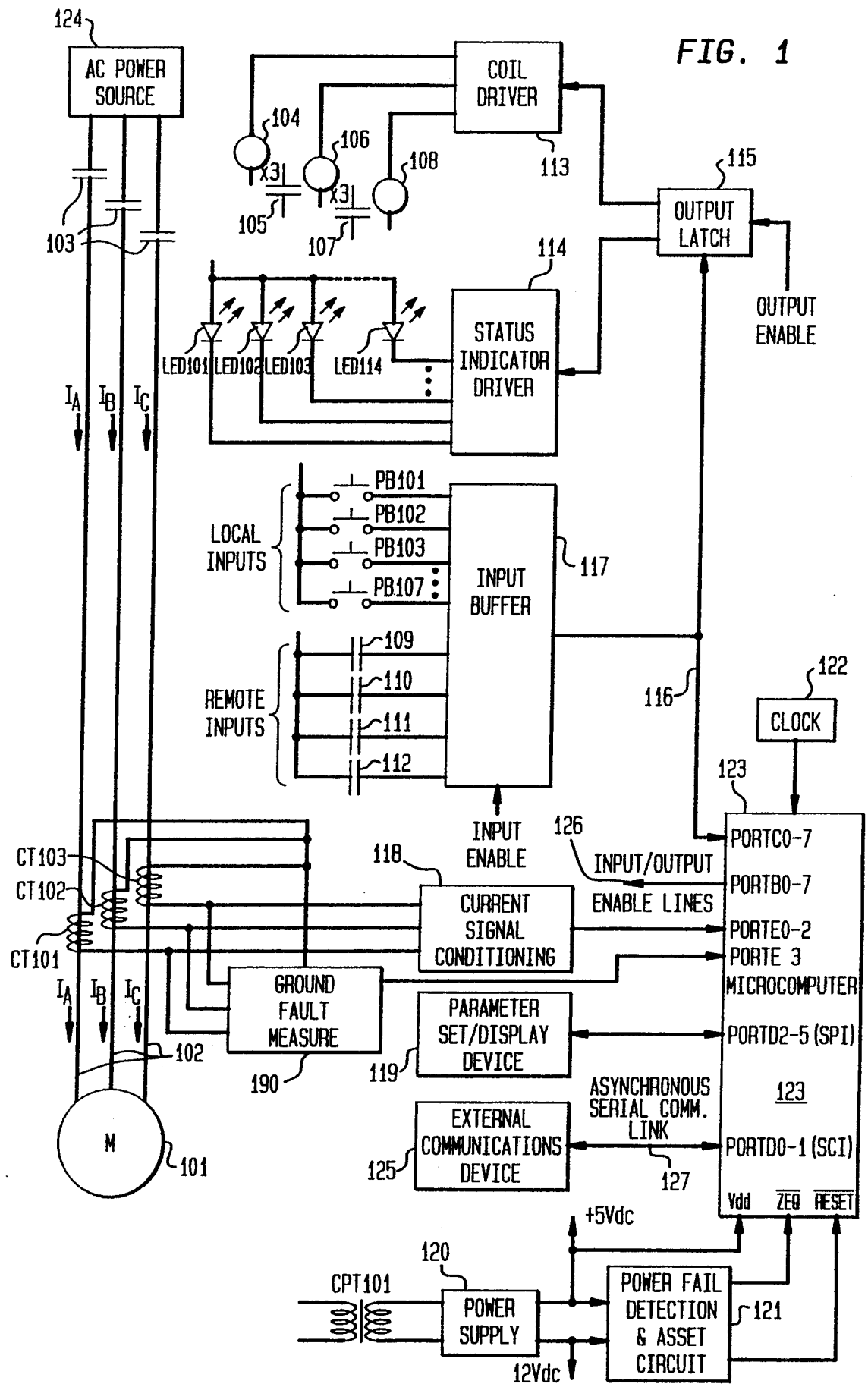
FIG. 1 is a block diagram of a preferred embodiment of a motor controller.

The functional schematic diagram of FIG. 1 shows an embodiment of the invention connected as an across-the-line motor starter with an electric motor 101 protected and controlled by a circuit opening and closing mechanism, such as a contactor 130 comprising contacts 103 and an actuating coil 104. Actuating coil 104 is energized by a coil driver stage 113. Coil driver stage 113 can also independently control up to two more contactors comprising contacts 105 and 107, and actuating coils 106 and 108, respectively. (Other motor starting applications, such as reversing, two-speed, and reduced-voltage, require the connection of more than one contractor to the motor circuit.)

In the across-the-line starting application shown in FIG. 1, current supplied to actuating coil 104 by coil driver stage 113 causes contacts 103 to close, connecting motor 101, via electrical current carrying conductors 102, directly to an AC power source 124, which supplies the power necessary to start and run motor 101. When coil driver stage 113 interrupts the supply of current to actuating coil 104, contacts 103 open, disconnecting motor 101 from the source of AC power. The decision to energize or de-energize the motor 101 is made by a microcomputer 123. Microcomputer 123, as directed by the operating program stored in its memory, controls the application of power to motor 101 by means of coil driver stage 113. Microcomputer 123, according to its program, translates input commands and conditions into output actions. Furthermore, by monitoring the current in motor 101, microcomputer 123 can protect motor 101 from damage due to excessive heating.

By way of example, the preferred embodiment of the motor controller can use a Motorola model MC68HC11 microcomputer. Details of the structure and operation of the MC68HC11 can be found in Motorola's published documentation on this microcomputer.

By way of further example, the contacts 103 and actuating coil 104 are embodied in contactor unit 130 which is appropriately sized to safely carry the motor current. Based upon NEMA (National Electrical Manufacturers Association) requirements, the contactor is typically of the type rated to interrupt over 15 times the motor full load current ($I_{FLC}$).

The motor control system is subject to three types of input data. This data includes up to seven local commands entered via push buttons PB101–107; up to four remote commands entered via push buttons or contacts 109–112; and control data supplied from an external communications device 125. The control data can include programming data transmitted over an asynchronous serial communications link 127.

The seven local push button commands and the four remote contact commands are read by the microcomputer over an eight-bit bidirectional data bus 116, which is an extension of PORT C of the microcomputer. The local and remote input commands are buffered by an input buffer 117, which permits microcomputer 123 to read input commands or conditions by enabling buffer 117 with an enabling logic level on the appropriate output line of PORT B 126. By complementing the logic level to disable buffer 117, microcomputer 123 causes buffer 117 to isolate the inputs electrically from data bus 116, so that output commands can be issued over bus 116. In practice, buffer 117, shown schematically in FIG. 1, may comprise a plurality of physical buffers, each requiring its own dedicated enable line 126 from PORT B.

Both remote and local inputs are binary in nature, with a low logic level indicating an open contact (relaxed push button) and a high logic level indicating a closed contact (depressed push button). Microcomputer 123 reads the inputs periodically at a rate empirically determined to ensure detection of normal push button depressions. Microcomputer 123 also collects any input commands sent over asynchronous serial communications link 127.

A sequence of logic equations that translate input commands and conditions into output actions is stored in the memory of the microcomputer 123. PORT C is configured as an output and output actions are sent out over bus 116 to an output latch 115. The output actions are realized as binary logic levels on bus 116. The logic levels are latched into the output latch by a logic level transition sent to the output latch's clock input over one of output enable lines 126. In practice, output latch 115 may comprise a plurality of physical latches, each requiring its own dedicated enable line 126 coupled to PORT B. The logic levels latched to the output of output latch 115 are a coil driver stage 113 and a status indicator driver stage 114. Coil driver stage 113 performs control action by energizing or de-energizing actuating coils 104, 106, 108. Status indicator driver stage 114 independently controls up to thirteen discrete status indicators, such as light-emitting diodes (LEDs) LED101–114.

The following example illustrates a motor controller configuration along with the assignment of input and output functions for a typical application. References are to FIG. 1.

EXAMPLE: LOCAL 3-WIRE, REMOTE 2-WIRE, ACROSS-THE-LINE STARTER

Local Input Assignments (Push Buttons PB101–107)
PB101—STOP (stop the motor)
PB102—START (start the motor)
PB103—Not used
PB104—HAND (hand, or local, control)
PB105—OFF (control disabled)
PB106—AUTO (automatic, or remote, control)
PB107—Reserved for a special function
Remote Input Assignments (Remote Inputs 109–112)
Remote input 109—closed (start the motor) open (stop the motor)
Remote input 110—Not used
Remote input 111—Not used
Remote input 112—Not used
Coil Driver Output Assignments (COILS 104, 106, 108)
Coil 104—energized (start the motor) de-energized (stop the motor)
Coil 106—Not used
Coil 108—Not used
LED Output Assignments (LED101–113)
LED101—Overload/Instantaneous trip LED102—Ground Fault Interrupt
LED103—Reserved for a special use
LED104—Reserved for a special use
LED105—Reserved for a special use
LED106—Reserved for a special use
LED107—Reserved for a special use
LED108—AUTO (control in automatic, or remote, control mode)
LED109—OFF (control disabled)
LED110—HAND (control in hand, or local, control mode)
LED111—Reserved for a special use
LED112—Not used
LED113—RUN (motor energized)
LED114—STOPPED (motor de-energized)

All of the defined inputs and outputs are binary, i.e., either off or on, "0" or "1", false or true, low or high. Consequently, each output is determined by solving a Bolean logic equation whose terms may include both inputs and outputs. For the example, six Boolean equations are required—one for each output assignment. The program code implementing the set of Boolean equations typically differs from one motor starter type to another, just as the function assignments of the inputs and outputs differ from one application to another.

In addition to providing motor control, the motor controller also protects motor 101, conductors 102, and any in-line devices, such as contacts 103, from damage due to unacceptably high currents. Alternating, the load currents $I_A$, $I_B$ and $I_C$, in respective phases of the three-phase motor circuit shown in FIG. 1, are sensed by current transformers CT101-CT103. The secondary currents in the current transformers CT101-CT103 are processed by a signal conditioning circuit 118, which converts the current signals to voltage signals proportional to the secondary currents in the transformers CT101-CT103.

Signal conditioning circuit 118 rectifies the voltage signals, thereby providing at its output rectified AC voltage signals proportional to the magnitudes of the secondary currents in the current transformers and, consequently, to the magnitudes of the load currents $I_A$, $I_B$ and $I_C$.

Each of the three rectified voltage signals is applied to one of the four individual PORTS E0-3 of microcomputer 123. Each input is connected internally to a different channel of the microcomputer's A/D converter 207 (FIG. 2). A/D converter 207 periodically samples and converts each of the three signals at its input channels, producing digital representations of the instantaneous magnitudes of the load current in each phase. Program code in microcomputer 123 uses the digital representations of the three load currents to determine whether protective action, such as interrupting the flow of power to motor 101 by opening contacts 103, is required.

In its function as a motor controller capable of being connected and programmed to handle many applications, the system in FIG. 1 may control, among other parameters, the starting, stopping, direction, and speed of a motor in response to operating conditions, manual commands, automated commands, local commands, or remote commands. By sensing the load currents ($I_A$, $I_B$ and $I_C$), microcomputer 123 can determine whether or not a contactor responded correctly to an open or close command. In its protective function as an overload sensing device, the system detects overload and unbalanced conditions by measuring the load currents. The motor thermal model (discussed below) implemented in the operating program uses the representations of the load currents and the percentage of current unbalance to compute the housing and winding temperatures of the motor and to trip the motor off before the temperatures reach damaging levels. Like the main functions of motor starting and overload protection, the further features of motor jam protection and loss of load protection (discussed below) rely on an accurate measurement of load current for correct operation.

FIG. 2 is a schematic block diagram of a current detector for detecting the level of one phase current of a three-phase current. The level of the other two current phases is detected similarly. Alternating load current $I_A$ in motor line 102 induces a proportional current in current transformer CT101. The constant of proportionality is determined by the number of turns in the secondary winding of current transformer CT101. The secondary current is applied to a burden resistor 203. The current produces a voltage across burden resistor 203 proportional to the secondary current and, thus, to the load current. The voltage across burden resistor 203 is rectified in a full-wave rectifier 204, or an absolute value circuit, producing an output voltage waveform 205 having a magnitude proportional to the absolute value of the load current.

The rectified voltage from rectifier 204 is applied to a sample-and-hold circuit 206 and an A/D converter 207. Sample-and-hold circuit 206 and A/D converter 207 are integrated into microcomputer 213. Sample-and-hold circuit 206 samples waveform 205 at the sampling frequency $f_s$. The analog sample is then digitized by A/D converter 207 into eight bits covering a range from 0V to the reference voltage level (2.5 v or 5 v). The eight-bit digital output of the A/D conversion ranges from 0 (decimal), or 00000000 (binary), for an 0 V input to 255 (decimal), or 11111111 (binary), for an input voltage equal to the reference level. The digital output of A/D converter 207 is the digital sample value used in the program's computation. The program requests another sample value every $1/f_s$ seconds by sending a start conversion command to sample-and-hold circuit 206 and A/D converter 207 at a rate of $f_s$ (171 Hz).

The digitized sample value out of A/D converter 207 is squared in a multiplier 208 and applied to a digital lowpass filter 209. The output of digital lowpass filter 209, $I_{ms}$, is a digital value proportional to the mean-square (MS) value of the load current. A square-root operation 210 produces the root-mean-square (RMS) value, $I_{rms}$, from the mean-square value. It is the RMS value of the load current that is used by the program in its current-dependent computations (ground fault interrupt routine, intermediate motor protection routine, and motor model simulation routine discussed below).

Although sampling by A/D converter 207 precedes squaring in the actual current measuring sequence, the analysis can be performed such that squaring precedes sampling. (The two steps commute in theory.) In accordance with one embodiment, squaring is done in software to avoid the added cost of providing hardware to perform the squaring process.

In another embodiment of lowpass filter 209 operation, 60 consecutive squared samples are accumulated to produce an averaged mean-square current value $I_{ms}$. For a sampling frequency of 171 Hz, a new $I_{ms}$ value is generated about every 350 ms. The square root of $I_{ms}$, is taken as discussed above in reference to block 210, and provides a new $I_{ms}$ value every 350 ms.

The purpose of digital lowpass filter 209 is to isolate the DC value of the squares of the load currents by blocking all of the higher order even harmonics and passing only the DC component of the load current. Under normal conditions, the load current comprises a fundamental frequency component (50 Hz [European] or 60 Hz [U.S.]) and a number of components at odd harmonics of the fundamental. The load current waveform depends on the relative amplitudes and phase relationships of the fundamental and its harmonics. When the signal representative of load current is squared by multiplier 208, another series of sinusoidal waveforms result having frequencies which are the sums and differences of all the frequencies in the original signal representative of load current. The relative amplitudes and phases of the frequency components in the original signal determine the relative amplitudes and phases of the components in the output, squared signal.

In the case of a series containing a fundamental and odd harmonics, the resulting squared series contains only even harmonics. Furthermore, the DC value (i.e., the 0th harmonic—a degenerate even harmonic) of the output series of multiplier 208 is the mean-square value of the original series. The sampling frequency ($F_s$) is an important parameter in the design of digital lowpass filter 208. Several criteria may be used in selecting the sampling frequency:

1. The sampling frequency should be as low as possible to minimize processing time;
2. The sampling frequency should result in a filter having a response time fast enough to handle the fastest specified trip time;
3. The sampling frequency should result in a filter that adequately attenuates the even harmonics in the square of the load current;
4. The sampling frequency should result in samples at many different relative points on the waveform from cycle to cycle to minimize the effects of A/D quantization levels; and
5. The sampling frequency should result in a filter that works well for both 50 Hz and 60 Hz systems.

A single-pole digital lowpass filter is represented by the iterative difference equation $$Y_k = aY_{k-1} + (1-a)X_k,$$

where $X_k$ is the kth sample input to the filter, $Y_k$ is the output of the filter computed using the kth input, $Y_{k-1}$ is the previous output of the filter, and a is a filter coefficient between 0 and 1 related to the bandwidth. In a filter for the square of the load current, $X_k$ is the square of the most recent sample of the current. The careful selection of the sampling frequency and the filter coefficient results in a filter that substantially satisfies the listed criteria, and the computed output $Y_k$ represents the mean-square value of the load current, and the square root of $Y_k$ represents the RMS value of the load current. The difference equation can be rewritten in terms of the RMS value (RMS) and the load current sample (I) as follows:

$$RMS_k^2 = aRMS_{k-1}^2 + (1-a)I_k^2.$$

If the RMS value does not change significantly from sample to sample, as is typically the case, (i.e., $RMS_k$ is approximately equal to $RMS_{k-1}$), the previous difference equation can be rewritten, after each term is divided by $RMS_{k-1}$ as follows:

$$RMS_k = aRMS_{k-1} + (1-a)I_k^2/RMS_{k-1}.$$

Thus, the RMS value can be computed from the input current sample and the previous RMS value without evoking a time-consuming square-root routine. Each time a new sample of the load current is made, a new RMS value is computed. In accordance with the preferred embodiment, a sampling frequency of 171 Hz and a filter coefficient of $1-2^{-4}$ (0.9375) give the desired results.

As will be shown and discussed below, microcomputer 123 uses the digital representations of the RMS values of the load currents in the three phases to: control the motor; provide overload protection; evaluate the performance of the motor; and provide short circuit protection to effect protective and control action as required. These digital representations are applied to a motor model for purposes of motor control.

In addition to providing the above listed functions, the motor controller also provides ground fault protection. For the three phase motor arrangement illustrated in FIG. 1, a ground fault measuring circuit 190 sums the secondary currents associated with the phase currents ($I_A$, $I_B$, $I_C$) to determine whether or not their sum is substantially equal to zero. (For a single phase motor, circuit 190 (FIG. 1) functions to sum the secondary currents associated with phase current ($I_A$) and the neutral phase current ($I_N$) to determine if their sum is substantially equal to zero).

A feature of ground fault circuit 190 is its ability to sum the secondary currents sensed by current transformers CT101-103 and then rectify the sum without severely attenuating the secondary currents provided to burden resistors 203 (FIG. 2). Another feature of circuit 190 is its ability to sum the secondary currents before rectifying these currents. An advantage of performing the summing function before the rectification function is the ability to sum both the magnitude components and phase angle components of the phase currents. For many ground fault detection schemes, the secondary currents are rectified before being summed, and the polarity information associated with the secondary currents is truncated. Under certain circumstances, this truncation may provide a sum of zero (ground fault condition does not exist) when in fact the sum would not be zero (ground fault condition exists) if the polarity information would not have occurred.

Figure 23:
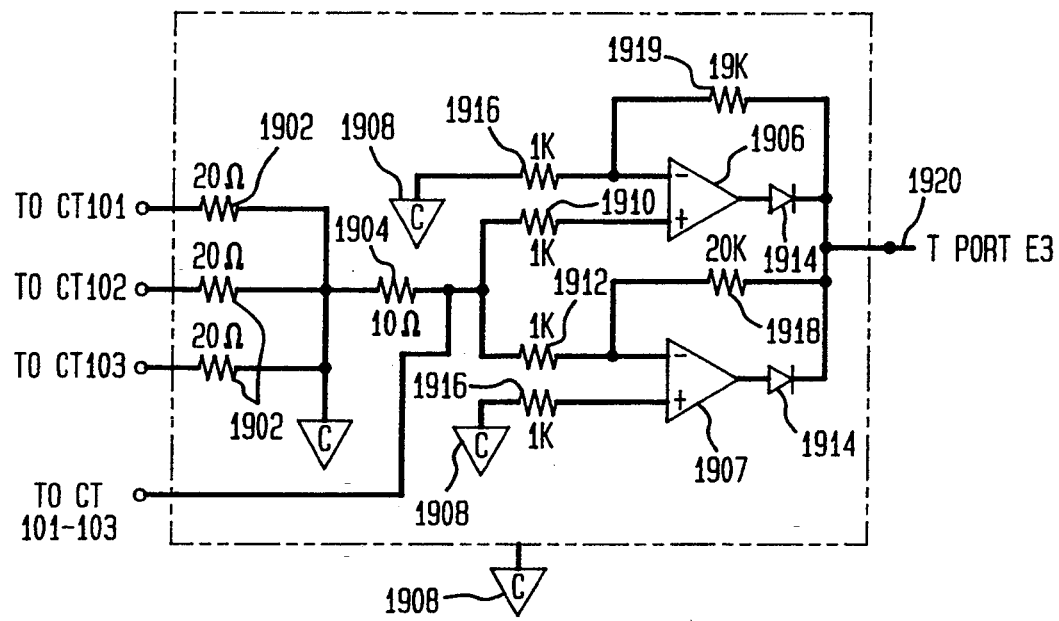
FIG. 23 is a block diagram of the phase current summing and rectifying circuit.

Referring to FIG. 23, circuit 190 includes a load resistor 1902 associated with each current transformer CT101-103, a dropping resistor 1904, and a pair of operational amplifiers 1906, 1907. Each load resistor 1902 is coupled between the first terminal of one of current transformers CT101-103 and ground 1908. Dropping resistor 1904 is coupled between the second terminal of all current transformers CT101-103 and ground 1908. The second terminals of all current transformers CT101-103 are also coupled to a pair of resistors 1910 and 1912. Resistor 1910 is coupled to the noninverting input of operational amplifier 1906 and resistor 1912 is coupled to the inverting input of operational amplifier 1907.

The inverting input of operational amplifier 1906 and noninverting input of operational amplifier 1907 are each coupled to ground by a resistor 1916. The inverting inputs of operational amplifiers 1906, 1907 are connected to output 1920 of ground fault circuit 190 by feedback resistors 1918 and 1919. The outputs of operational amplifiers 1906, 1907 are each coupled to a diode 1914 which is coupled to output 1920 of ground fault circuit 190.

By way of example only, values can be assigned to the resistors as follows: resistor 1902—20 ohms; resistor 1904—10 ohms; resistors 1910, 1912, and 1916—1K ohms; resistor 1918—20K ohms; and resistor 1919—19K ohms. Using the referenced resistor values, operational amplifiers 1906, 1907 are provided with a gain of 20.

The arrangement of load resistors 1902, dropping resistor 1902, ground 1908 and current transformers CT101-103 provides the ability to sum each of the secondary currents, while simultaneously preserving the individual secondary currents for other functions such as overload and short circuit protection further discussed below. The sum of the secondary currents is provided to operational amplifiers 1906, 1907 which operate to rectify and amplify the sum, wherein the rectified sum is provided to output 1920.

Output 1920 is coupled to PORT E3 of microprocessor 123 and the voltage at output 1920 is converted to a digital signal by A/D converter 207 in the same manner as discussed above for waveform 205. The digital signal derived from PORT E3 is sampled at a rate of 171 Hz along with the other three PORTS E0-2.

When the motor controller is enabled to check for ground fault, a subroutine is called upon to analyze the digital signal derived from PORT E3. FIGS. 3A–3D illustrate, in further detail, the preferred embodiment of the invention in which the Motorola model MC68HC11 microcomputer is operated in the single-chip mode. Although microcomputer 123 can also be operated in the expanded, multiplexed mode in which the program may be stored in external memory, such as ultraviolet-erasable programmable ROM (EEPROM), it is anticipated that, for large-volume production, significant cost savings may be realized by using the microcomputer's built-in memory, with the program stored in the masked ROM and the Boolean logic equations stored in the EEPROM.

Microcomputer 123 uses the external clock 122 (FIG. 3D) as recommended by the manufacturer. A crystal X1 with a resonant frequency of 8 MHz, capacitors C2 and C3, and a resistor R5 are connected to the microcomputer's EXTAL and XTAL inputs as shown. The external 8 MHz crystal results in an internal 2 MHz E-clock and 500 ns instruction cycle times. A power supply circuit, 120 in FIG. 1, couples 5 Vdc power to microcomputer 123 through its $V_{DD}$ and $V_{ss}$ inputs. Capacitor C1 reduces noise on the power input to microcomputer 123. The single-chip mode of operation is selected when the MOD4 pin of microcomputer 123 is pulled low to ground potential through one resistor of resistor network RN5, and the MOD2 pin is pulled high to 5 Vdc through another resistor of RN5, selecting the single-chip mode of operation. The microcomputer's XIRQ pin is pulled high through yet another resistor of RN5, disabling the XIRQ interrupt. The following pins are unused and unconnected in the preferred embodiment: PA1; PA2; PA4; PA5; PA6; PA7; R/W; AS; PB0; PB1; PB2; PB7; PE3; and E.

Power supply circuit 120 provides unregulated 12 VDC and regulated 5 VDC sources of power. The unregulated 12 Vdc voltage powers driver chips U5, U7, and U11, LEDs (LED1–14), opto-triac drivers U12–14, and any remote alarm connected to a terminal block TB1 across terminals labeled REMOTE ALARM and +12 V. Operational amplifiers in signal conditioning and powerfail/reset circuits are powered from $V_{ANALOG}$, which is derived from 12 Vdc through a blocking diode D19. During a power failure, a capacitor C44 maintains the $V_{ANALOG}$ voltage long enough for powerfail/reset circuit 121 to operate properly before power is lost. The regulated 5 Vdc level powers the rest of the circuits, including digital integrated circuit elements U6 and U8–10 and set/display device 119, when connected.

A control power transformer, not shown in FIG. 3, supplies the power supply circuit with 12 VAC isolated from the motor circuit. Chokes Z1-4, metal-oxide varistors MN1-3, and capacitors C302-306 provide noise filtering and overvoltage protection to the power supply circuit, while a fuse F1 protects the circuit from damaging current levels. Diodes D15-18 provide a full-wave rectifier with an unregulated output of 12 VDC. Capacitors C9 and C10 are filter capacitors, with C9 shunting most of the AC ripple to ground. The unregulated 12 VDC is connected to the input of a linear voltage regulator VR1, which produces the 5Vdc level used to power the microcomputer and many of the logic circuits. A diode D21 prevents the 5 VDC level maintained by a capacitor C12 from discharging into the regulator in the event of a loss of input power. Another diode D20 compensates for the voltage drop across diode D21. Capacitor C12 is a ride through capacitor that maintains the 5 Vdc logic voltage for at least 200 ms when input AC power is lost, giving microcomputer 123 enough time to save certain variables into EEPROM. A capacitor C11 provides further noise reduction on the 5 Vdc logic level.

Figure 3B:
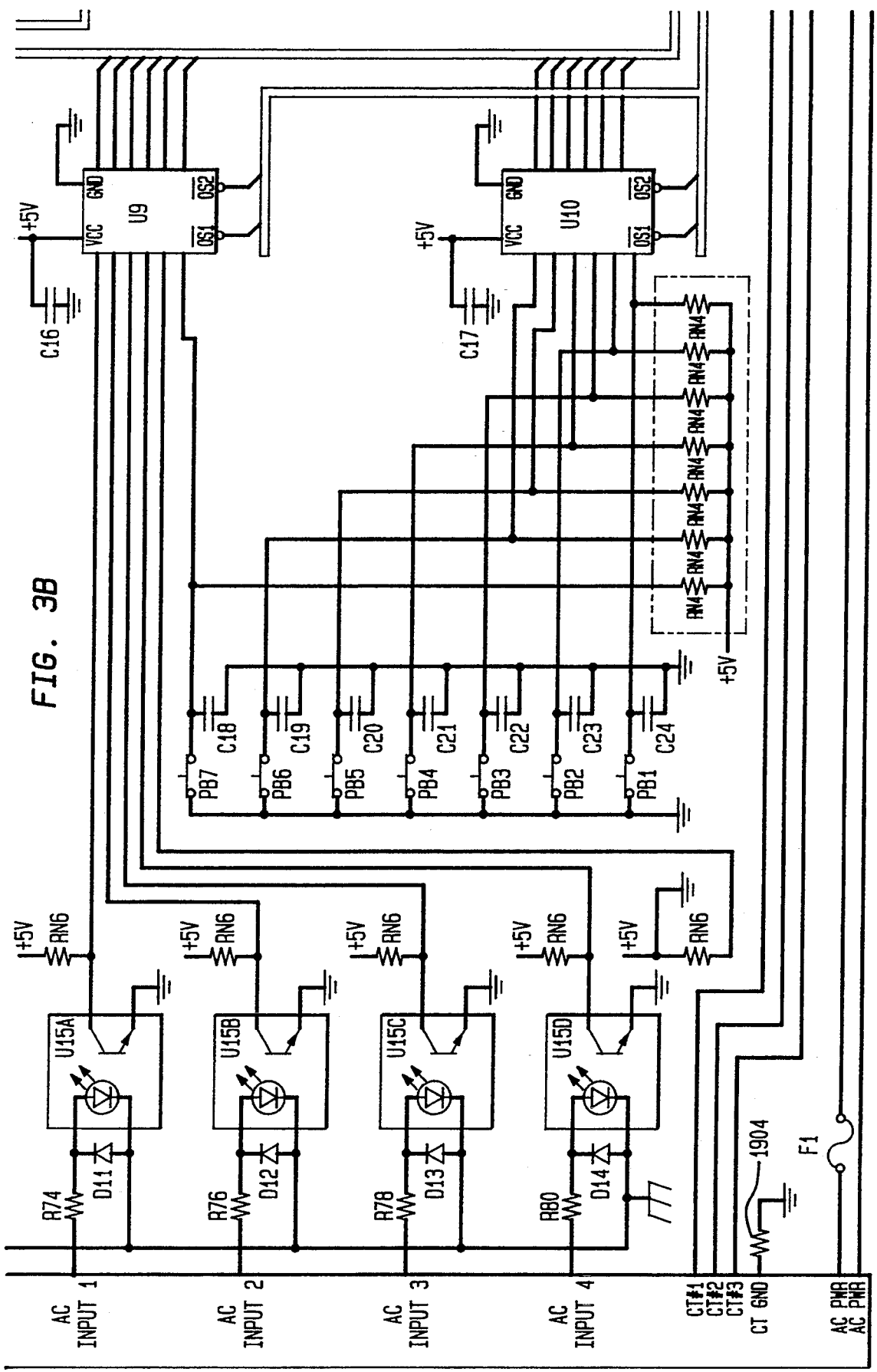
Figure 3C:
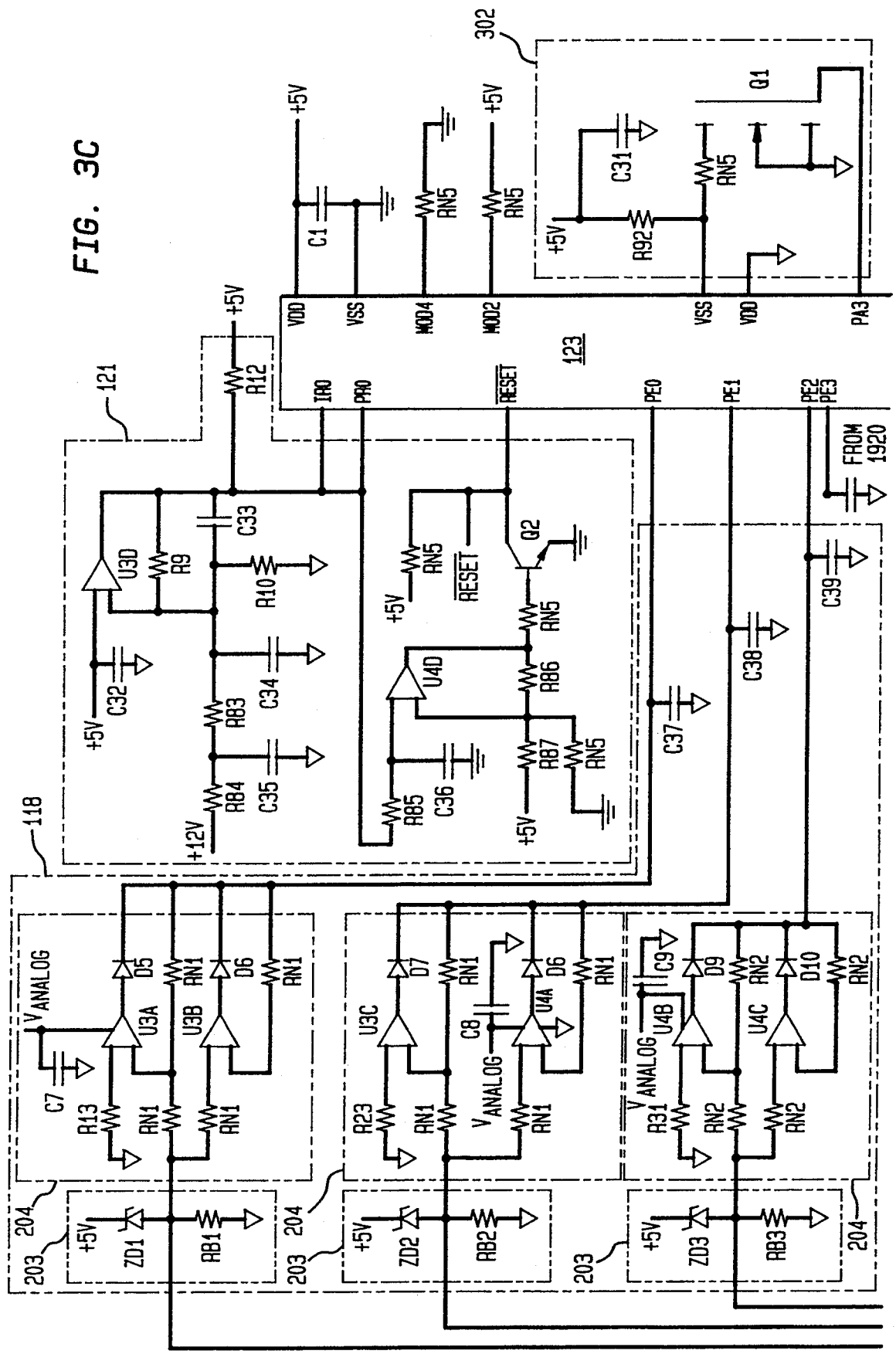

Powerfail/reset circuit 121 in FIG. 3C includes operational amplifiers U3D and U4D, resistors R9–10, R83–87, and R12, three resistors from resistor network RN5, capacitors C32–36, and PNP transistor Q2. Circuit 121 has two purposes:

1. to warn microcomputer 123 that the unregulated 12 VDC has dropped below 9 V, so that an orderly shutdown sequence can be started, and
2. to reset the processor with a sharp reset pulse.

When the 12 VDC supply voltage drops below about 9 V, the output of operational amplifier U3D, used as a comparator, drops low. Positive feedback produced by resistor R9 ensures a rapid, non-oscillatory low-going transition at the output. The falling edge on the IRQ pin of microcomputer 123 generates an interrupt, which vectors program execution to a routine that begins an orderly powerfail shutdown (isr-powerfail, discussed below). Capacitors C33–35 prevent noise or ripple from affecting the detection of a powerfail condition. The output of comparator U3D is also connected to input PRO. By reading PRO after saving certain variables in EEPROM, the program checks the status of the power supply. If the power supply has recovered by the time the saving procedure has finished, microcomputer 123 continues normal program execution. If the power supply has not recovered, the shutdown sequence runs to completion.

Transistor Q2 drives microcomputer's 123 RESET pin low about 200 ms after IRQ first goes low. Operational amplifier comparator U4D and its associated resistors R85–88 and capacitor C36 determine the delay. Resistor R86 ensures that a start edge necessary for a solid reset occurs. (A low-going transition on the RESET pin that tracks the MC68HC11's $V_{ss}$ voltage as it collapses can cause faulty program execution, which could result in the inadvertent erasure of portions of EEPROM.) During power-up, powerfail/reset circuit 121 clears the outputs of latches U6 and U8, thereby turning off status indicator driver 114 and coil driver 113.

Figure 19:
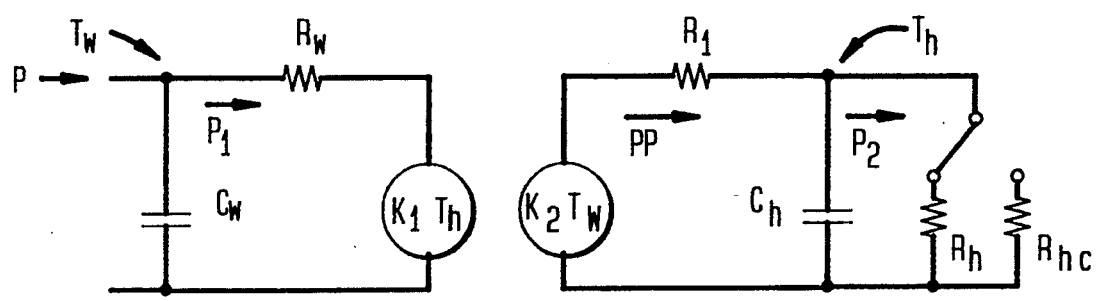

The secondary windings of the current transformers CT101-103 in the motor circuit are connected to a signal conditioning circuit 118 (illustrated schematically in FIGS. 1 and 2) and ground fault detection circuit 190 (FIG. 19). Referring to FIG. 3C, circuit 118 includes operational amplifiers U4A-C and U3A-C, zener diodes ZD1-3, diodes D5-10, capacitors C7-8 and C29-30, burden resistors RB1-3, discrete resistors R15, R23, and R31, and twelve resistors from resistor networks RN1 and RN2, by a terminal block TB1.

The secondary of each of one of current transformers CT101-103 is connected between the terminal points labeled CT#1-3, respectively, and CT GND by resistor 1904 (FIG. 3B). The three current signals are applied to three similar absolute value circuits. Each circuit contains two operational amplifiers U3A, U3B, U3C, U4A, U4B, U4C—one for the positive half-cycle and the other for the negative half-cycle of the signal waveform. The values of the burden resistors are chosen to give the appropriate voltage range for the application. Zener diodes ZD1-3 provide some protection from voltage spikes of either polarity. Positive spikes are clipped at just over 5 V by the forward-biased diodes; negative spikes are clipped at about −7 V by the zener action of the 12 V zener diodes. The gain of the full-wave rectifier circuit 204 is unity, as determined by the input and feedback resistors of operational amplifiers U3A-C, U4A-C (FIG. 3C).

Referring to the operation of the circuit for one current signal, the secondary current of the current transformer connected between terminal CT#1 and CT GND produces a proportional voltage across burden resistor RB1. When the voltage is positive with respect to ground reference potential, unity-gain, non-inverting operational amplifier U3B produces a positive output that forward biases signal diode D6. The feedback path from the cathode of D6 to the inverting input(−) of U3B maintains the voltage at the cathode at the level of the output voltage. The output of complementary unity-gain, inverting operational amplifier U3A is driven to the ground rail by the positive input voltage. Diode D5 is reverse-biased and does not conduct. Therefore the output at the cathodes equals the input. For a negative voltage across burden resistor RB1, the situation is reversed. The output of non-inverting amplifier U3B is driven to ground, preventing D6 from conducting, while the output of inverting amplifier U3A maintains the voltage at the cathode of D5 at the level of the input, but with the opposite (positive) polarity.

The output of the full-wave rectifier circuits 204 are connected directly to the microcomputer's 123 analog input channels PED-2. Capacitors C37-39 help filter the microcomputer's analog inputs for improved conversion results. Capacitors C7-9 filter the $V_{analog}$ supply of power to the operational amplifiers. The actual sampling and A/D conversion are performed by the microcomputer 123 internally.

Reference-switching voltage circuit 302 includes divider resistors RN5 and R92, capacitor C31 and field-effect transistor (FET) Q1. Microcomputer 123 PORT A bit 3 pin PA3 selects the reference voltage to be applied to the $V_{ss}$ pin (voltage reference high). When PA3 is low, the FET is turned off, preventing current from flowing through RN5, thereby applying a reference voltage of 5 V at $V_{ss}$. When PA3 goes high, turning Q1 on, a voltage divider is formed by resistors RN5, R92. The 1:1 resistance ratio results in a voltage of 2.5 V at $V_{ss}$. The voltage at the $V_{ss}$ pin is the maximum analog voltage that the A/D converter 207 will convert. The value of the least significant bit (LSB) of an A/D conversion is $V_{ss}$/256. For $V_{ss}=5$ V, the LSB is worth 19.5 mV; for $V_{ss}=2.5$ V, the LSB is worth 9.76 mV. Thus, by switching the reference, more accurate conversions are possible at lower input current levels.

Local and remote input commands and conditions are read by microcomputer 123 over its PORT C pins PC0-7. Before inputs are read, bidirectional PORT C is configured as an input port and enables one of two tri-state inverting buffers U9 and U10 via PORT B lines PB6 and PB5. Buffer U10 buffers all but one of the local input commands. In the preferred embodiment, the local commands are entered by means of push buttons PB1-7 situated on the front of the physical package containing microcomputer 123. Push buttons PB1-6 are connected electrically between the ground reference and the inputs of buffer U10, so that when a push button is depressed, its associated input of buffer U10 is connected to ground through one of push buttons PB1-6. The inputs are pulled high to 5 V through resistor network RN4, so that a relaxed push button results in a logic high at the input of the buffer. A logic low on pins OS1-2 from PB5 activates the outputs of buffer U10, allowing it to drive the PORT C bus. Because the buffer inverts its inputs, a depressed push button causes a logic high at the appropriate PORT C input. A logic high on OS1-2 from PB5 disables the outputs of the buffer, making them high-impedance outputs. Capacitors C18-24 help debounce the push buttons by shunting the high frequencies results from switch bounce to ground.

Buffer U9 handles the PB7 push button and four remote AC inputs. Remote AC inputs are generally contacts or push buttons connected between a source of AC power and terminals labeled AC INPUT1-4 on terminal block TB1. When a remote contact is closed or a remote push button depressed, an alternating current flows through the associated input of four-channel optocoupler U15. Resistors R74, R76, R78, and R80, connected in series with the inputs, limit the input current. Diodes D11-14 provide current paths during the negative half-cycles of the AC input current. Each section of optocoupler U15 is effectively an isolated half-wave rectifier. The output of each for a closed contact or push button is a zero-to-five-volt square wave at the line frequency (50 Hz or 60 Hz). The output for an open contact or push button is an open collector pulled high to 5 V by its output pull-up resistor—one of the four resistors from resistor network RN4 connected from the 5 V supply voltage and the open collector outputs of the optocoupler U15. Each of the four outputs is applied to an input of buffer U9. A spare input to the six-input buffer U9 is provided by the pull-up resistor from network RN6 connected between the 5 V potential and input pin 12. Push button PB7 is connected to buffer U9 just as PB1 is connected to buffer U10. Microcomputer 123 reads the remote AC inputs and the TEST/RESET push button by enabling the tri-state outputs of U9 with a logic low at pins OE1-2 from PB6. The outputs of buffer U9 are disabled with a logic high at pins OE1-2.

To prevent contention on the PORT C bus, the program makes sure that no more than one buffer is active on the PORT C bus at any time and that PORT C is configured as an input while any buffer's output is active. The command input circuit is expandable to more inputs by connecting more buffers to the PORT C bus and unused PORT B lines to the enable pins OS1-2 of the additional buffers.

In addition to reading the local and remote inputs, bidirectional PORT C also controls coil drivers and status indicators. When PORT C is configured as an output, data written to it can be latched into one of two eight-bit latches U6 and U8 by a rising edge on the respective CK input of the latch. A rising edge on PB3, which is connected to the CK input of U6, latches the data on PORT C into U6. A rising edge on PB4 performs the same function for latch U8. The outputs of the latches control seven-channel driver chips U5, U7, and U11. A high logic level at a driver input causes the driver to conduct, turning on the device connected to it. The output of each driver channel is the collector of an NPN transistor with its emitter grounded. The circuit is expandable to more outputs by connecting more output latches to the PORT C bus and unused PORT B lines to the clock inputs CK of the additional latches.

Status indicators, such as light-emitting diodes LED-1-14, are driven by drivers U5 and U7. Each LED, except LED7, is driven by an individual driver channel. LED7, serving in the preferred embodiment as a general fault indicator is connected so that it turns on if LED1, LED2, LED4, or LED5 turns on. To turn on LED1, for example, the microcomputer latches a logic high on PORT C pin PC2 into input D6 of latch U6 with a rising edge on PB3. The high logic level latched to the output of U6 turns on the associated driver channel of driver U5, causing its output transistor to sink current from the source of 12 VDC through a current limiting resistor R34. As a result, LED1 and LED7 are illuminated.

The operation of LED2, LED4, and LED5 is similar. LED3, LED6, and LED11 are also driven by driver U5, but are not connected to LED7. Current limiting resistors R50, R51, and R53 limit the currents in LED3, LED6, and LED11, respectively. Three LED12-14 are driven in a manner similar to LED11, except by means of driver U7, latch US, and a latching signal from PB4. Resistors R55-57 are the associated current limiting resistors. Three LEDs LED8-10 share a common current limiting resistor R52, because, in the preferred embodiment, only one of the three LEDs is typically on at a time. Provisions for a remote alarm indication in the event LED4 is turned on are made by connecting the output of the driver channel in U5 that drives LED4 to the TB1 terminal labeled REMOTE ALARM. A remote DC coil connected between REMOTE ALARM and the TB1 terminal labeled +12 V will be actuated whenever LED4 is turned on. A diode D19 and a metal-oxide varistor MN4 protect the driver from high voltage transients generated remotely, such as by inductive kick from the coil.

Microcomputer 123 can also drive remote contractor coils 104, 106 and 108 with latches U6 and U8, drivers U5, U7, and U11, and a coil driver circuit comprising optically-isolated triac drivers U12-14, triacs TR1-3, resistors R65-73, and capacitors C25-27. The coil driver circuit comprises three identical sections capable of independently actuating motor contractor coils 104, 106 and 108 connected to the circuit between TB1 terminals OUT1-3 and RETURN.

Consider the operation of the coil driver driving the coil connected to OUT1. Microcomputer 123 energizes remote coil 104 by latching a logic high at the output of latch U8 with a rising edge on PB4 and a logic high on PC1. The high at the output of the latch turns on the associated channel of driver U5, forward-biasing the LED in triac driver U14, which causes its internal triac to conduct and provide gate current to output triac TR3. The gate drive triggers TR3 which energizes motor contractor coil 104. Resistor R72 limits the triac driver's ON current. Resistor R71 and capacitor C27 form a snubber network for the output triac to suppress high transient voltages that may occur upon switching.

The RxD and TxD pins PD0 and PD1 of microcomputer 123 are the input and output pins of the serial communications interface (SCI). The two lines are routed to external communications devices over a connector J1. The RxD and TxD lines, along with the +5 V and ground connections on connector J1, constitute a minimum configuration for one end of asynchronous serial communications link 127 (FIG. 1). For those applications requiring devices such as line drivers and receivers or optical isolators due to physical demands, such as long distance transmission or noisy environment, the requisite circuitry can be added external to the unit containing microcomputer 123, thereby eliminating unnecessary cost in those applications not requiring the additional circuitry.

The other end of communications link 127 is a similar RxD and TxD pair of serial outputs and inputs from an external communications device 125. The two ends are typically connected through a multiple-conductor cable via J1. Data is transmitted serially from microcomputer 123 to external communications device 125 from PD1 (TxD); and serial data is received by microcomputer 123 from external communications device 125 through PD0 (RxD). The rate of serial data transfer (baud rate) is set by the operating program.

External communications device 125 can send control commands to the motor control and protection system. Besides sending commands, external communications device 125, like the set/display device 119 (discussed below), may set motor control and protection parameters. Furthermore, external communications device 125 may read various operating conditions transmitted by the microcomputer 123 over communications link 127. In addition to the display quantities and the settings of Table 1, the status of the indicator LEDs is transmitted by microcomputer 123 over the communications link 127. External device 125 must be programmed to communicate using the communications protocol programmed in microcomputer 123 and to translate the received data from the transmitted format into a format meaningful to the user of the data.

Another function of external communications device 125 is sending the code representing the Boolean motor starter equations to microcomputer 123. The MC68HC11 was chosen as the preferred embodiment of microcomputer 123 due to its 512 bytes of on-board EEPROM. Memory of the EEPROM type has the special characteristics of non-volatility (i.e., the contents of EEPROM do not change when power is removed, eliminating the need for expensive batter backup schemes) and electrical erasability and programmability (i.e.,contents of EEPROM can be altered in-circuit, without using external erasing devices, such as ultraviolet lamps). Further advantages of the particular EEPROM cell in the MC68HC11 are that program code can be executed out of the cell and that the cell's size (512 bytes) can hold the required amount of code.

Program code and constants common to all applications are stored permanently in the masked ROM portion of microcomputer 123 memory. Program code implementing the set of Boolean equations developed for a given motor starter type is stored in the microcomputer's EEPROM. It is the EEPROM that gives the preferred embodiment its versatility. A single hardware configuration can operate as any one of many motor starter types. Serial communications link 127 permits transfer of the program code implementing the Boolean equations peculiar to the application to the EEPROM. The step of transferring the code, while usually performed by the manufacturer of the motor control and protection system at his own factory, may also be performed by a user outfitted with external communications device 125 programmed for the task.

Certain variables frequently updated by the operating program must be saved in the event of a loss of power to microcomputer 123. Examples of such variables are the elapsed running time on motor 101, the number of motor starts, and the number of overload trips. A powerfail detection and reset circuit 121 anticipates a power failure, notifying the microcomputer by driving its IRQ pin to a logic low level. The low-going transition at IRQ generates a microcomputer interrupt that vectors program execution to a routine that begins saving the variables in EEPROM. If the power failure persists, the circuit eventually applies a logic low level at the RESET pin of microcomputer 123, causing it to reset.

Figure 3D:
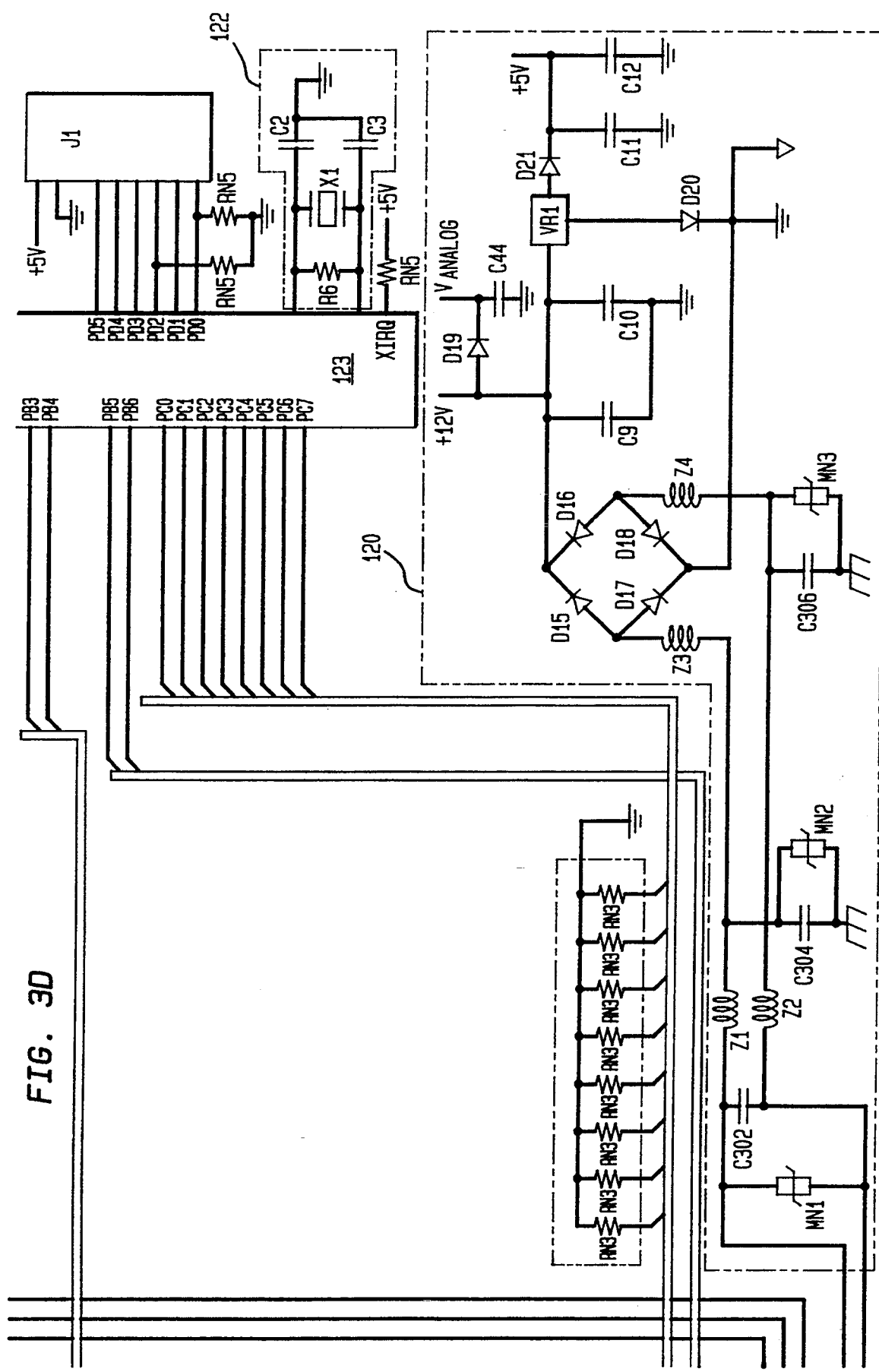
Figure 4:
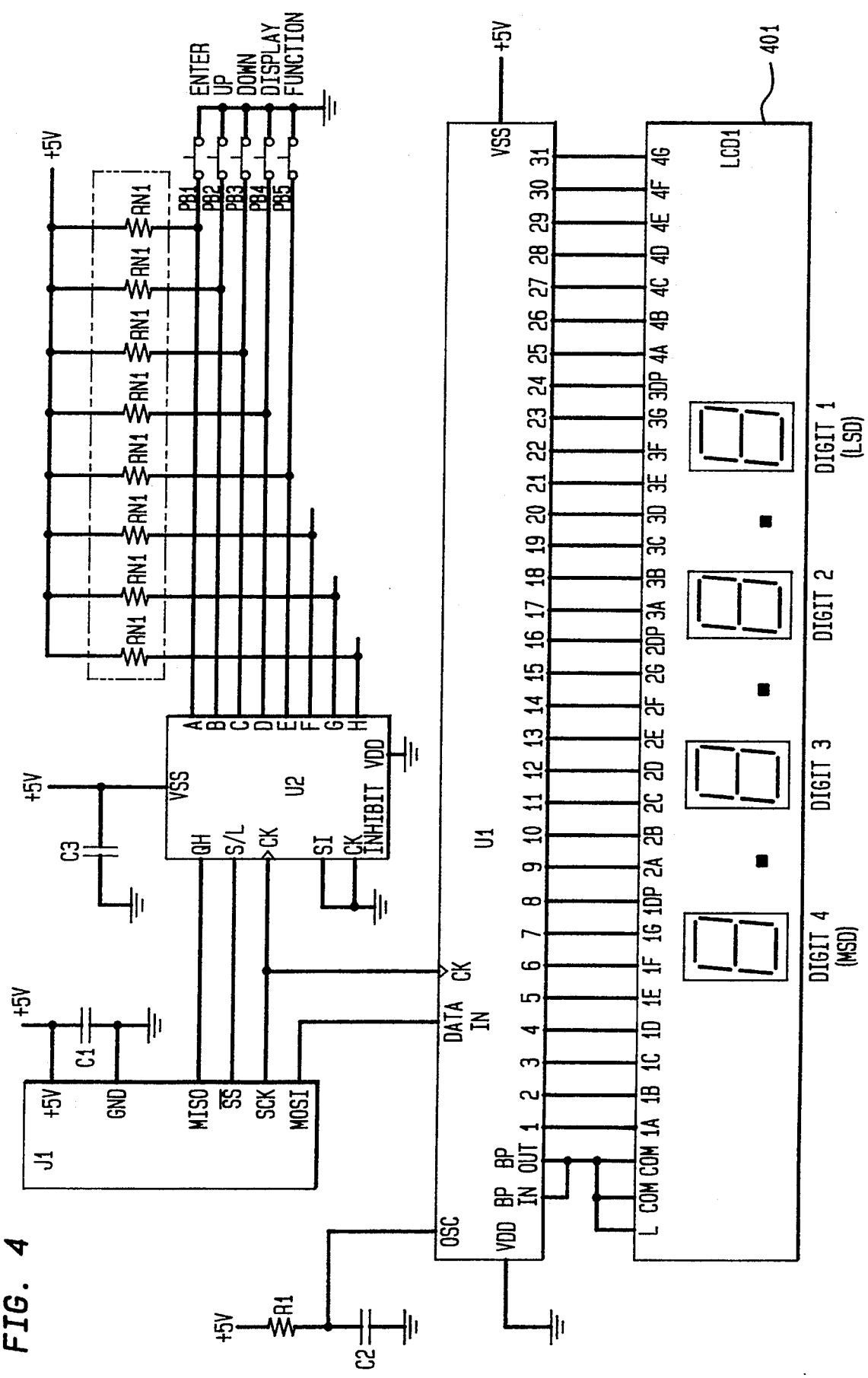
FIG. 4 is a circuit diagram of a preferred embodiment of a set/display device.

Microcomputer pins PD2-5 are the serial peripheral interface (SPI) through which parameter set/display device 119 is controlled. Electrical connection between microcomputer 123 and the set/display device 119 is made through connector J1 in FIG. 3D and associated connector J1 (FIG. 4). The SPI is an asynchronous serial communications interface with microcomputer 123 as the master controller and set/display device 119 as the slave. Data is transferred bit by bit between the master and the slave in eight-bit chunks. As one bit is shifted out of the master into the slave, one bit is shifted out of the slave into the master. During the shifting of bits, microcomputer 123 outputs the SPI shift clock signal SCK from PD4.

Referring again to FIG. 1, various motor and starter parameters may be entered manually and various status data displayed using a parameter set/display device 119. Device 119 can take the form of a hand held unit. In the preferred embodiment, device 119 is a passive device external to the physical package containing the microcomputer 123. Because device 119 includes no power source and no inherent intelligence, it must be connected to the microcomputer unit via connector J1 (FIGS. 3D & 4) to operate. The microcomputer unit serves as a master controller for device 119. Because device 119 is portable, it may be used with any master controller. Thus, in an application requiring a number of motor control and protection systems, only one device 119 is needed, resulting in a cost savings. Furthermore, such a device is a convenient means of permitting a user to change motor protection parameters and to monitor certain operating conditions. As illustrated in FIG. 4, device 119 includes a four-character liquid crystal display (LCD) 401 and a five-button keypad PB1–PB5 in a small hand-held enclosure (not shown). Device 119 is controlled by microcomputer 123 over its serial peripheral interface, a synchronous data transfer PORT D, pins 2–5.

Referring to FIG. 4, push buttons PB1–5 are connected between ground potential and individual inputs of an eight-bit parallel-in-serial-out shift register U2. All of the inputs are pulled high to +5 V through individual resistors in a resistor network RN1. The status of the push buttons is latched into U2 by a logic high at the S/L input from microcomputer's 123 ss pin PD5. A depressed push button causes a logic low at the input, while a relaxed push button results in a logic high. Extra inputs F, G, and H, are pulled high. The eight input logic levels latched into U2, representing the status of the push buttons, are shifted out of pin $Q_n$ by raising S/L high and activating the shift clock SCK. Eight clock cycles shift the contents of the output shift register of U2 into the microcomputer's 123 SPI data register. The bits are shifted starting with input H and ending with input A. Thus, the first three bits shifted in are always high as long as the set/display device is connected. Because microcomputer's 123 MISO input, PD2 in FIG. 3D, is pulled low through a resistor from resistor network RN5 in FIG. 3D, eight consecutive low bits are read if device 119 is not connected. Microcomputer 123 can tell whether or not device 119 is connected from the states of the first three bits received.

While the push button status is shifted into the SPI data register through the MISO input, display data are shifted out to a liquid-crystal display (LCD) driver U1 through the MOS1 output, PD3 in FIG. 3D. The LCD driver contains a 35-bit input shift register. The first bit shifted in is always a logic high—the start bit. When the 36th bit is shifted in, the start bit is shifted out of the input shift register, loading the following 33 bits into the display latch of U1 to display the selected characters and clearing the shift register. The outputs of the LCD driver are connected to individual segments of a four-character, seven-segment LCD (LCD1). The 35 output bits include four characters by seven segments, three decimal point bits, and four trailing null bits. The LCD's backplane is driven from the driver's BP OUT pin. A resistor R1 and a capacitor C2 determine the frequency of the backplane oscillator internal to the LDC driver.

Power to drive the components on set/display device 119 is derived from pins 1 and 2, labeled +5 V and GND on connector J1. A capacitor C1 reduces noise that may appear on the 5 V power lines. A capacitor C3 is a by-pass capacitor for U2.

Table 1 lists function inputs, the description of each function input and the setting range for each function input.

TABLE 1

| FUNCTION | DESCRIPTION | SETTING RANGE |
| --- | --- | --- |
| F1 | DISPLAY CONTROL CIRCUIT NUMBER | 0-9999 |
| F2 | DISPLAY NEMA SIZE | $1_A$, $1_B$, $1_C$, 2, $2_A$, $2_B$, 3, 4, 5, 6 |

TABLE 1-continued

| FUNCTION | DESCRIPTION | SETTING RANGE |
| --- | --- | --- |
| F3 | DISPLAY NEMA SIZE FOR LOW SPEED FOR A 2-SPEED MOTOR | $1_A$, $1_B$, $1_C$, 2, 3, 4, 5, 6 |
| F4 | FULL LOAD CURRENT FOR OVERLOAD RELAY #1 | 0.3–540 amperes |
| F5 | FULL LOAD CURRENT FOR OVERLOAD RELAY #2 | 0.3–540 amperes |
| F6 | SERVICE FACTOR | 1.0 or 1.15 |
| F7 | OVERLOAD TRIP CLASS | 2–23, with 1 second increments |
| F8 | AUTO RESET | ON/OFF |
| F9 | PHASE UNBALANCE PROTECTION | ON/OFF |
| F10 | DISPLAY TIME TO RESET | Variable according to motor size |
| F11 | ALLOW EMERGENCY RESTART | ON/OFF |
| F12 | GROUND FAULT INTERRUPT (GFI) | ON/OFF ground fault interrupt |
| F13 | TIMER #1 | 0–200, with 1 second increments |
| F14 | TIMER #2 | 0–200 with 1 second increments |
| F15 | DISPLAY LOAD CURRENT | .3–540 amperes |
| F16 | DISPLAY LAST TRIP CURRENT | .3–5400 amperes |
| F17 | DISPLAY PERCENTAGE CURRENT UNBALANCE | Percentage |
| F18 | DISPLAY MOTOR ELAPSED TIME | Up to 65535 hours |
| F19 | DISPLAY OF MOTOR STARTS | Up to 6553 |
| F20 | DISPLAY OF OVERLOAD TRIPS | Up to 6553 |
| F21 | RESET MOTOR DATA TO ZERO (F17, F18, F19) | ON/OFF |
| F22 | SET PROCESS CURRENT WARNING | Up to 100% of fully load current |
| F23 | JAM PROTECTION | ON/OFF |
| F24 | LOSS OF LOAD | Warning/ Protection |
| F25 | DISPLAY ACCUMULATED THERMAL MEMORY | Up to 250% of the temperature of the winding at full load current increments |

Microcomputer 123 carries out its designated functions by executing instructions from the operating program, stored in its memory. The program is illustrated in block diagram form in FIG. 5, and can be written in the assembly language of the MC68HC11. Alternatively, only portions of the program can be written in the assembly language, with the remainder being written in the high-level 'C' language to minimize software development time.

The operating program comprises nine interrupt service routines, one background routine, and two short routines that run on reset. Five of the interrupt routines run at regular intervals, as scheduled using the MC68HC11's programmable timer, a 16-bit timer that permits the timing of events from 0.008 ms to 524.288 ms. Interrupts, for example, are scheduled using the timer in conjunction with output compare registers TOC1–5. The five timed interrupt routines, in order of priority, are:

1. isr_ad (A/D conversion routine for the load currents)
2. isr_inputs (Input scan routine)
3. isr_hand (Set/display device input/output routine)
4. isr_eesave (EEPROM update during powerfail)
5. isr_timer (Long-term timer routine)

A sixth interrupt routine (isr_eeupdate) compares the parameter setpoint images in EEPROM with the actual values in RAM and updates the EEPROM as required. The routine is bid by the realtime clock interrupt.

A seventh interrupt routine (isr_shutdown) attempts an orderly shutdown in the event of a fault in the microcomputer, or central processing unit (CPU). An interrupt is generated, which vectors program execution to the shutdown routine, under any of the following conditions.

1. CPU watchdog timeout.
2. CPU clock failure.
3. Illegal opcode trap.

The routine sets the CPU and FAULT flag bits for the background task's fault logic.

An eighth interrupt routine (isr_powerfail) is bid by an external interrupt generated whenever the 12 Vdc power supply voltage drops below about 9 V. The powerfail routine starts the EEPROM update routine (isr_eesave). If, after the EEPROM is updated, the control voltage remains below 9 V, isr eesave sets the FAULT bit for the background task's fault logic. If the control voltage has recovered, standard program execution continues uninterrupted.

A ninth interrupt routine (isr_sci) handles asynchronous serial communications with external devices. The routine is bid by interrupts generated by the SCI system upon various transmit and receive conditions.

Unless explicitly unmasked in one of the interrupt routines, neither the timed interrupt sources, the SCI interrupt, nor the external powerfail interrupt will interrupt the execution of the executing interrupt routine, regardless of the priority of the executing interrupt routine or of the interrupting source.

The background routine (main) continuously loops approximately once every 50 ms, processing data passed to it by the interrupt routines and responding appropriately. Whenever an interrupt routine is not being serviced, main is actively being executed. Upon a power-up reset, main initializes the stack pointer and configures the ports and registers of microcomputer 123 before activating the background loop. The loop handles the following:

1. Initialization upon reset (initializes the internal registers and variables, configures the CPU timers, kicks off the timed interrupt system, primes the SPI, starts the A/D conversion process, and turns the READY LED on) (step 502).
2. Logic solution (handles fault conditions and translates the push button and remote inputs into appropriate outputs) (step 504).
3. Set/display device (changes and retrieves data as requested or needed by the isr_hand interrupt service routine) (step 506).
4. Serial communications messages (processes setpoint changes received over the serial communications link and formats for transmission messages bid regularly by isr_timer) (step 508).
5. Motor protection calculations (solution of the motor model, ground fault protection and intermediate protection (step 510).

Each of the background tasks is usually bid by an interrupt service routine, which sets a calling flag upon detection of an appropriate calling condition. The flag is usually cleared by the background task upon completion of this execution or disappearance of the calling condition.

After a power-up reset, the first routine to run after the two brief reset routines is main (step This routine first takes care of some housekeeping chores before execution reaches the background loop. The loop is a circular sequence of tasks. Each task is executed in order as long as its calling bit is set. If a task's calling bit is not set, the task is skipped and the next task's calling bit is checked. After the last task is executed or skipped, the first task's calling bit is checked, completing the loop. All the background tasks may normally be interrupted by any source. Maskable interrupts can be held off only if interrupts are explicitly disabled in the background program. The most important housekeeping chore performed by main prior to executing the background loop is setting the INITIAL flag bit (step 512) to bid the initialization task to run.

There are two reset routines: .reset (step 516) and .startup (step 518). The 'C' startup routine (.startup) is always inserted in the program by the 'C' linker during program development. The stack pointer is initialized in startup. The routine .main is called as a subroutine from the startup routine. Because main includes the continuous background loop, execution does not return to the startup routine from .main. Some of the registers in the MC68HC11 must be written to within the first 64 E-clock cycles after power-up or not at all. The code to do this, written in assembly language and labeled .reset, is vectored to upon power-up reset. After initializing (step 520) the appropriate registers as required, the routine causes execution to jump to the 'C' startup routine.

Figure 6A:
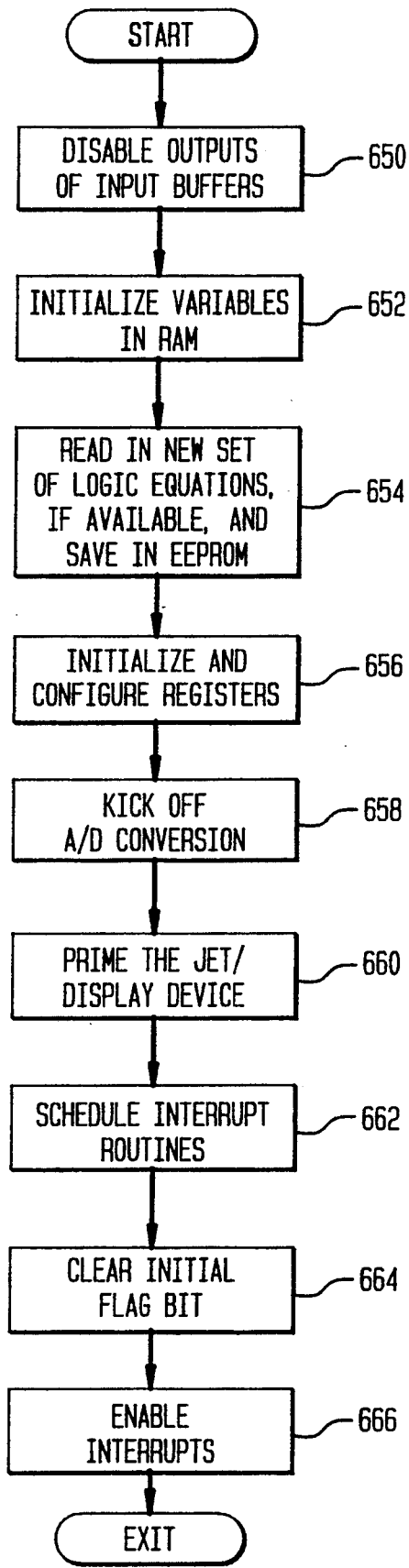

The routine main includes the background loop, as shown in the flowchart of FIG. 5. Main is entered upon a power-up reset by being called from the 'C' startup routine. Main first sets the INITIAL flag to bid the initialization task, shown in the flowchart of FIG. 6A, to run. After setting the INITIAL flag, execution proceeds to the background loop.

First, the background loop checks the INITIAL flag (step 522). If the INITIAL flag is set, which occurs after a power-up reset, the initialization task runs. After first disabling the outputs (step 650) of the hardware input buffers U9 and U10 in FIG. 3D, the task initializes certain variables in RAM (step 652) either to constants stored in ROM, to zero, or to values saved in EEPROM. Examples of variables initialized to values saved in EEPROM include the setpoints, the elapsed run time of the motor, the number of motor starts, and the number of overload trips. By way of a more specific example, the values used in the motor model simulation routine (discussed in detail below) are initialized as follows:

INITIALIZATION OF VALUES FOR NORMALIZING $T_o = 1°$ C.
$t_o = 1$ sec
$I_o = 1$ A
$R_o = 1°$ C./W
$C_o = 1$ Wsec/°C.
$P_o = 1$ W

INITIALIZATION OF MOTOR MODEL PARAMETERS AND VALUES $t = 0$
$TW = 0$
$Th = 0$
$P_1 = 0$
$P_2 = 0$
$P = 36\, P_o$
$T_w\text{restart} = 80\, T_o$
$T_h\text{trip} = 60\, T_o$
$T_h\text{flc} = 50\, T_o$
$R_w = 30\, R_o$
$R_h = 50\, R_o$
$C_w = 5.14\, C_o$
$C_h = C_o/R_h * 7 + 53\, (1 - e^{0.01}\, (I_{flc}/I_o))$
$T_w\text{flc} = 80\, T_o$
$T_w\text{max} = 140\, T_o$ The task also sends out over the SCI a message requesting an external communications device to transmit logic equation code to reconfigure the application. If the external device does not respond, the configuration remains as it is. If the device responds by transmitting new logic equation code, the task reads the new code and programs it into EEPROM (step 654). The task then configures the microcomputer's 123 internal registers (step 656) for the desired operation. Examples include enabling the SPI and setting its shift clock rate, setting the realtime clock rate, unmasking the programmable timer and realtime clock interrupt flags, and turning on the READY LED, LED11, indicating microcomputer 123 is running. Then the A/D conversion 207 system is activated (step 658) and its interrupt routine scheduled (step 662). Before clearing the calling flag INITIAL (step 664) and enabling the timed interrupt system (step 666), the task primes the SPI that controls set/display device 119 (step 660). The initialization task is then executed.

After a new set of readings of input commands is made, interrupt service routine isr_inputs sets the calling flag SOLVE to bid the logic solution task to run. If the SOLVE flag bit is set (step 524), the logic solution translates local push button, remote contact, and input commands received over the communications link into LED indicator and coil driver outputs.

The program code for all inputs and outputs that are not common to all motor starter applications contemplated is stored in the microcomputer's EEPROM. Code common to all applications is stored in ROM. The code stored in EEPROM is executable code implementing the Boolean logic equations for the particular application and written in assembly language to conserve memory space.

Figure 6B:
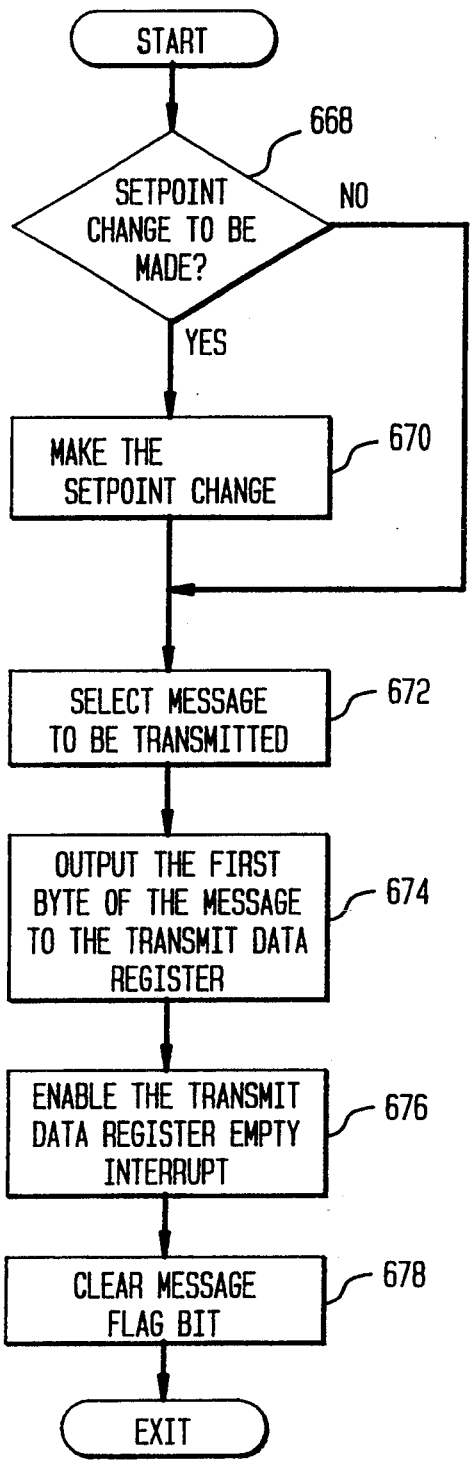

The message processing task (step 508), as shown in FIG. 6B, allows setpoints to be changed using device 119 or device 125, and data to be transferred. When a setpoint change is to be made (step 668), microprocessor 123 memory is revised with the new setpoint data (step 670). If a message flag is set (step 523), the appropriate message is selected (step 672), and transmitted byte-by-byte (steps 674 and 676). After transmission of a complete message, the message flag bit is cleared (step 678).

Figure 6C:
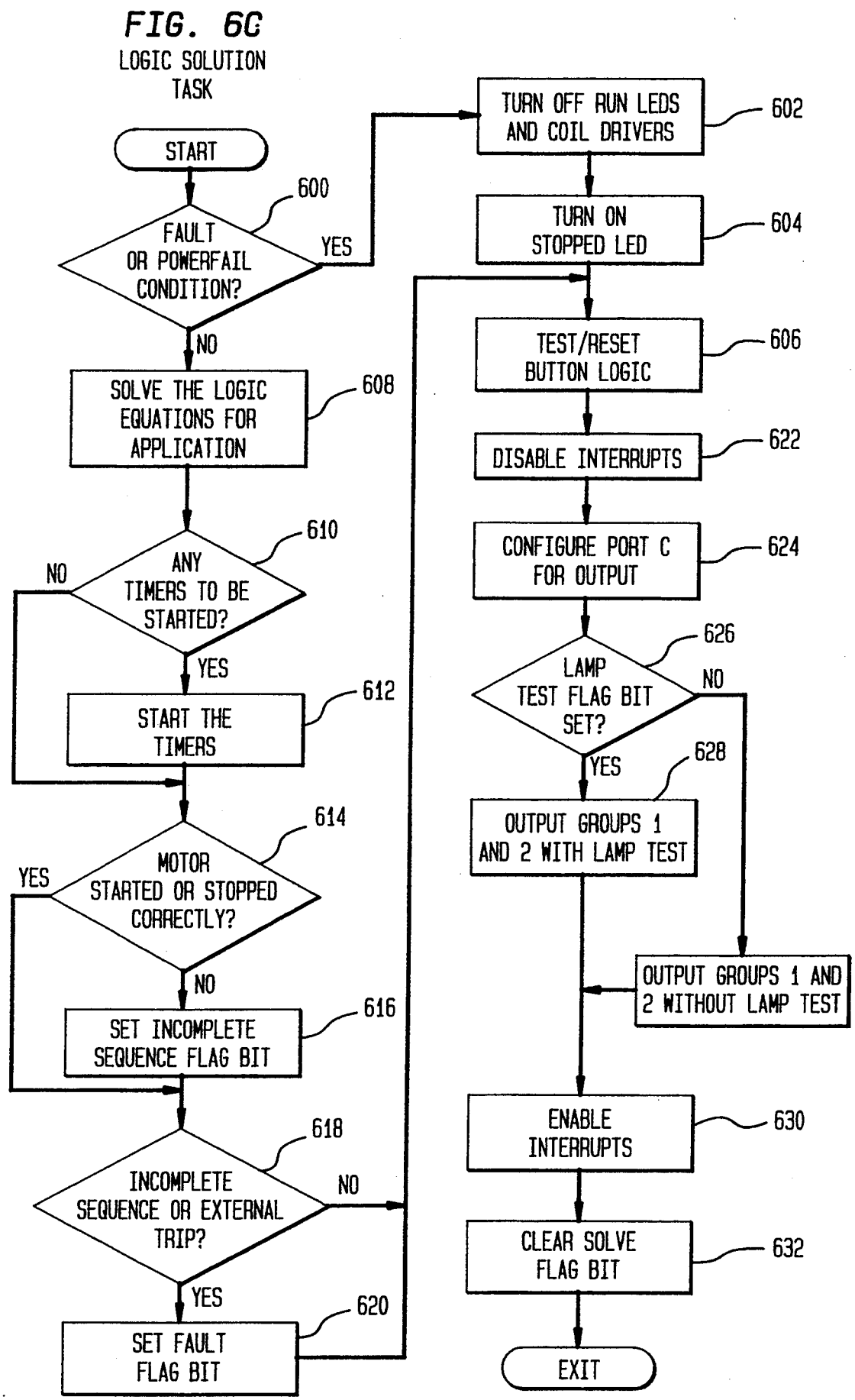

The logic solution task (step 504), as shown in FIG. 6C, first checks the FAULT and POWERFAIL flags (step 600) to see whether a fault or an imminent power-fail condition exists. If so, the LEDs and coil drivers are turned off (step 602) and the STOPPED LED turned on (step 604), and execution proceeds to the TEST/RESET push button logic (step 606). If not, the Boolean logic equations for the particular application are solved (step 608). The logic equation code, stored in EEPROM, is executed as a subroutine called from the logic solution task. The subroutine does most of the translation from inputs to outputs. The triggering of certain timing functions (step 610), such as a transition timer and an incomplete sequence timer for reduced-voltage starters, externally settable timer #1, and externally settable timer #2, is handled by the logic equation code. Because all four timers mentioned are started by control commands or motor events, the logic equation program decides when the timers should start and what action to take when they time out. The program sets a flag bit corresponding to the timer to be started. Execution returns from the logic equation code in EEPROM to the common logic solution code in ROM.

The flag bits to start the timers are checked. If any is set, the program starts the timer (step 612) by setting the appropriate timer active flag bit and the timeout time. The long-term timer interrupt routine isr—timer handles the timing. The logic 'solution task then checks to make sure that motor start and stop commands were executed correctly (step 614). If a stopped motor is commanded to start, load current should be detected within one second. If motor current is not detected, the program sets the incomplete sequence IS flag bit (step 616). If motor current is detected, the number of starts, which is an important factor of the life related to contacts 103, is incremented. The number of starts is available for monitoring through function F18 (see Table 1) of set/display device 119. On the other hand, if a running motor is commanded to stop and load current does not drop to zero within one second, the IS flag bit is set. After checking for these start/stop faults, the task checks for the occurrence of incomplete sequences or external trips by testing the IS and EXT flag bits (step 618). The IS flag may be set by the logic equation code upon unsuccessful completion of the transition in reduced-voltage starter applications or as just described for start/stop faults. The EXT flag bit is set by the logic equation code for those applications having an external trip input as one of the remote input assignments. If either flag bit is set, the FAULT flag bit is set (step 620), which causes the program to bypass certain normal operations.

The logic solution task next executes the TEST/RESET push button logic (step 606). In the preferred embodiment, push button PB7 is dedicated as the TEST/RESET button. The program uses one of the long-term timers controlled by isr—timer to determine whether the button has been depressed for the class time set in memory, initiating an overload test by setting the OLTEST flag bit. If the TEST/RESET button is released before the timer times out or if the motor is running, the LAMPTST flag bit is set, bidding the lamp test. Another long-term timer is used to time the lamp test, which turns on all the LEDs for two seconds.

The next function performed by the logic solution task is latching the output actions to the LED and coil drivers. The computed outputs are sent via PORT C. To avoid conflicts with the reading of the inputs over bidirectional PORT C, interrupts are first disabled (step 622), which suspends isr—inputs, the routine that reads the inputs. Then PORT C is configured as an output (step 624), and the first output group is written to PORT C and latched into latch U6 with a rising edge on PB3. The procedure is repeated for the second output group with PB4. If the LAMPTST flag bit is set (step 626), the LEDs are turned on (step 628). Interrupts are then re-enabled (step 630) and the calling flag bit SOLVE cleared (step 632).

The set/display task (step 506), Shown in the flowchart of FIG. 6D, is bid to run by the set/display interrupt routine isr—hand. Besides setting the calling flag bit HAND, the interrupt routine sends the background task the latest keystroke entered from set/display device 119 (step 634). The background task detects the set HAND flag bit, decides what action the keystroke requires, and sends to the interrupt routine four bytes representing the four characters to be sent to the set/display device's liquid crystal display.

When the HAND bit is set (step 526), the set/display task controls the sequences displayed on the LCD, makes sure that proper commands are entered, selects the value or message to be displayed on the LCD, and makes setpoint changes as required (steps 636–644). Upon completion, the task clears the calling flag bit HAND.

To make the design of set/display device 119 simple and inexpensive, only five push buttons, labeled FUNCTION, DISPLAY, DOWN, UP, and ENTER, are used. The set/display task controls what is displayed. The use of each push button is best understood from an example, such as enabling or disabling ground fault interrupt (GFI). When connected to microcomputer 123, set/display device 119 displays either a function number from Table 1 or a display or setpoint value for one of the functions. If, for example, the LCD is displaying "F22", meaning that function 22 (loss of load) is ready to be operated on, one of the scroll buttons (UP or DOWN) must be used to scroll to the desired function, F12 (GFI). Scrolling in either direction is possible. If the UP button is pressed, the display changes from "F22" to "F23". If the UP button is held in, the display will change to "F24", then to "F1", then "F2", and so on, scrolling consecutively through the functions. When the displayed function is "F12", the UP button should be released. Depressing the DISPLAY button causes the existing setpoint value to be displayed, in this case it may be ON which represents that GFI is disabled. The displayed value may be incremented or decremented through the possible choices for the particular function (F12) by depressing the UP or DOWN push button, respectively (ON or OFF). For F12, depressing either the UP or DOWN button once will switch GFI from On (existing setpoint) to OFF. At this point the new setpoint can be entered by pressing the ENTER button. If the DISPLAY button is pressed instead, the existing setpoint, "ON" is redisplayed. If the FUNCTION button is pressed, the function, "F12" is displayed. Only if the ENTER button, is pressed with a setpoint value in the display is the setpoint changed. For those functions that merely display some quantity, such as load current, pressing the ENTER push button has no effect. To speed up the process of changing setpoint values, provisions are made for fast scrolling. If the UP or DOWN button is held in, the function or the setpoint selections will be scrolled through at a faster rate. The example shows how the set/display background task controls the setting of various motor parameters and the display of various measured quantities with a minimum of hardware in the set/display device.

Figure 21:
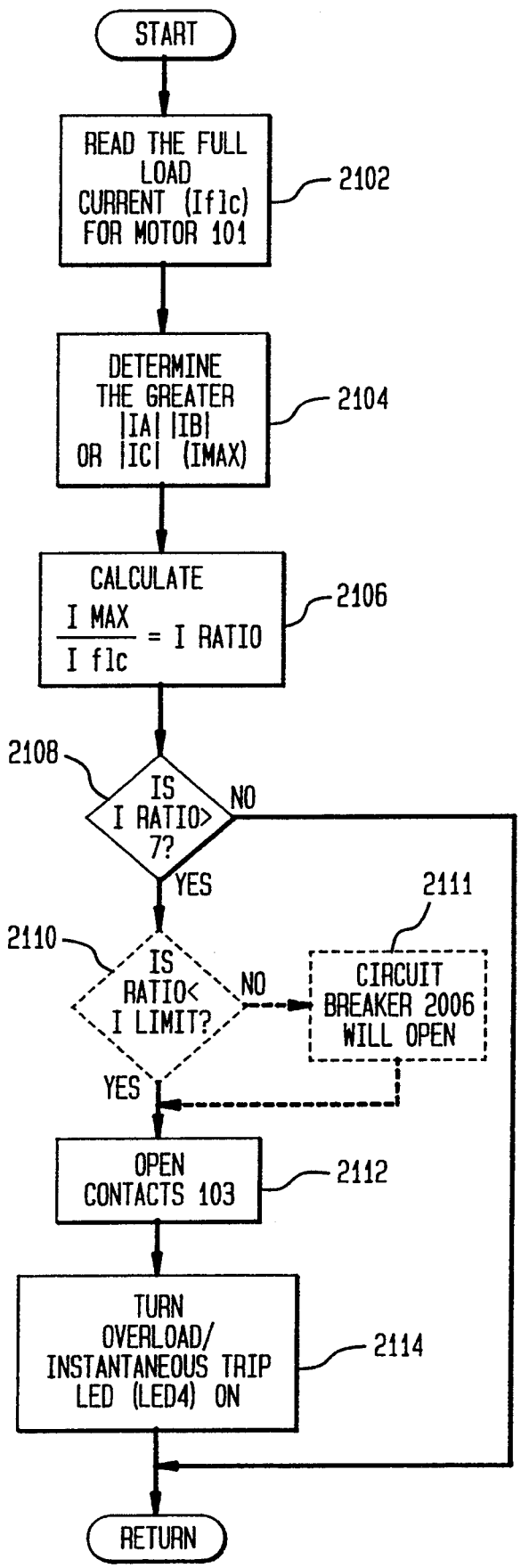
FIG. 21 is a flow chart illustrating the implementation of the intermediate motor protection scheme.
Figure 22A:
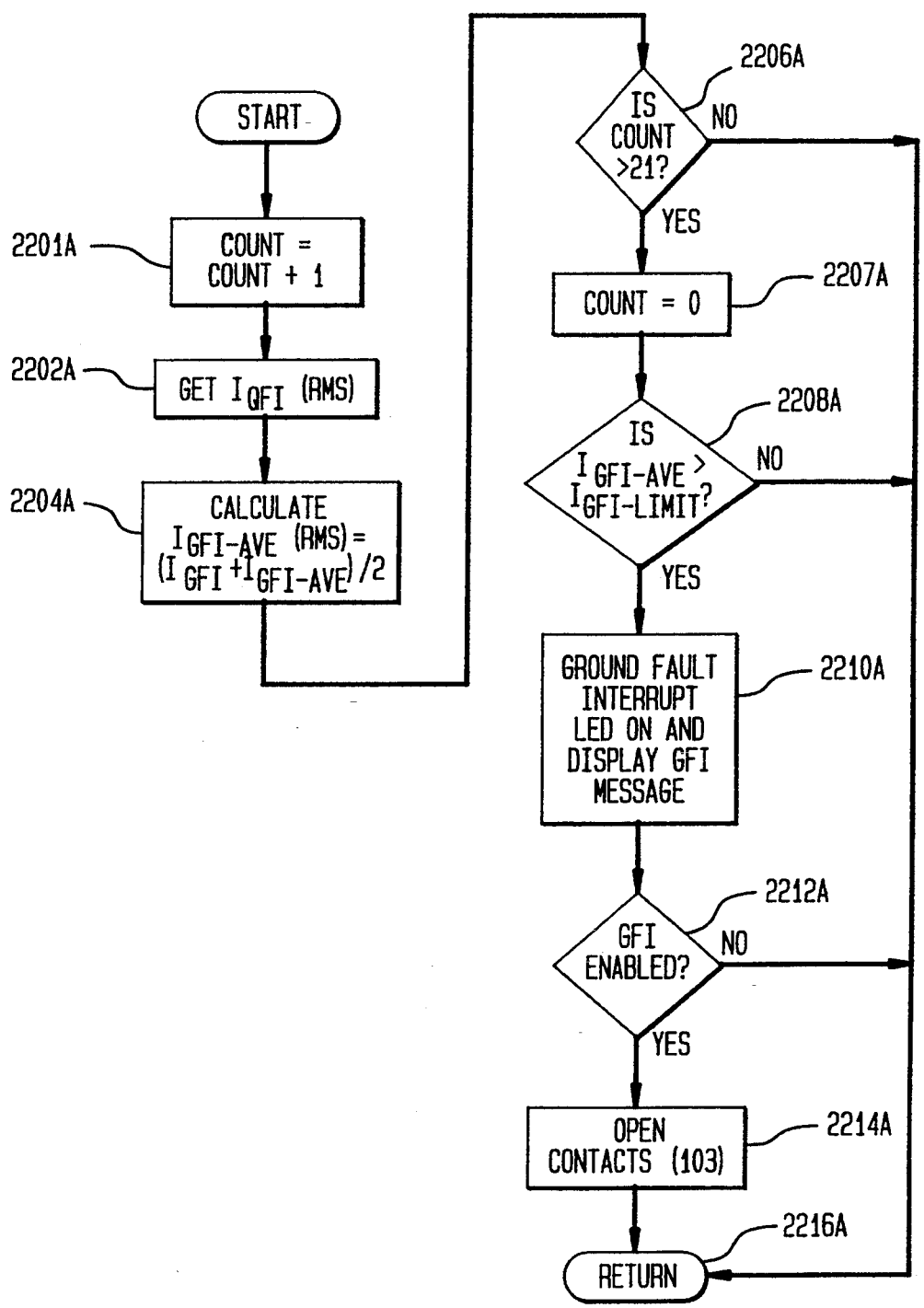
FIG. 22A is a flow chart illustrating a first implementation of the ground fault protection scheme.

At the completion of the set/display task, the background routine calls the motor model simulation routine (FIGS. 18A–E), the intermediate motor protection routine (FIG. 21), and the ground fault interrupt routine (FIG. 22). These routines are run about every 50 ms. These three routines are illustrated and described as separate routines, but could be all combined into one routine such as the motor model simulation routine. At the completion of these three routines, the background routine checks the status of the INITIAL calling bit, restarting the loop.

Figure 7:
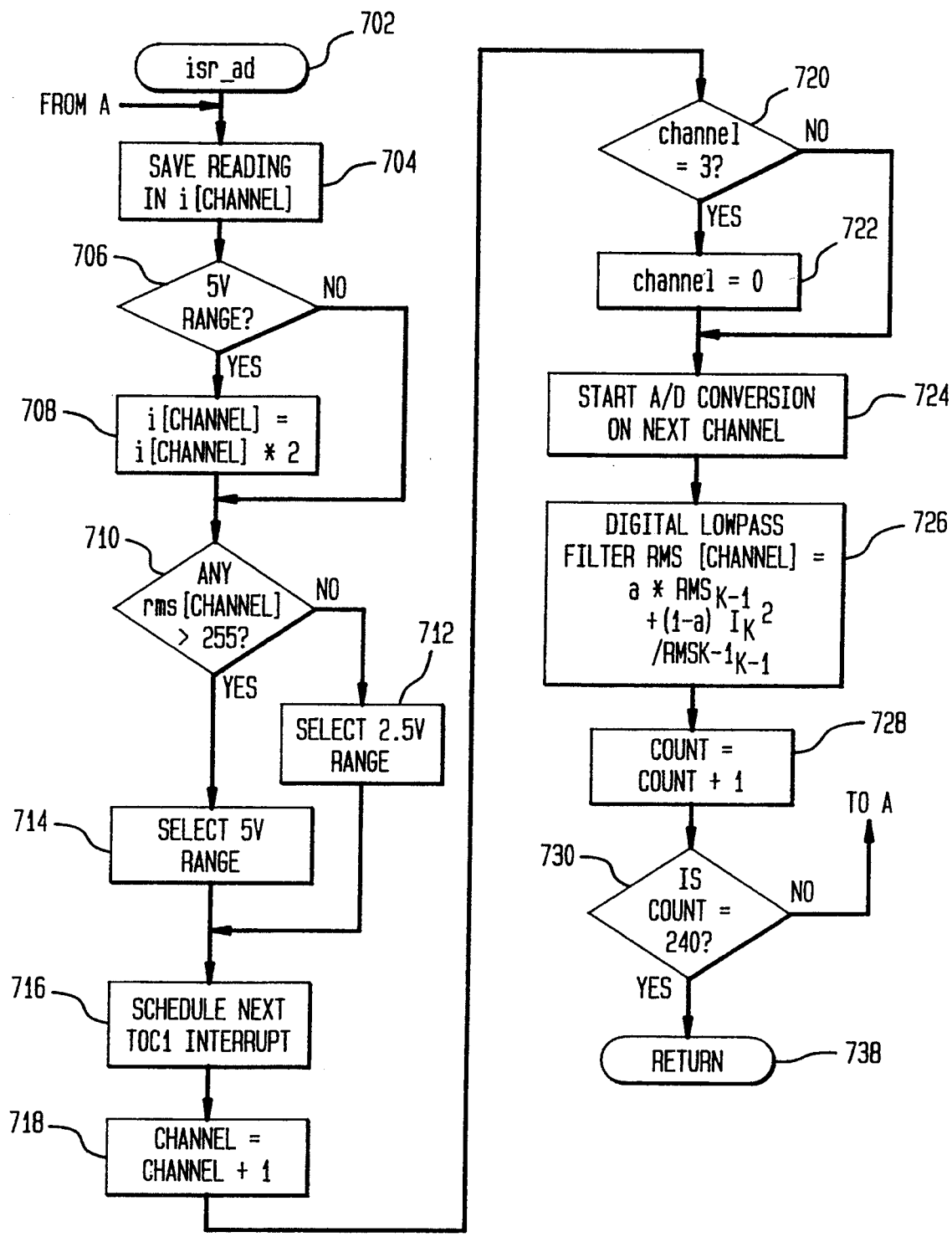

The A–D conversion routine (isr_ad) (step 702) (FIG. 7) runs at a rate of 171 Hz, the sampling frequency selected based on the criteria previously discussed. The MC68HC11's converter is configured for single-channel, non-continuous operation by clearing the SCAN and MULT bits in the A–D control/status register ADCTL. Consequently, upon the completion of each conversion cycle, which is indicated by the microcomputer's setting of the conversion complete flag bit (CCF) in ADCTL, the eight-bit results of the conversions on the selected channel are stored in the A–D result registers ADR1–ADR4.

The routine reschedules itself by means of output compare timer TOC1 to run four times every 1/171 Hz, or every 1.46 ms. Each time the routine runs, one of either voltages representative of the three load currents or the voltage representative of the sum of the three load currents is converted. In other words, each waveform representative of one load current and the waveform representative of the sum is sampled (step 704) at a rate of 171 Hz.

Range switching has been implemented to yield greater accuracy. By switching the reference voltage from 5 V to 2.5 V by means of the range-switching circuit described earlier, greater accuracy is achieved. For a 5 V reference, the LSB is worth 19.5 mV; for a 2.5 V reference, the LSB is worth 9.76 mV. To scale the readings correctly, all readings made with the reference at 5 V (step 706) are multiplied by two (step 708, shifted left once) before being combined with the readings for a 2.5 V reference in the calculation of the RMS values of the load currents and the sum of the load currents.

The criterion for range switching is based on the highest calculated RMS value of the three load currents. If the highest value is greater than 255 binary counts (step 710), which corresponds to a voltage of 2.5 V at the input to the A/D converter, a 5 V reference voltage is needed to prevent saturation of the converter. In such a situation, the routine selects the 5 V reference (step 714) with a logic low at PA3. Otherwise, a 2.5 V reference voltage is selected (step 712) with a logic high.

The A/D converter does not generate an interrupt upon completion of a conversion. The microcomputer marks the completion of a conversion cycle by setting the CCF flag bit in ADCTL. Because a conversion cycle takes about 0.06 ms, it is reasonable to expect the conversion to be complete by the time the isr_ad routine runs again about 1.95 ms later. After reading the converted value, selecting the reference setting, scheduling the next interrupt (step 716), incrementing the channel by 1 (step 718), checking the channel (steps 720 and 722), and starting the next conversion (step 724), isr_ad computes the RMS value for each of the voltages representative of the load currents ($I_A$, $I_B$, $I_C$) and the sum of these currents (step 726). The RMS values are computed according to the difference equation described previously.

Isr_ad is set up to take 60 samples of each channel (240 samples total) before returning (step 738). A counter is set up and incremented every cycle (step 728) until 240 total samples are taken (step 730).

The input scan routine (isr_inputs), whose flowchart is shown in FIG. 8, reads over bidirectional PORT C the local push button and remote contact inputs. Input GROUP 1, which includes the four remote AC inputs and the front panel TEST/RESET push button input, is read by enabling the input buffer, U9, with a logic low on PB6. Input GROUP 2, which comprises the remaining local push button inputs, is read by enabling U10 with a low on PB5. The scan routine alternates between the two groups (step 812), reading one each interrupt. The routine reschedules itself to run with output compare timer TOC2 (step 800), configures PORT C as an input port (step 802), reads one of the two groups on each pass (steps 804–806), deselects the buffers (i.e., returns them to tri-state with a logic high on PB5 and PB6) (step 808), and sets the SOLVE calling flag bit (step 810) to bid the logic solution task to run. The logic solution task is bid to run in the background every other TOC2 interrupt. Thus, the logic equations are solved every time a new reading of all the inputs is completed.

The rate at which isr_inputs runs is determined by two factors. First, the push buttons should be read often enough so that a typical button depression is detected by at least two consecutive readings. Second, the AC inputs must be detectable at both 50 Hz and 60 Hz. The difficulty in detecting an AC input is that the signal out of the optoisolator, U15 in FIG. 3, is a zero-to-five-volt square wave at 50 Hz or 60 Hz when the remote contact or push button is closed. Analysis of 50 Hz and 60 Hz square waves shows that, if sampled every 27.5 ms, at least one of every three consecutive samples is from the zero-volt section of the waveform. The presence of a zero-volt section distinguishes the closed condition from the open condition. Consequently, the interrupt rate for isr_inputs was chosen to be half that, or 13.75 ms.

While the background loop processes inputs from and determines outputs to the set/display device 119, the interrupt service routine isr_hand actually reads in the inputs and sends out the outputs. FIG. 9 is the flowchart of isr_hand. Each time it reads the set/display push buttons, isr_hand simultaneously outputs eight bits to the LCD driver chip, U1 in FIG. 4. The routine reschedules itself to run every 30 ms by means of output compare timer TOC3. The rate is fast enough to update the LCD at a pleasing rate and to scan the push buttons often enough so no depressions are missed.

Set/display device 119 is controlled by the MC68HC11's serial peripheral interface (SPI) with microcomputer 123 as the master and device 119 the slave. Data are shifted out serially over the MOSI line to the LCD driver and shifted in over MISO from the push button's parallel-in-serial-out shift register. A group of eight bits is shifted out at each transfer. Upon completion of the transfer, the eight bits written to the LCD are replaced in the SPI data register by the eight bits shifted in from the push button's shift register.

When the routine begins after a TOC3 interrupt, the SPI data register contains the most recent reading of the push buttons. The interrupt routine first unlatches the shift register (step 900) with a logic low on the S/L input, then schedules the next TOC3 interrupt (step 902). To clear the SPI transfer complete flag bit in the SPI status register SPSR, the SPSR register must first be read. The flag bit is then cleared when the data register SPDR is read (step 904). The contents of the data register represent the set/display push buttons. Furthermore, the three most significant bits of the push button shift register are pulled high. The routine determines whether or not device 119 is connected by checking those three bits (step 906). If they are not read as high, device 119 is presumed to be disconnected, the HAND flag bit is cleared (step 908) and no processing is required. If device 119 is determined to be connected and a button depressed, the calling flag HAND is set (step 910), bidding the background task to process the push button data. The buttons are prioritized in the following order: FUNCTION, DISPLAY, DOWN, UP, ENTER. If more than one button is depressed, only the one with highest priority is processed (step 912).

After reading the input, isr_hand initiates the next data transfer. First, the push buttons are latched into the shift register with a logic high at the S/L input (step 914). The next eight bits to be transferred to the LCD driver are written to the SPI data register (step 916), automatically starting the transfer. The SPI system in microcomputer 123 takes over and shifts out eight bits to the LCD, while shifting in eight bits from the push button shift register (steps 918 and 920). The shifting process is completed long before isr_hand runs again.

One complete output to the LCD driver is five bytes long. The first four bytes comprise a start bit (a logic high), three decimal point bits (high for on), and the four seven-segment character bits. The fifth and final byte is a null byte used to complete the shift in the LCD driver's shift register. The background task formats the first four bytes to be transferred according to the characters to be displayed. The interrupt routine isr_hand adds the start bit and outputs the null byte.

To permit the convenient timing of events that take much longer than the overflow times of the programmable timers inherent in the MC68HC11, the isr_timer interrupt service routine was written. The routine, as shown in the flowchart of FIG. 10, reschedules itself to run every 0.1 s with output timer TOC5 (step 1000). The routine increments a 16-bit programmable timer (rtc_counter) every time it runs (step 1006), i.e., every 0.1 s. Eight compare values (time [0]–time[7]) analogous in operation to the built-in programmable timer and the output compare registers, are available to time eight different events from 0.1 s to 6553.6 s in duration.

To activate a timing sequence, one of the routines sets the timer active bit for the appropriate time value to be compared and sets the time value to the appropriate compare value. If, for example, a two-second event is to be timed using the time[7] compare value, the routine starting the timing sets the timer active bit for timer 7 and loads the timeout time into time[7] by adding the offset time to the current time given by the contents of the timer rtc_counter. In this example, time[7] is set to value of rtc_counter plus 20. The value of 20 is used because two seconds is 20 tenths of a second. Every time the isr_timer runs, every 0.1 s, the rtc_counter is incremented by one (step 1006). If the timer active bit for time[7] is set (step 1008), isr_timer compares the value in time[7] with the value in rtc_counter (step 1010). When the values are equal, the isr_timer routine clears the active bit (step 1014) and sets the timeout bit (step 1012), which can be used by any routine relying on the timeout.

As previously mentioned, eight timers are programmed in accordance with the preferred embodiment. The assignments of the timers are as follows:

time[0]: set/display timer #1
time[1]: set/display timer #2
time[2]: TEST/RESET button timer (used to determine whether the button is depressed for the overload class time)
time[3]: lamp test timer (set for two seconds to time the duration of the lamp test)
time[4]: start/stop fault timer (set for one second to wait before checking the current after the motor is started or stopped); incomplete sequence timer (set for one second after the transition output command is given in reduced-voltage starter applications to make sure the seal-in contact closure indicating a successful transition is made)
time[5]: transition timer for reduced-voltage applications (set after a start command for the time the transition is to be made)
time[6]: motor spin down timer (set to 60 s, the minimum time that must elapse after a motor is stopped before it may be restarted)
time[7]: unassigned The motor elapsed running time is also incremented by isr_timer. As long as the motor is energized (step 1002), the run time is incremented every 0.1 s (step 1004). The elapsed run time can be displayed on device 119 through request function F16 of Table 1. Data messages transmitted over the SCI to an external communications device 125 are scheduled by isr_timer. Each time the routine runs, it sets the calling bit MESSAGE (step 1018), which bids the background task to format another data message for transmission. Finally, the long-term timer routine writes the byte $55, followed by $AA, to the MC68HC11's watchdog timer register COPRST to prevent it from timing out and generating a watchdog timeout interrupt (step 1016). The watchdog is initialized to time out in 262 ms if not reset as described.

The shutdown routine, shown in the flowchart of FIG. 11, runs in the event of any of three interrupt sources: (a) watchdog timeout, (b) clock failure; and (c) illegal opcode trap. Upon the occurrence of any of these events, program execution is vectored to the shutdown routine isr_shutdown, which sets the CPU FAULT bit (step 1100) to turn on the CPU FAULT LED and the FAULT flag bit (step 1102) to bid the background task to stop the motor.

The shutdown routine initiates an orderly shutdown after a CPU malfunction. A watchdog timeout occurs if the isr_timer routine does not reset the watchdog within 262 ms, as it should under normal operating conditions. An illegal opcode trap occurs if program execution gets lost somehow. A clock failure occurs if the crystal clock frequency drops too low. All of these events are unusual and generally indicate a hardware failure in microcomputer 123 or associated circuitry.

Whenever the control voltage drops below about 9 V, the powerfail/reset circuit drives the IRQ pin on microcomputer 123 low, the falling edge generating an interrupt. The IRQ interrupt is serviced by vectoring execution to isr_powerfail, whose flowchart is shown in FIG. 12A. When the powerfail flag bit is set (step 1200), the routine initiates the procedure of saving certain variables in EEPROM in case a loss of power actually ensues by first initializing RAM and EEPROM pointers (step 1202) to the first variable to be saved. The RAM and EEPROM save areas are equal-sized blocks of memory with the variables saved in the same order in each. After initializing the pointers, the routine erases the row (16 bytes) of EEPROM (step 1214) containing the block of variables and schedules, interrupt routine isr_eesave (step 1206), using output compare timer TOC4 to execute 10 ms later. Finally, isr_powerfail sets the PWRFAIL (step 1208) flag bit, indicating to other routines that a loss of power is imminent.

The first time it executes after being scheduled by the powerfail routine, isr_eesave (FIG. 12B) turns off the EEPROM ERASE VOLTAGE AND LATCH (steps 1210 and 1212), copies the byte in RAM pointed to by the RAM pointer into the corresponding EEPROM location pointed to by the EEPROM pointer. Because the EEPROM programming procedure takes 10 ms to program each byte, isr_eesave reschedules itself with TOC4 to run again in 10 ms (step 1220). Each time a byte is programmed from RAM into EEPROM (step 1218), the pointers are incremented so that they point to the next byte to be saved (step 1216). After the last byte is saved (step 1214), PORT A bit 0, which is connected directly to the IRQ pin, is read. If the logic level is still low, indicating that the power supply voltage is still below 9 V (step 1224), isr_eesave sets the CPU FAULT bit (step 1226) and the FAULT flag bit (step 1228) to bid the background fault logic. If the voltage has recovered at the completion of the updating of the EEPROM, the powerfail flag bit is cleared (step 1230) and program execution continues normally. In either case, once the last byte to be saved is programmed into the EEPROM, isr_eesave does not reschedule itself to run.

An image of the motor protection setpoints in RAM is stored in EEPROM. All computations made with the setpoints use the values in RAM. All changes are made to the values in RAM. A special interrupt routine isr_eeupdate, shown in the flowchart of FIG. 13, running independently from the other routines, updates the setpoint image in EEPROM. The routine runs every 16 ms as bid by the realtime clock interrupt and alternates (step 1302) between comparing RAM and EEPROM (step 1304), and programming data from RAM to EEPROM (step 1310). Only in the event of a powerfail condition (step 1300) does the routine dismiss itself from performing operations, deferring instead to the isr_eesave routine. Otherwise, isr_eeupdate compares a setpoint value in RAM with its image in EEPROM (step 1304). If the values are identical, the routine increments pointers (step 1316) to the setpoint to be checked the next time the routine runs. If the values differ, the routine erases the byte in EEPROM (step 1306) and, before exiting, sets the PGM-CYC flagbit (step 1308). The next time the routine executes, 16 ms later, it checks the PGM-CYC bit and programs the setpoint byte in RAM into EEPROM (step 1310). The pointers are incremented (step 1312) and the PGM-CYC flag bit cleared (step 1314) before the routine ends. In this way the setpoint image in EEPROM is kept up-to-date.

Figure 14A:
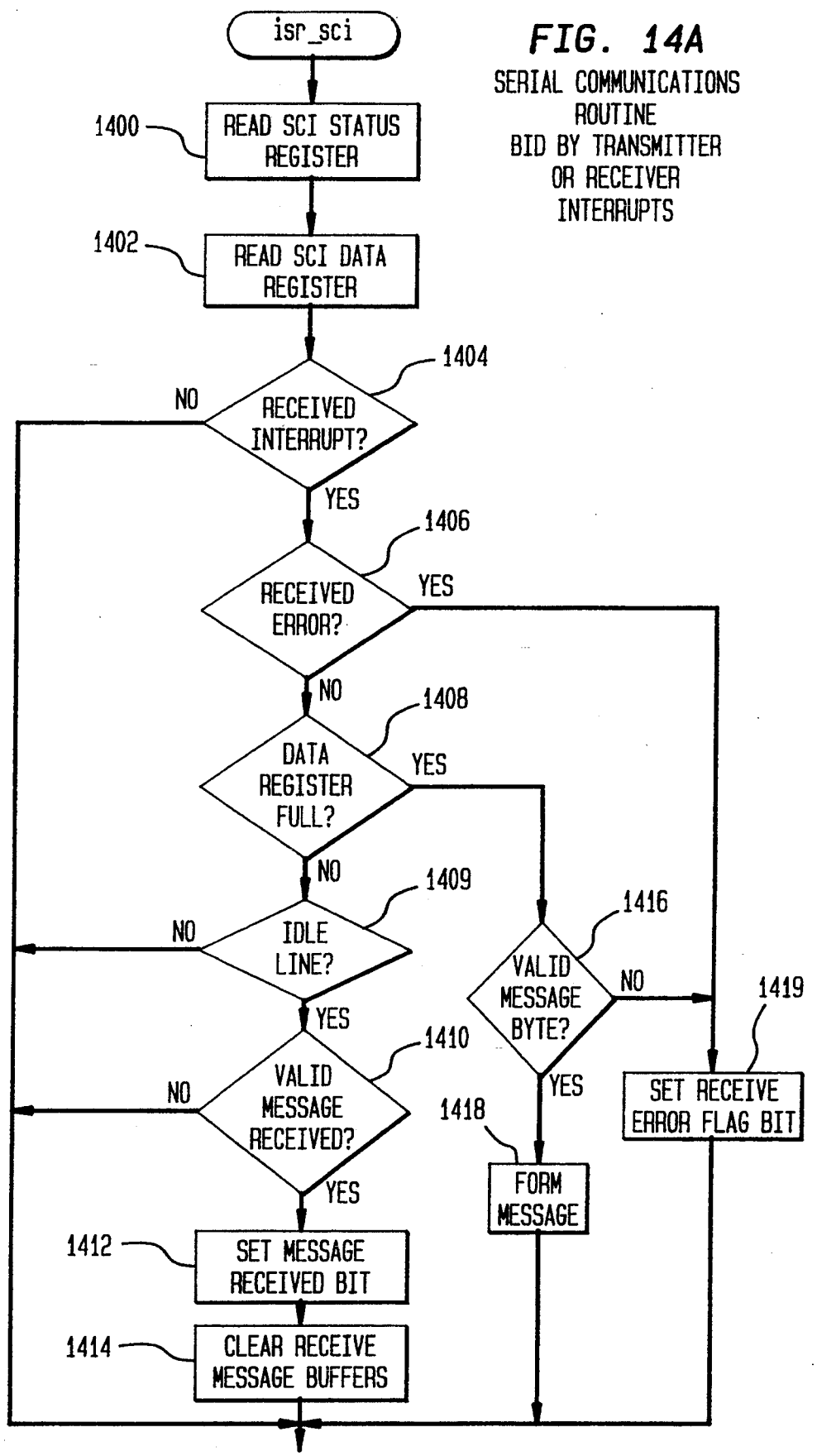
Figure 14B:
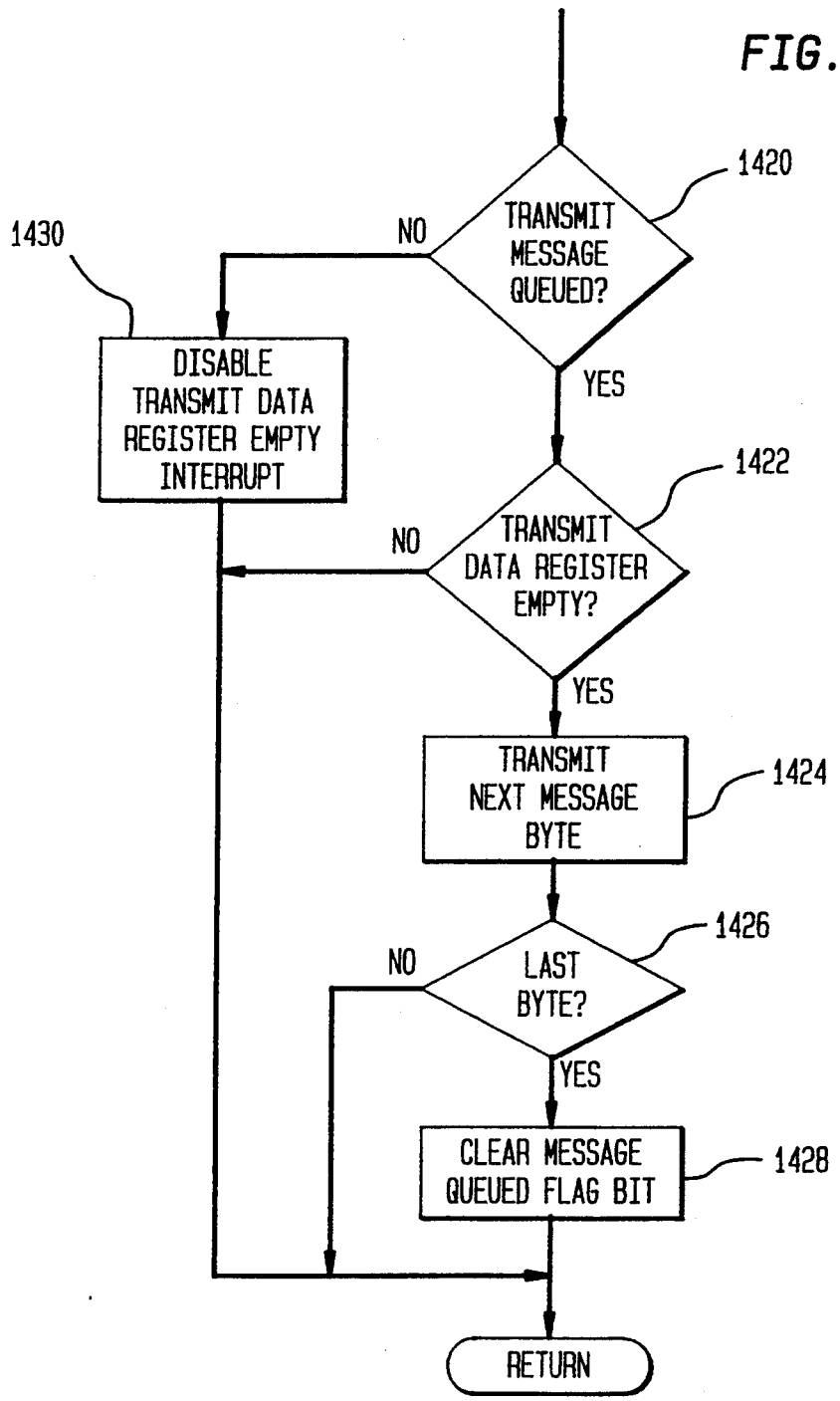

Serial communication between microcomputer 123 and external communications device 125 is controlled by the SCI interrupt routine isr_sci. The routine, shown in the flowchart in FIG. 14, handles both incoming and outgoing transmissions. An interrupt is generated, vectoring execution to isr_sci, under the following conditions: transmit data register empty (step 1422), receive data register full (step 1408), or if the receiver line is idle (step 1409). The SCI routine determines which source caused the interrupt and responds accordingly. The routine first reads and saves the status of the SCI status register SCSR (step 1400), which contains the source of the interrupt, and the contents of the SCI data register SCDR (step 1402), which contains the most recent byte received.

After saving the status and the data, isr_sci checks to see if the interrupt source is the receiver (step 1404). Sources of receiver interrupts are receive data register full, indicating a byte has been received, and receiver idle, a logic high on the receive line for at least ten bit times. If a byte has been received, isr_sci processes the byte to see if it forms part of a valid message (step 1416). If so, the byte is combined with other consecutively received bytes to form a message (step 1418). When an error (step 1406) or an invalid message byte is received, the error flag bit is set (step 1419). When an idle line (step 1409) causes the interrupt, which occurs at the completion of a received message, the previously received message bytes are processed. If the message is a valid message (step 1410), a flag bit corresponding to the received message is set (step 1412), indicating to the message processing task in the background which message to process. Subsequently, the receive message buffers are cleared (step 1414).

If the source of the interrupt is the transmitter, indicating that the transmit data register is empty and ready for another byte to be transmitted (step 1420), isr_sci writes the next byte to the transmit data register. In sending out a message, the SCI routine formats the message selected by the message processing task. After determining the byte to be transmitted next, isr_sci writes it to the data register SCDR from which the SCI automatically transmits it (step 1424). Upon completion of the message transmission (step 1426), the transmit line goes to the idle state and the message queued flag bit is cleared (step 1428). When the transmit message is not queued, a disable transmit data register empty interrupt occurs (step 1430). The SCI baud rate for both transmission and reception is set in the initialization task.

Although shown connected as an across-the-line starter in FIG. 1, the motor controller of the preferred embodiment can be connected and programmed for many starter applications, including across-the-line reversing, two-speed, and reduced-voltage. The only differences from one starter application to another are in the assignment and labeling of local and remote inputs and status indicators, the number and connection of remote contacts, and the program code implementing the Boolean logic equations. Some inputs and status indicators are common to such a majority of applications that their functions are fixed. Table 2 illustrates the input and the output assignments for four different starter applications:

A. Local 3-wire, remote 2-wire, across-the-line.
B. Local/remote 3-wire, across-the-line reversing.
C. Local 2-wire, two-speed.
D. Remote 3-wire, reduced voltage.
Device references are to FIG. 3.

3. LED3—PHASE UNBALANCE (indicates a load current imbalance of over 40% or, when flashing, of between 20% and 40%)
4. LED4—OVERLOAD TRIP (indicates that the motor was tripped off because of an overload condition)
5. LED5—INCOMPLETE SEQUENCE TRIP (indicates that the motor was tripped off because of an incomplete starting sequence)
6. LED6—IMPENDING TRIP (flashes to indicate that the load current is between 100% and 110% of the overload current setting; stays on to indicate the load current is greater than 110% of the setting)
7. LED7—GENERAL FAULT (indicates redundantly a CPU FAULT, an EXTERNAL TRIP, an

TABLE 2

| DEVICE SYMBOL | APPLICATION | | | |
|---|---|---|---|---|
| | A | B | C | D |
| LOCAL INPUT | | | | |
| PB1 | STOP | STOP | OFF | |
| PB2 | START | FWD | LOW | |
| PB3 | | REV | HIGH | |
| PB4 | HAND | | | |
| PB5 | OFF | | | |
| PB6 | AUTO | | | |
| PB7 | TEST/RESET | TEST/RESET | TEST/RESET | TEST/RESET |
| REMOTE INPUT | | | | |
| AC1 | START CONTACT | STOP PB | LOW CONTACT | STOP PB |
| AC2 | | FWD PB | HIGH CONTACT | START PB |
| AC3 | | REV PB | | EXIT TRIP CONTACT |
| AC4 | | | | RUN SEAL-IN CONTACT |
| COIL DRIVER | | | | |
| OUT1 | START | FWD | LOW | START |
| OUT2 | | REV | HIGH | RUN |
| OUT3 | | | | |
| LED | | | | |
| LED1 | CPU FAULT | CPU FAULT | CPU FAULT | CPU FAULT |
| LED2 | EXT TRIP | EXT TRIP | EXT TRIP | EXT TRIP |
| LED3 | PHASE UNBALANCE | PHASE UNBALANCE | PHASE UNBALANCE | PHASE UNBALANCE |
| LED4 | OVERLOAD TRIP | OVERLOAD TRIP | OVERLOAD TRIP | OVERLOAD TRIP |
| LED5 | INCOMPLETE SEQUENCE | INCOMPLETE SEQUENCE | INCOMPLETE SEQUENCE | INCOMPLETE SEQUENCE |
| LED6 | IMPENDING TRIP | IMPENDING TRIP | IMPENDING TRIP | IMPENDING TRIP |
| LED7 | GENERAL FAULT | GENERAL FAULT | GENERAL FAULT | GENERAL FAULT |
| LED8 | AUTO | | | AUTO |
| LED9 | OFF | | | |
| LED10 | HAND | HAND | HAND | |
| LED11 | READY | READY | READY | READY |
| LED12 | | REV | HIGH | |
| LED13 | RUN | FWD | LOW | RUN |
| LED14 | STOPPED | STOPPED | STOPPED | STOPPED |

Two of the inputs and nine of the outputs listed in Table 2 are dedicated to the assigned functions and may not be reassigned. The dedicated inputs are PB1, which is always the STOP or OFF button, and PB7, which is always the TEST/RESET button. The dedicated outputs are the following LEDs:

1. LED1—CPU FAULT (indicates a processor fault)
2. LED2—EXTERNAL TRIP (indicates an external fault signal sent from a remote device over one of the AC inputs)

OVERLOAD TRIP, or an INCOMPLETE SEQUENCE TRIP)
8. LED11—READY (indicates the presence of control power)
9. LED14—STOPPED (indicates the motor is not energized)

Of the LED outputs, only LED2 (EXTERNAL TRIP) and LED14 (STOPPED) are controlled by the solution of Boolean logic equations. The states of the other dedicated LEDs are determined by various conditions not related to the selected starter application. The state of each of the undedicated output devices (the three coil drivers and LED8–13) and dedicated LEDs LED2 and LED14 is determined by the solution of a Boolean logic equation whose terms are other inputs and outputs. Certain timing functions, such as the two externally settable timers and the transition and incomplete sequence timers for reduced-voltage starters, can be included in the logic equations. The program code implementing the logic equations for the selected application is stored in the microcomputer's EEPROM, tailoring the control to the selected application. The sets of logic equations for the starter assignments of Table 3 are part of an expandable library of logic equations representing many applications.

Although the various motor starter applications have been described herein as being represented by Boolean logic equations, it should be recognized that the use of other representations, such as ladder diagrams, are contemplated. In fact, the Boolean equations in the library are usually derived from the ladder diagrams of the various applications. If an application changes, the corresponding logic equations can be transmitted to the microcomputer from external communications device 125. No internal wiring changes are required. Of course, any relabeling of input nomenclature or reconnection of remote contactors required by the new application must be done. Each set of logic equations in the library has a unique control circuit number for purposes of identification. The number can be displayed on the set/display device 119 with function F21 in Table 1.

The two externally settable timers may be assigned specific functions for a given application. Two examples are an on-delay for the staggered starting of a series of motors and a delay to prevent switching from forward to reverse, and vice versa, without giving the motor a chance to slow. Because the functions of the timers are programmed as part of the code implementing the logic equations, the functions may change with the application. The timers are set with the set/display device's timer functions, F7 and F25 in Table 1.

Because many of the dedicated functions, such as those associated with the overload relay, can be disabled, the control is adaptable through the logic equations to non-motor applications, such as slide-valves. To handle applications requiring more inputs and outputs than shown in the circuit diagram of FIG. 3, additional output latches and drivers and input buffers, along with the necessary supporting circuitry and interconnection terminals, can be added.

In reduced-voltage starters, a motor is started by connecting the motor terminals through a contractor to a voltage less than the line voltage. As the motor reaches operating speed, another contractor is closed, connecting the motor terminals to full line voltage for running. Typically, the transition from reduced to full voltage is controlled by a timer that starts to time when the start command is given. Because plant electricians set the timer through trial and error, variations in settings are often due more to variations in electricians than to variations in motor characteristics. The availability of a measure of the load current makes possible a smooth, intelligent transition based on the motor's operating status, instead of on guesswork.

The transition from starting to running is best made when the starting current drops to the full-load current value. The logic equations for reduced-voltage starters, in conjunction with code in the A–D conversion routine (isr_ad), perform intelligent reduced-voltage starting. When a start command is given, the logic equation code starts one of the long-term timers, setting it to time out in 150% of the locked-rotor time. (Locked-rotor times for motors of various sizes are stored in a table in ROM.) Meanwhile, the A–D routine, which is continuously computing the load current, disables the timer and sets the timeout flag if the current drops to the full-load current setpoint value, asset, for example, by function F2 (see Table 1) of the set/display device 119. The logic equation code then detects the timeout flag and initiates the transition. If, however, the current does not drop to the full-load current value, the timer times out in the preset time of 150% of the locked-rotor time, at which time the logic equation code will initiate the transition. Once the transition command is given, the logic equation code starts the one-second incomplete sequence timer and, if the seal-in contact closure is not detected before the timer times out, sets the IS flag bit to illuminate the INCOMPLETE SEQUENCE LED and stop the motor. In this way, a smooth transition is achieved.

MOTOR PROTECTION

In addition to the motor control functions discussed above, the motor control unit is configured to provide overload current protection, short circuit protection, and ground fault protection based upon various motor protection calculations (step 510) suitable to protect motor 101 from these conditions. These protective functions are provided by the motor control unit hardware (discussed above), operating in conjunction with the operating program (discussed above), and the motor protection routines (discussed below).

Figure 20:
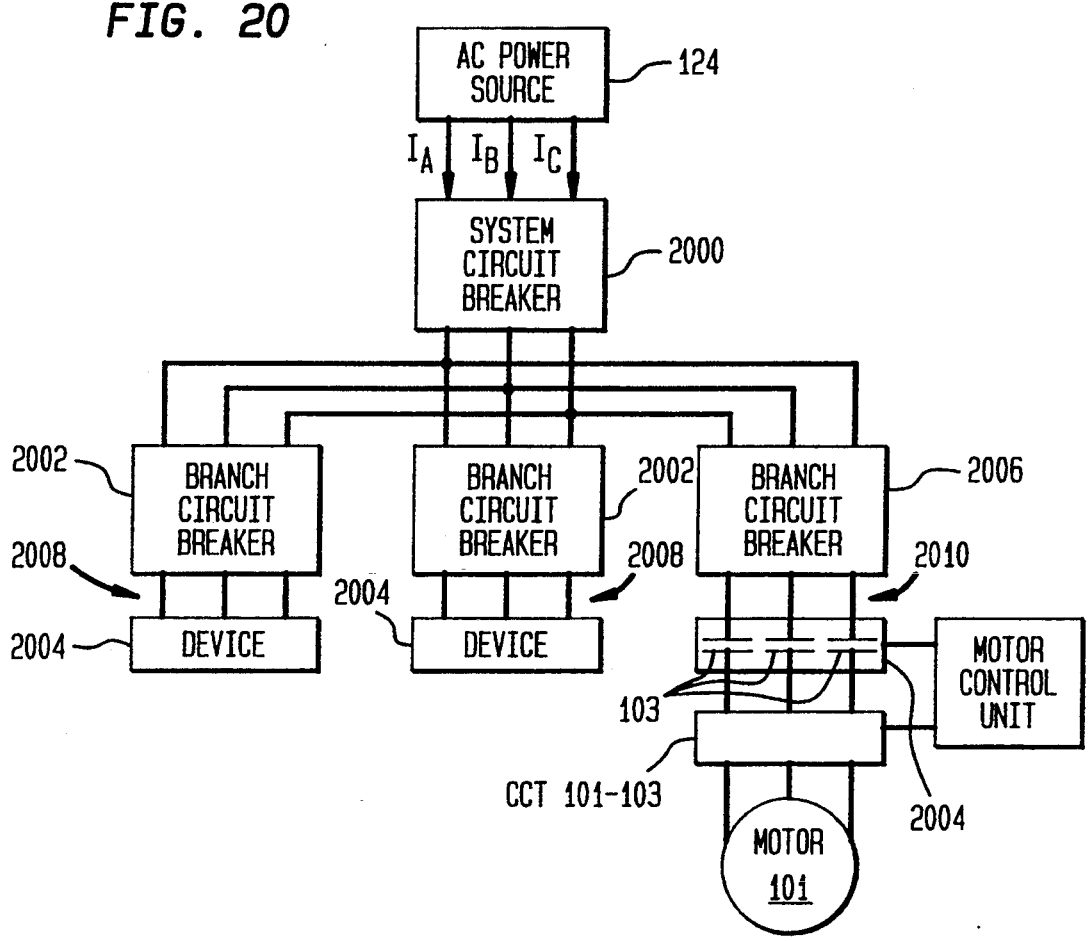
FIG. 20 is a block diagram representing a power distributing management including a motor control system.

FIG. 20 generally illustrates a circuit arrangement for a three phase power system including an AC power source 124 including system circuit breaker 2000, a plurality of branch circuit breakers 2002, the motor controller unit, motor 101, contactors 103, and a plurality of other electrical devices 2004. The circuit breaker 2000 protects all three phases (IA, IB, IC) of the main system wiring extending from circuit breaker 2000 to branch circuit breakers 2002, 2006. Circuit breaker 2000 performs this function by providing circuit interruption for all three phases $I_A$, $I_B$, and $I_C$ when a predetermined level overload, short circuit or ground fault current occurs.

Since circuit breaker 2000 protects the system circuitry, circuit breaker 2000 will trip for a condition such as ground fault, but it may be very difficult to determine which device caused the ground fault without checking all branch circuit breakers 2002, 2006. Additionally, all of the devices on the respective circuit will be inoperative until the ground fault is corrected.

Branch circuit breakers 2002 protects the branch circuits 2008 from short circuit and overload currents, whereas circuit breaker 2006 only protects circuit 2010 from short circuit currents. For purposes of protecting circuit 2010 from short circuit currents, the National Electric Code (NEC) requires that circuit breaker 2006, or a circuit breaker/contactor arrangement, to provide instantaneous circuit interruption at current levels no higher that 13 times the full load current (Iflc) of motor 101.

The motor control unit and contactors 103 of the preferred embodiment are arranged to protect circuit 2010 and motor 101 from overload, short circuit and ground fault currents as discussed below. Overload and short circuit protection are provided by the combination of the motor model simulation routine (FIGS.

18A–18E), the intermediate motor current protection routine (FIG. 21) and a short circuit protection device such as a circuit breaker or fuse. Ground fault protection is provided by the ground fault interrupt routine (FIG. 22). (The details of each of these three routines are discussed in detail below.)

As discussed above, the routine isr_ad (FIG. 7) runs every 5.8 ms so that all of the four channels (0–3) are sampled every 5.8 ms. Accordingly, isr-ad updates the RMS current values ($I_A$, $I_B$, $I_C$) and the RMS ground fault current ($I_{GFI}$) value based upon 60 samples of each channel every 350 ms (60 samples*5.8 ms per 4 channel samples).

MOTOR MODEL SIMULATION ROUTINE

The preferred embodiment of the motor model simulation routine (illustrated in the flowcharts of FIGS. 18A–18E) provides motor protection between 0 and 10 times Iflc, but this range may be varied depending upon the specific application. The basis of the simulation routine is a motor model which can be digitally simulated and defined in the program which is executed by microprocessor 123 of the motor controller. Based only upon time and digital representations of the RMS values of the load currents in the phases of motor 123, the digital simulation of the motor permits microprocessor 123 to provide output such that the motor controller will control contacts 103 of contactor 130 in accordance with the status of the motor.

The purpose of the motor model is to provide an estimation of the following values:

the temperature of a motor's windings;
a change in the temperature of the motor's windings with respect to time;
the temperature of the motor's housing; and
a change in the temperature of the motor's housing with respect to time.

These values are based upon the actual motor current and changes in the actual motor current with respect to time. The values are then compared with acceptable ranges for the values so that microprocessor 123 can initiate an appropriate action if a particular value falls outside of its acceptable range.

Figure 15:
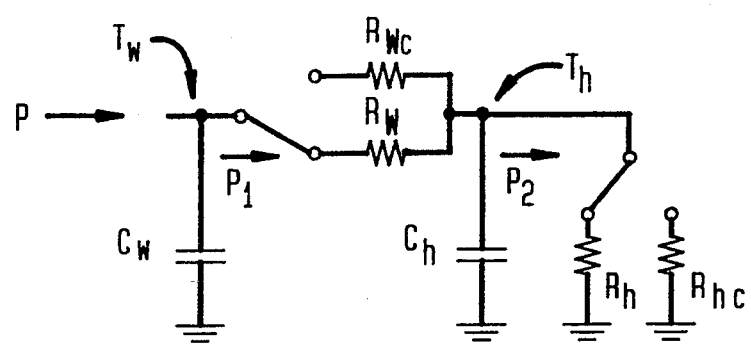
FIGS. 15 and 19 are representations of the motor model.

The motor model is based upon a thermal model analogous to the two-capacitor, four-resistor circuit illustrated in FIG. 15. The values of the two capacitors Cw and Ch are analogous to the thermal capacities of the motor windings and the motor housing; the values of the four resistors Rw, Rwc, Rh and Rhc are analogous to the thermal resistance between the windings and the housing and between the housing and the environment; the voltages Tw and Th across the capacitors are analogous to the winding and housing temperatures; and the current P applied to the circuit is analogous to the rate of energy delivered to the motor.

More specifically, Rw is analogous to the winding thermal resistance during a rise in winding temperature, Rh is analogous to the housing thermal resistance during a rise in housing temperature, Rwc is analogous to the thermal resistance of the winding during a decline in winding temperature, and Rhc is analogous to the thermal resistance of the housing during a decline in housing temperature. The values of the various elements depend on empirical motor data and motor nameplate data. Unlike the method of protection employed by overload relays, the motor model is general enough to protect many different sizes and classes of motors, while being flexible enough to provide customized protection for each motor.

The input P to the model is a function of the largest of the RMS current values calculated for the motor phases. P is related to the largest of the RMS current values ($I_A$, $I_B$, $I_C$) and the rated full load current of the motor ($_{flc}$). For Iratios (I/$I_{flc}$) between 0 and 1.1, P is equal to Iratio; for Iratios between 1.1 and 1.6, P is based upon Table 3 below; and for Iratios above 1.6 P is equal to Iratio².

TABLE 3

| NEMA MOTOR SIZE | HP | Iflc (AMPS) | SIZE | Iint (AMPS) | Itrp (AMPS) | 10* Iflc | Itrp/ Irlc | Inrush (AMPS) |
|---|---|---|---|---|---|---|---|---|
| 1 | 0.25 | 0.48 | 1A | 340 | 300 | 4.8 | 625.00 | 6.54 |
|   | 0.33 | 0.583 | 1A | 340 | 300 | 5.8 | 517.24 | 7.90 |
|   | 0.5 | 1.16 | 1A | 340 | 300 | 11.6 | 258.62 | 15.80 |
|   | 0.75 | 1.4 | 1B | 340 | 300 | 14.4 | 208.33 | 20.50 |
|   | 1 | 1.5 | 1B | 340 | 300 | 15 | 200.00 | 21.90 |
|   | 1.5 | 2.0 | 1B | 340 | 300 | 20 | 150.00 | 24.50 |
|   | 2 | 2.8 | 1B | 340 | 300 | 28 | 107.14 | 36.20 |
|   | 3 | 3.6 | 1B | 340 | 300 | 36 | 83.33 | 51.90 |
|   | 5 | 6.0 | 1C | 340 | 300 | 60 | 50.00 | 73.20 |
|   | 7.5 | 8.9 | 1C | 340 | 300 | 89 | 33.71 | 119.80 |
|   | 10 | 11.9 | 1C | 340 | 300 | 119 | 25.21 | 146.70 |
| 2 | 15 | 17.5 | 2A | 550 | 495 | 175 | 28.29 | 219.70 |
|   | 20 | 22.7 | 2A | 550 | 495 | 227 | 21.81 | 256.50 |
|   | 25 | 28.2 | 2A | 550 | 495 | 282 | 17.55 | 335.90 |
| 3 | 30 | 33.5 | 3 | 800 | 712 | 335 | 21.25 | 426.30 |
|   | 40 | 44.4 | 3 | 800 | 712 | 444 | 16.04 | 607.50 |
|   | 50 | 55.7 | 3 | 1800 | 1600 | 557 | 28.73 | 698.50 |
| 4 | 60 | 65.0 | 4 | 1800 | 1600 | 650 | 24.62 | 940.60 |
|   | 75 | 81.2 | 4 | 1800 | 1600 | 812 | 19.70 | 1078 |
|   | 100 | 112 | 4 | 4000 | 3600 | 1120 | 32.14 | 1564 |
| 5 | 125 | 138 | 5 | 4000 | 3600 | 1380 | 26.09 | 1861 |
|   | 150 | 165 | 5 | 4000 | 3600 | 1650 | 21.82 | 2109 |
|   | 200 | 217 | 5 | 4000 | 3600 | 2170 | 16.59 | 2979 |
|   | 350 | 269 | 6 | 5400 | 4750 | 2690 | 17.66 | 3493 |
|   | 300 | 328 | 6 | 5400 | 4750 | 3280 | 14.480 | 5082 |

By way of example, 80° C. has been recognized as an appropriate and safe operating temperature (Tw) for almost all motor windings having class B insulation and 50° C. has been chosen as a reference operating temperature for motor housing (Th). These temperature are relative to ambient temperature. For these steady state temperatures Tw, Th, it can be seen from the model that Rw is 30° C./W and Rh is 50° C./W.

The transient solution of the motor model circuit for heating involves the solution of the following equations:

$$(T_{W(t)}/T_0 = (T_{W0}/T_0) + ((P/P_0) - (P_1/P_0))*dt/(C_W/C_0) \tag{1}$$

$$(P_{1(t)}/P_0) = ((T_W/T_0) - (T_h/T_0))/R_W/R_0) \tag{2}$$

$$(T_{h(t)}/T_0) = (h_0/T_0) + ((P_1/P_0) - (P_2/P_0)*dt/C_h/C_0 \tag{3}$$

$$(P_{2(t)}/P_0) = (T_h/T_0)/(R_h/R_0) \tag{4}$$

Figure 16:
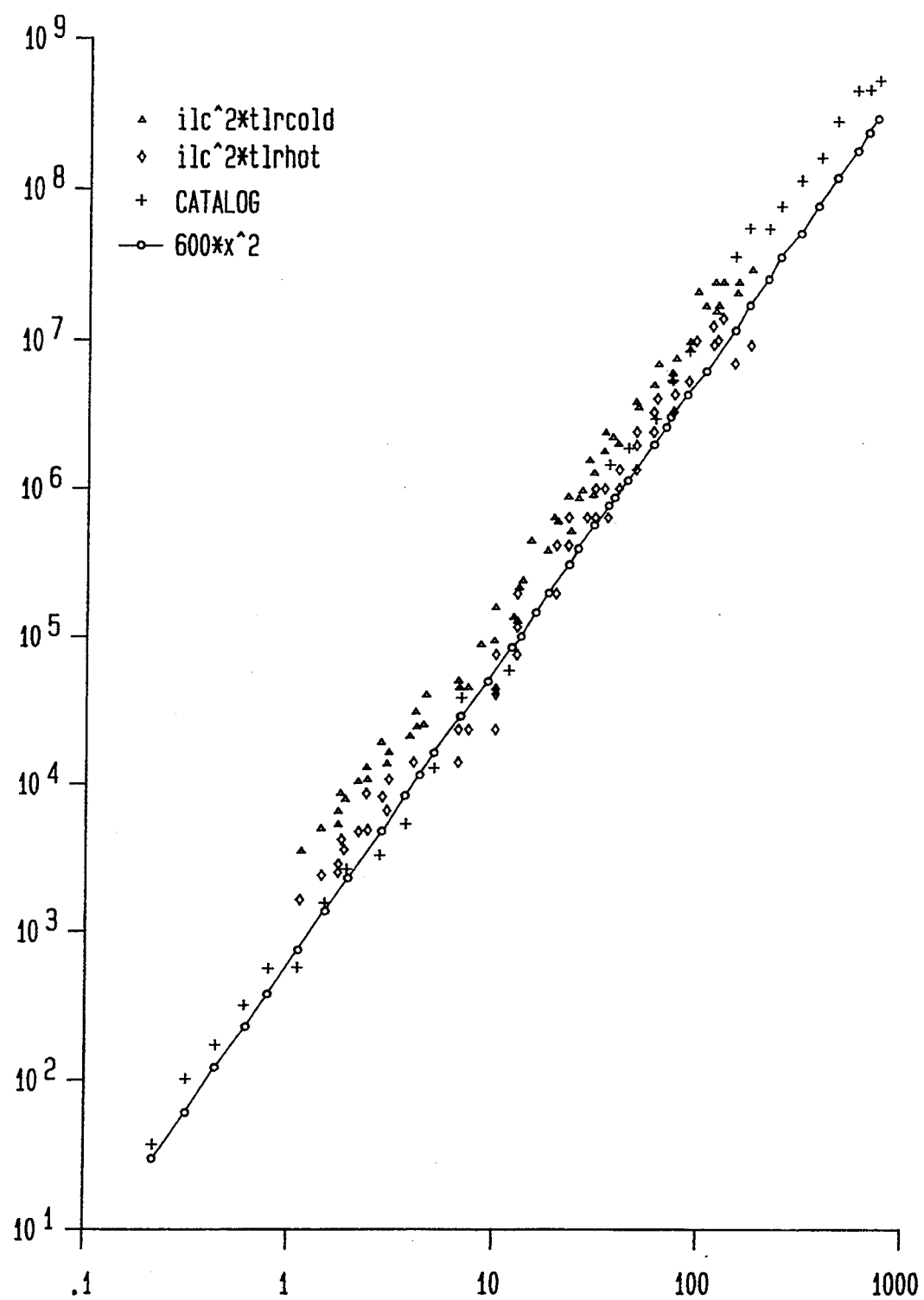

For the presently preferred embodiment of the motor model, the value for $C_w$ was derived from empirical motor data for 2, 4, 6 and 8 pole motors from 0.3 amps to 540 amps. From an analysis of the motor data the relationship illustrated in FIG. 16 was derived. From FIG. 16 it can be seen that the product of the square of the starting current (Ist$^2$) which is substantially the same as the square of the locked rotor current (Ilr$^2$) and the time it takes for a motor winding temperature to rise 140° C. from ambient temperature with its rotor locked (Tlr) are related to the motor full load current Ifl. Class B insulation for motor windings is rated to withstand 180° C. above an ambient temperature of 40° C. The temperature rise of 140° C. was chosen as a basis for the Tlr time since it offers a 25% safety factor with respect to the rated insulation temperature of 185° C.

For purposes of determining Tlr, it is assumed that the starting current (Ist) for an idle motor is six (6) times its rated full load current. For example, for a motor with a rated full load current (Iflc) of 10 amps, the starting current (Ist) for the idle motor would be 60 amps. By referencing FIG. 16 using Iflc of 10 amps and Ilr of 60 amps (Ilr=Ist), Tlr can be determined. From FIG. 16 Ilr$^2$ * Tlr is about $9 \times 10^4$ amp seconds for a cold motor. Based upon this, Tlr is calculated as 25 seconds (($9 \times 10^4$ amp-seconds$^2$)/60$^2$ seconds$^2$).

The 25 second Tlr time corresponds to the time it takes for the winding temperatures of the motors tested, and similar motors, to rise 140° C. with a locked rotor. For purposes of a safety factor, the 25 second time was reduced by 20% to 20 seconds.

Based upon the 20 second time constant and the observation that the starting current for a motor (Ist) is approximately six times the value of the full load current Ifl, the value of Cw for the model is calculated as 5.14 w sec/°C. (Cw=(Iratio)$^2 \times$ Tlr/temperature rise; for Iratio=6, Tlr=20, and temperature rise=140°, Cw=$36 \times 20/140$=5.14 w sec./°C.).

The value for Ch is derived from FIG. 17. FIG. 17 illustrates the observed time constants for motor housings (tc). As illustrated, the time constants for the motor housings are related to the full load current of the motor. This relationship is approximated by the following function:

$$tc = 7 + 53(1 - e^{-0.01Ifl})$$

From this relationship the value of Ch can be obtained by dividing tc by Rh, to obtain the following relationship:

$$Ch = [1/Rh]*[7 + 53(1 - e^{-0.01Ifl})]$$

The values of Rhc and Rwc depend on the actual observed time constant of a motor. In the present preferred embodiment of the motor model, Rhc is estimated as 3 times the value of Rh, and Rwc is estimated as 3 times the value of Rw. These estimates are based upon actual data.

Upon establishing the parameters for the motor model, the motor model can be implemented in the form of a program which is executable by microprocessor 123 of the motor controller unit. The implementation of the motor model is described below in reference to FIGS. 18A-18E.

Figure 18A:
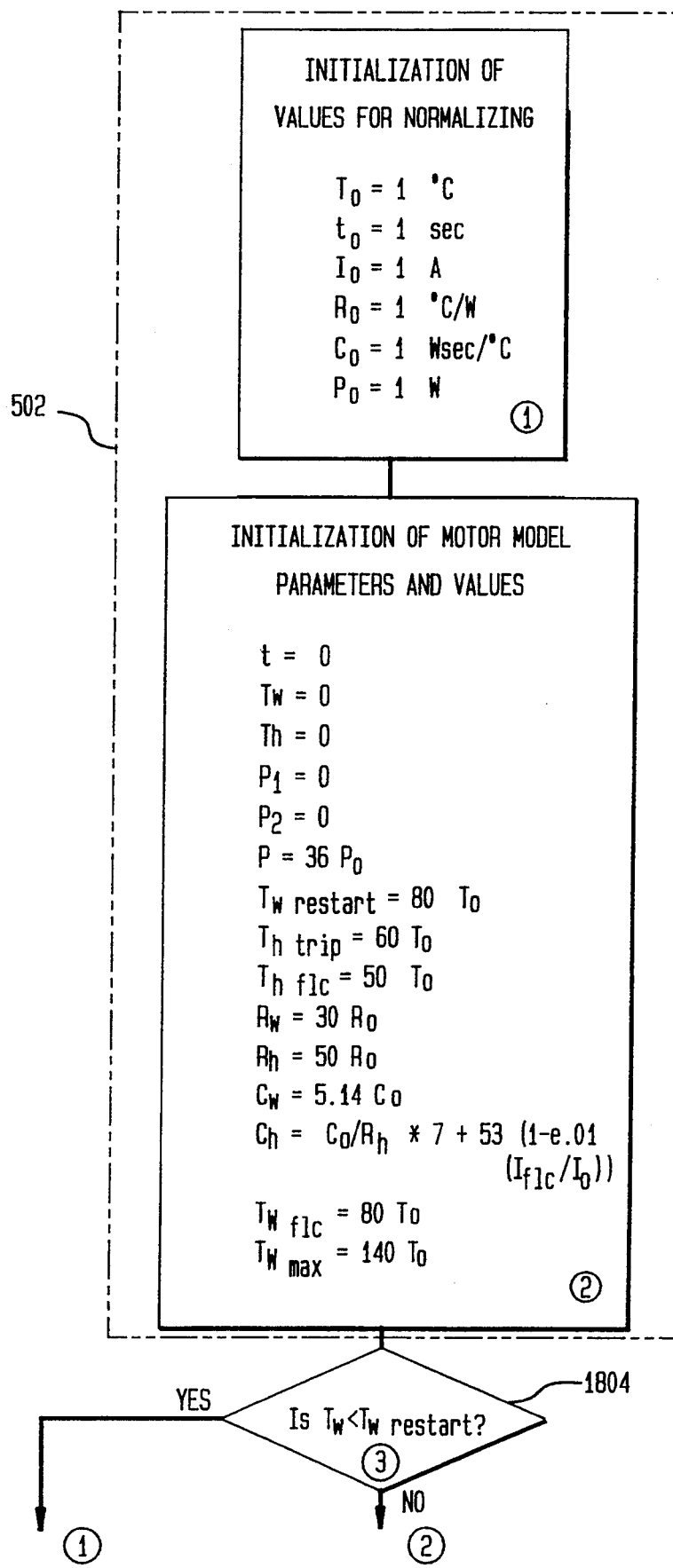
FIG. 18A-18E are flow charts illustrating the implementation of the motor model.
Figure 18B:
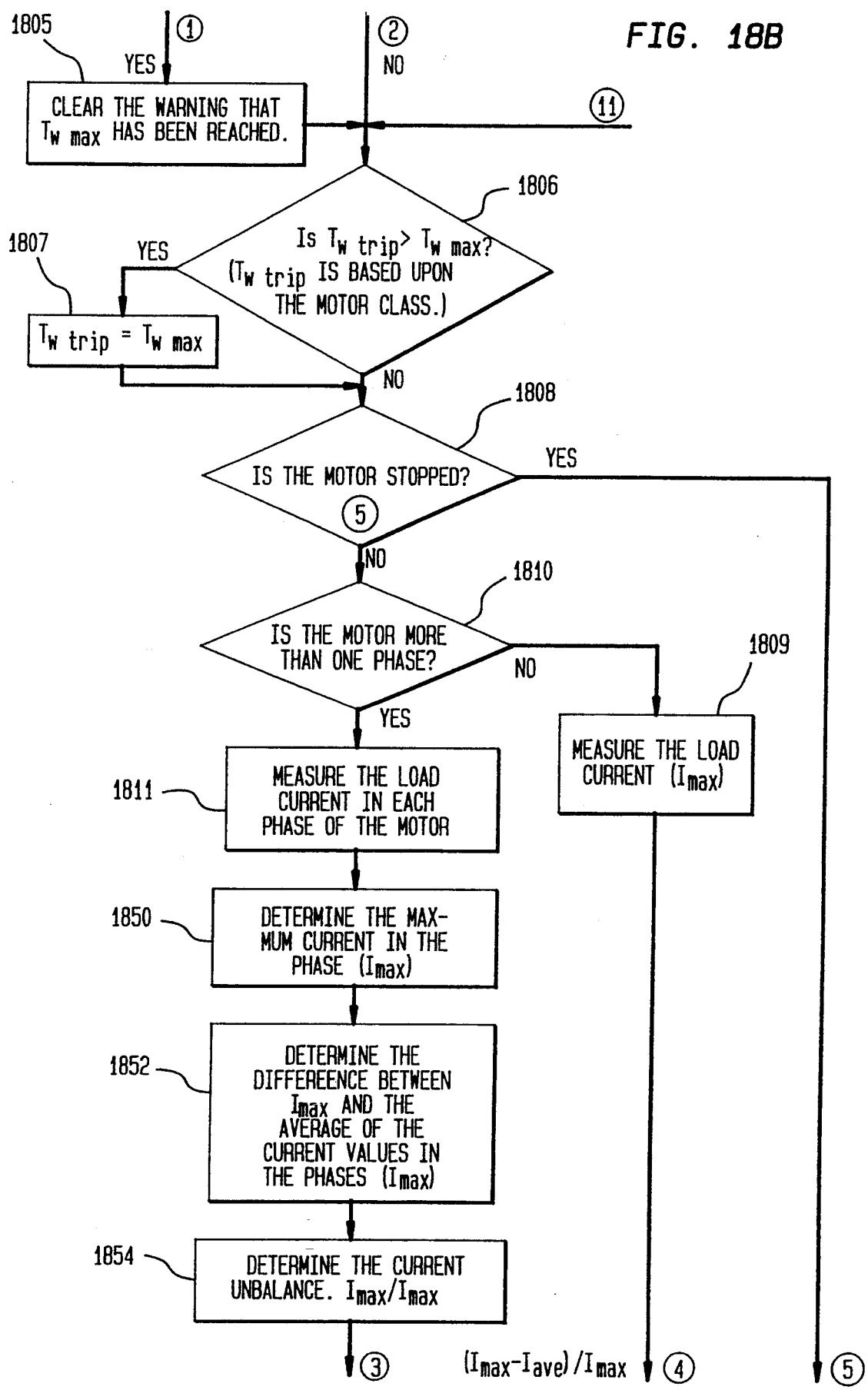
Figure 18C:
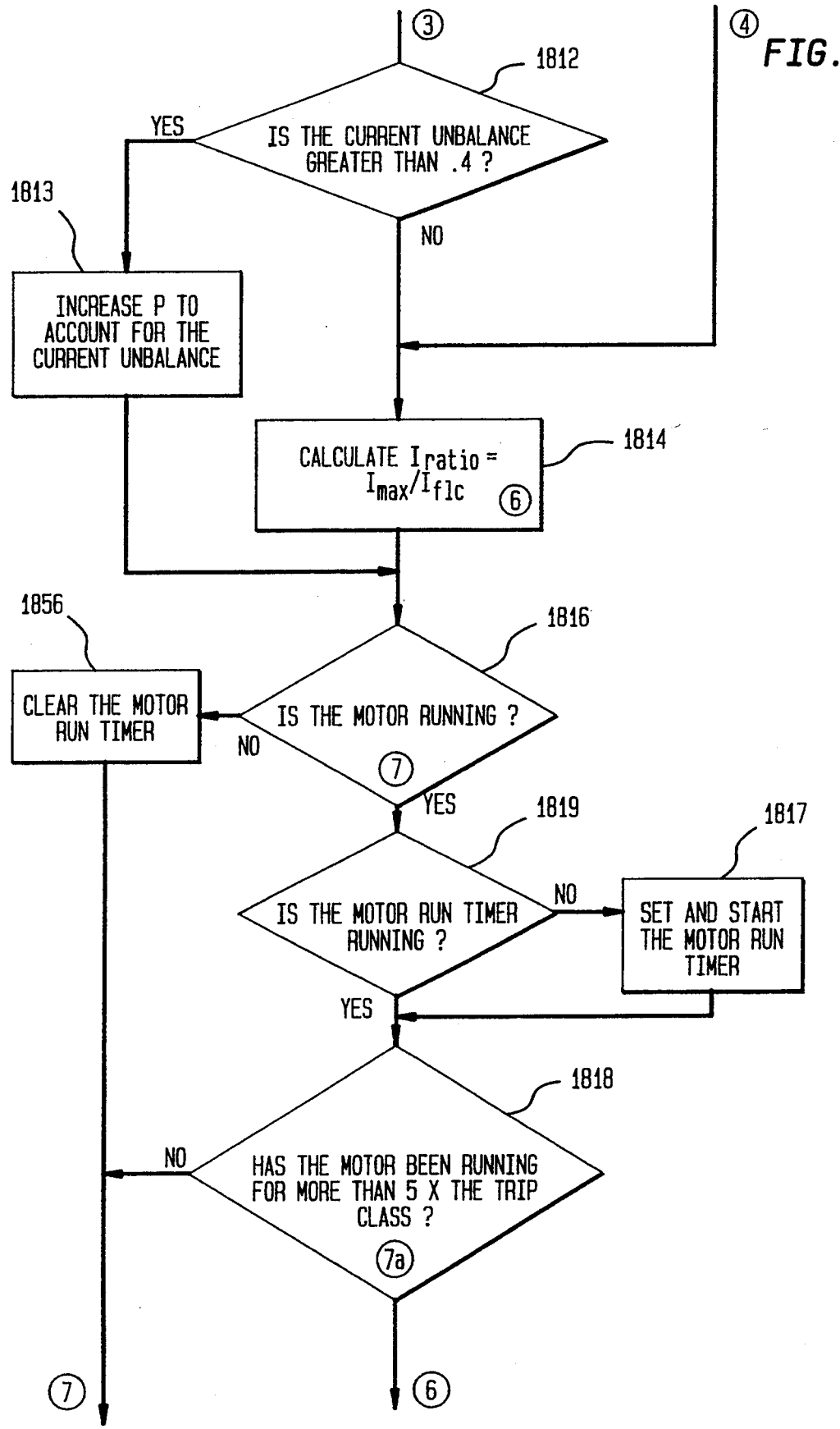

In FIG. 18A the step of initializing (step 502) normalizing values and parameters is shown since the motor model operation is based in part on these values. These values allow the equations used for the motor model to be manipulated in a unit-less form. The time (t), the winding temperature (Tw), the housing temperature (Th), and the values of P$_1$ and P$_2$ (initial values used to solve the model equations) are set to 0.

Twrestart is set at 80 T$_0$. Twrestart is compared to the value of the winding temperature (Tw) calculated based on the motor model (step 1800). When Twmax is exceeded by Tw, the motor controller will not allow the motor to be restarted as long as Tw is greater than Twstart unless an override command is provided.

Thtrip is set at 60 T$_0$. Thtrip is compared to the value of housing temperature (Th) calculated. When Th is greater than Thtrip, the motor controller will stop the motor.

The values of Rw, Th, Cw and Ch are discussed above and are set as shown.

Thflc and Twflc are set at 50 T$_0$ and 80 T$_0$ respectively. These values can be used to adjust the motor full load current (Iflc) from the motor's name plate data. This adjustment is made since the full load current Iflc on the data plate of a motor may not be the same as the actual Iflc of the motor. To make the adjustment, the program defining the motor model can adjust Iflc such that the temperature of the housing Th equals Thflc and the temperature of the winding Tw equals Twflc when the motor is running at steady state under normal conditions.

In step 1804, the winding temperature (Tw) is compared to Twstart. If Tw is less than Twstart, the warning that the maximum winding temperature (Twmax) has been reached is cleared (step 1805). If Tw is greater than Twstart the warning remains and prevents the motor from starting.

In step 1806, the temperature limit of the winding for tripping (Twtrip) is redefined. If Twtrip, based upon the motor class, is greater than Twmax, Twtrip is set to Twmax (step 1807) to provide greater protection for the motor. If Twtrip, based upon the motor class is less than Twmax, Twtrip is not changed.

If the motor is not stopped (step 1808), the motor current is measured (steps 1809 and 1811) and the current unbalance for the motor is determined if the motor is multi-phase (step 1810). If the current unbalance is greater than 0.4 (step 1812), P is increased to account for the current unbalance (step 1813).

To determine current unbalance, the maximum phase current is determined (step 1850), the difference between the maximum phase current ($I_{MAX}$) and the average phase current ($I_{AVE}$) is calculated (step 1852), and the current unbalance is calculated by dividing the difference by the maximum phase current (step 1854).

In step 1814, the ratio (Iratio) of the motor load current (Imax) and the full load current Iflc of the motor is calculated. Subsequent to calculating I$_{ratio}$, the intermediate motor current protection routine (FIG. 21) may be incorporated. Where this routine is incorporated, steps 2102, 2104 and 2106 are eliminated.

Figure 18D:
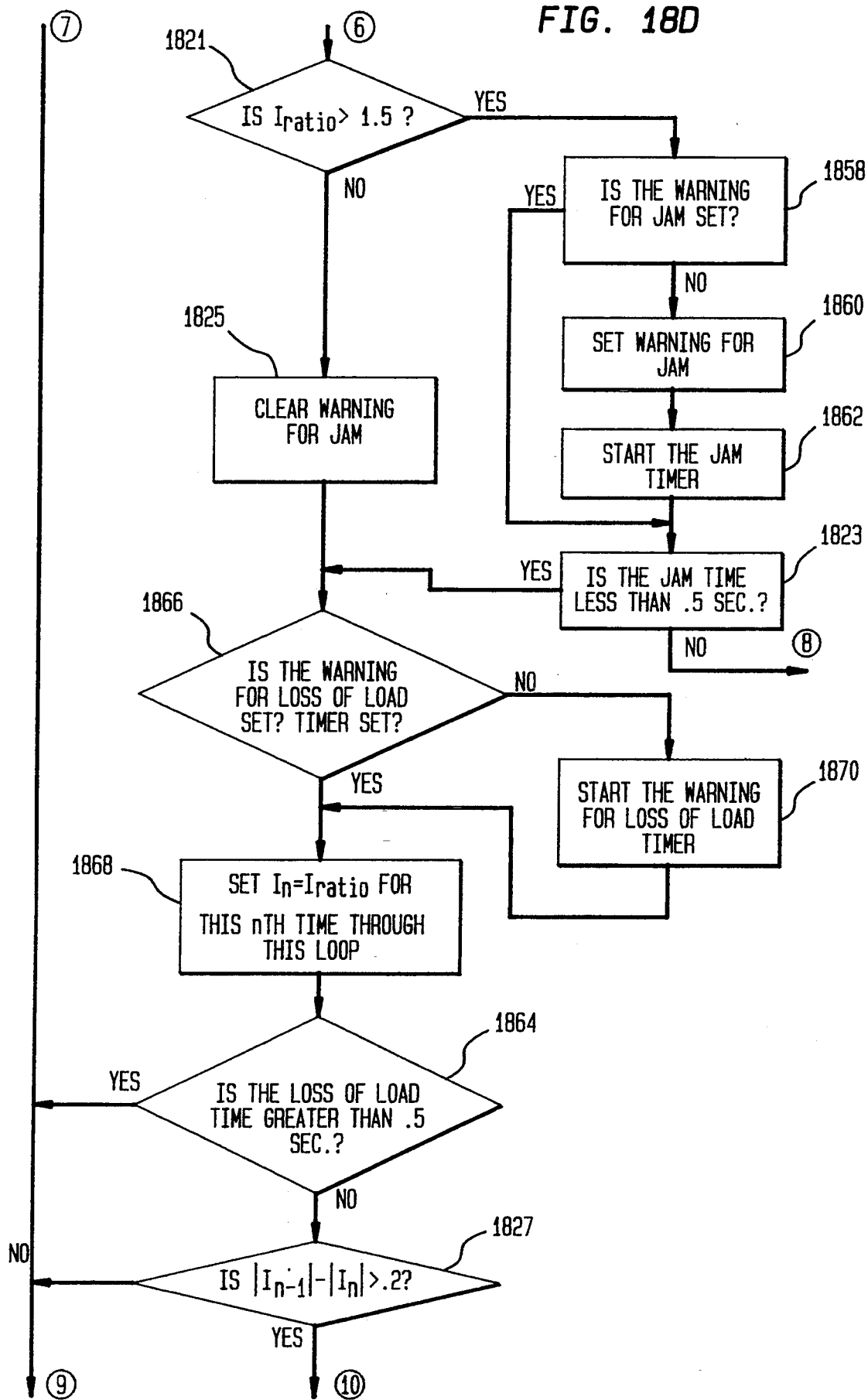
Figure 18E:
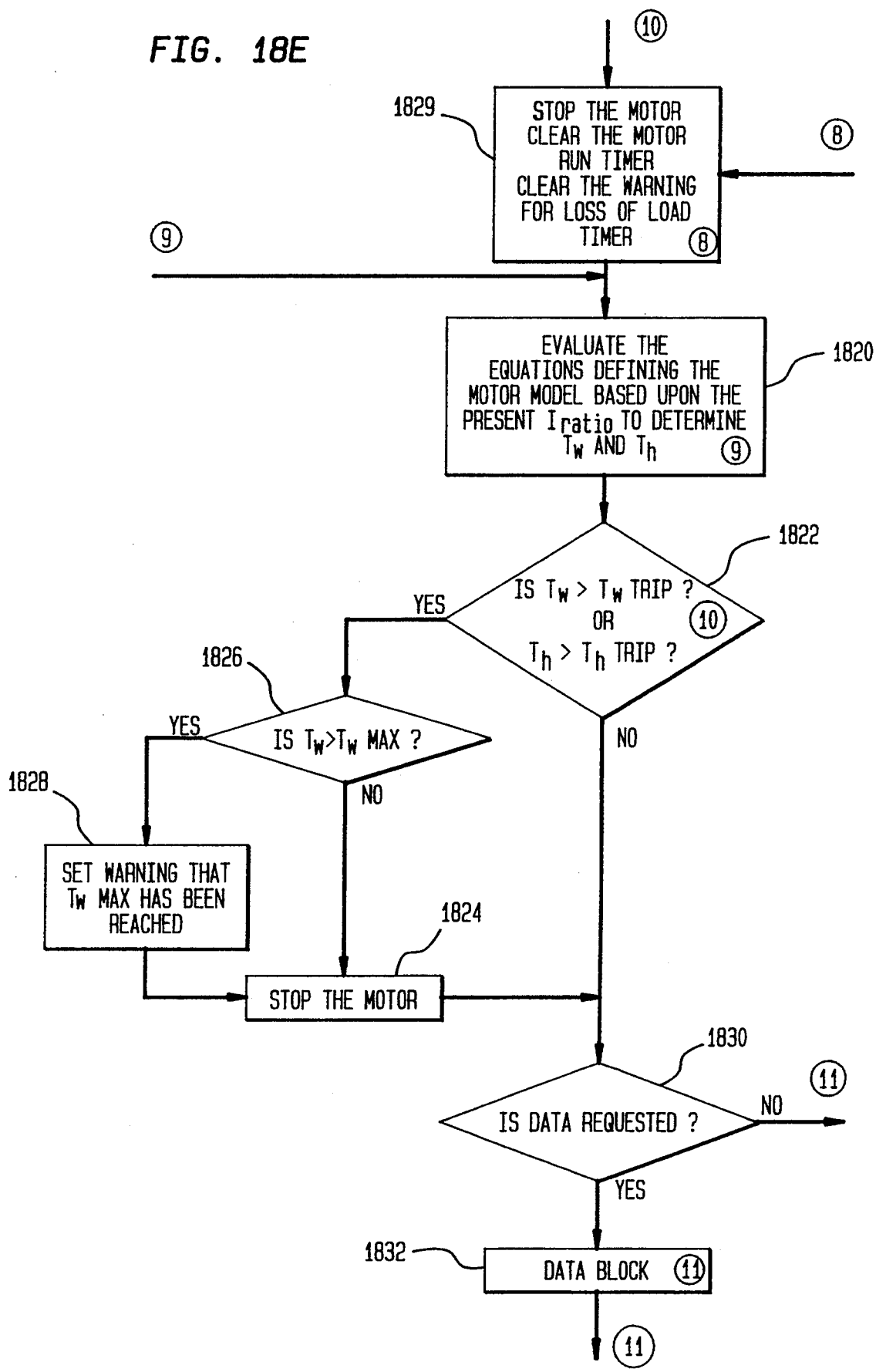

In step 1816 the status of the motor is again checked to determine whether or not the motor is running. If the motor is not running, the motor run timer is cleared (step 1856). If the motor is running, a motor run timer is set and started (step 1817) if the timer is not already running (step 1819). In step 1818, the running time for the motor is checked, and if the running time is less than 5 times the trip class of the motor, the jam protection and loss of load protection logic of FIG. 18D is bypassed. If the running time is greater than 5 times the trip class, the jam protection and loss of load protection loops are entered.

Jam protection occurs when Iratio is above 1.5 and less than 10 (step 1821), otherwise the jam warning is cleared (step 1825). When Iratio is greater than 1.5 and the jam warning is not set (step 1858), the warning for jam timers are set (steps 1860 and 1862). When the warning for loss of load flag and timer are set (step 1866), I equals Iratio is set for the nth current loop (step 1868). If the answer at step is no, the warning for loss of load timer is started (step 1870). The jam protection operates so that when the motor has been operating at Iratio 1.5 for more than 0.5 seconds, the motor stops (step 1823). The loss of load protection is set up so that the motor is stopped if the change for Iratio is more than 0.2 for a 0.5 second time period (steps 1824 and 1827).

If either a loss of load or jam condition exists, the motor is stopped, the motor run timer is cleared, and the warning for loss of load timer is cleared (step 1829). If neither a loss of load nor jam condition exists, step 1829 is skipped.

Step 1820 is the basis of the motor model, since it is at this stage that the equations defining the motor model are solved to determine Tw and Th. At step 1822, Tw and Th are compared to the limits for the winding temperature and the housing temperature (Twtrip and Thtrip). If either of the limits are exceeded the motor is stopped (step 1824) after Tw is checked against the maximum winding temperature Twmax (step 1826) and the warning that Twmax was reached is set if appropriate (step 1828).

When data is requested (step 1830), a data block can be set up (step 1832) so that when the motor controller is accessed with a display device, data such as the following can be displayed:
 average motor current;
 motor current at tripping;
 time before the motor can be restarted;
 total elapsed motor running time;
 total number of motor starts; and
 total number of overload trips.

From step 1822 the monitoring process is restarting back to step 1806.

Another embodiment of the motor model is based upon a thermal model analogous to the two-capacitor, four resistor electric circuit illustrated in FIG. 19. For this model, the values used for Tw, Th, Cw, Ch, Rw, Rwc, Rh and Rhc are the same as in the model of the preferred embodiment. The difference in the models is found tin the calculation of P and equations used to solve the model.

In this embodiment of the model, for Iratio between 0 and 1.05 P equals Iratio and for Iratio greater than 1.05 P equals (Iratio)$^2$. To solve the model the following equations are used in block 10 to determine Tw and Th:

$$\frac{Tw(t)}{To} = (Two/To) + \frac{((P/Po) - (P1/Po))}{(Cw/Co)} * dt$$

$$\frac{P1(1)}{Po} = \frac{((Tw/To) - (k12\ Th/To))}{(Rw/Ro)}$$

$$\frac{PP(t)}{Po} = \frac{((k2\ Tw/to) - (TH/To))}{(Rw/Ro)}$$

$$\frac{TH(t)}{To} = (THo/To) + \frac{((PP/To) - (P2/To))}{(CH/To)} * dt$$

$$\frac{(P2(1)}{To} = \frac{(TH/To)}{(RH/Ro)}$$

The constants k1 and k2 are calculated such that the motor model can be adjusted to more accurately model a given motor.

Where the average of the ratio (Iratio) of the maximum phase current (Imax) and the rated full load current (Iflc) of the motor is greater than 10 for 60 samples, the overload programming is set up to immediately stop the motor. At step 1824 a running total of Iratios for 60 samples of the motor currents ($I_A$, $I_B$, $I_C$) is maintained. When this total is complete for 60 samples the total is divided by 60 to obtain the average Iration. The average Iratio is compared to 10, and if greater 10, the program jumps to step 1826 where the command to stop the motor is issued.

INTERMEDIATE MOTOR CURRENT PROTECTION ROUTINE

The preferred embodiment of the intermediate motor current protection routine (illustrated in the flowchart of FIG. 21) provides motor protection between 7 times Iflc and the instantaneous trip setting of circuit breaker 2006 which may be between 11 and over 500 times Iflc. The range of protection provided by the protection routine will depend upon the specific application as further discussed below. (As discussed above, this routine can be modified and incorporated into the motor model simulation routine.)

Referring to FIG. 21, the first step of the protection routine is to read the full load current ($I_{FLC}$) for motor 101 (step 2102). In the next step, step 2104, each of the RMS values representative of the three phase current's ($I_A, I_B, I_C$) are determined, and the greatest of these values is set as $I_{MAX}$. In step 2106, a ratio ($I_{RATIO}$) is calculated as the ratio of $I_{MAX}$ and $I_{FLC}$. $I_{RATIO}$ is then compared with the value 7, or another limit value depending upon the specific motor protection application (Step 2108). If $I_{RATIO}$ is less than the limit value, then the protection routine terminates and returns. If $I_{RATIO}$ is greater than the limit value, then contacts 103 are opened (step 2112) and the overload/instantaneous trip LED (LED4) is turned on (step 2114), and the protection routine returns.

As discussed above, sampling of $I_A$, $I_B$ and $I_C$ takes place every 5.85 ms and thus the detection of Iratios over 10 will take about 350 ms (60×5.85 ms), since 60 samples of $I_A$, $I_B$, and $I_C$ are used to determine the RMS values of $I_A$, $I_B$, and $I_C$. In other words, detection would take about 21 cycles of 60 Hz line current.

At Step 2110, $I_{RATIO}$ is shown as being compared in a decision box having a phantom outline against a second limit value $I_{LIMIT}$. Where $I_{RATIO}$ is greater than $I_{LIMIT}$, the operation of opening circuit breaker 2006

(step 2111) is shown as occurring in a phantom operation box. The purpose of illustrating the phantom decision step 2110 and the phantom operation step 2111, is to show that for $I_{RATIOS}$ greater $I_{LIMIT}$, the circuit breaker 2006 will open before the motor control unit has a chance to open contacts 103.

Typically, circuit breaker 2006 will provide an instantaneous (magnetic) trip and open within 8.3 ms (2/60 Hz) or ½ of a cycle, whereas, the motor control unit will take approximately 350 microseconds to open contacts 103. Accordingly, a motor control unit will open contacts 103 long after circuit breaker 2006 has opened the circuit leading to motor 101. An advantage of providing intermediate motor current protection using the motor control unit for protection between $I_{RATIOS}$ from 10 to 500, instead of circuit breaker 2006, is to avoid spurious or nuisance tripping of circuit breaker 2006 during motor starting.

For high efficiency motors, the starting currents encountered upon motor starting within the first 8.3 ms of starting (½ cycle) can instantaneously go above 10 times $I_{FLC}$ of a motor and may reach 17 times $I_{FLC}$. Accordingly, if circuit breaker 2006 is used for motor protection between $I_{RATIOS}$ of 7 and 13, as required by the National Electrical Code, the situation will occur where circuit breaker 2006 will open before a high efficiency motor has a chance to start and the high starting currents have a chance to subside.

In operation, the instantaneous trip protection provided by the intermediate motor current protection routine eliminates the problem of nuisance tripping which frequently occurs upon the starting of high efficiency motors. In addition, this protection routine insures that a gap in tripping potential does not exist as in the situation where the operation of the motor contactor only protects to 10 times $I_{FLC}$ and the instantaneous trip limit of the circuit breaker protecting the motor has been set above 10 times $I_{FLC}$ to avoid nuisance tripping. This situation produces a gap in tripping potential between 10 times $I_{FLC}$ and the instantaneous trip limit of the circuit breaker.

When used with the motor controller, and a circuit breaker with a fixed instantaneous (magnetic) trip limit above that for nuisance tripping, the protection routine allows avoidance of nuisance tripping without producing a gap in tripping potential.

By way of example only, Table 4 below illustrates a number exemplary ranges over which the protection routine could be modified to protect. Table 4 is directed to 460 volt applications with energy efficient motors. (HP=motor horsepower; Iflc=motor full load current; TYPE=Siemens contactor type; Iint=rated interrupting current of the contactor; and Itrp=instantaneous (magnetic) trip setting of the circuit breaker.)

TABLE 4

| NEMA MOTOR SIZE | HP | Iflc (AMPS) | SIZE | Iint (AMPS) | Itrp (AMPS) | 10* Iflc | Itrp/Iflc |
|---|---|---|---|---|---|---|---|
| 1 | 0.25 | 0.48 | 1A | 280 | 255 | 4.8 | 531.25 |
|   | 0.33 | 0.583 | 1A | 280 | 255 | 5.8 | 439.66 |
|   | 0.5 | 1 | 1A | 280 | 255 | 10 | 255.00 |
|   | 0.75 | 1.4 | 1B | 280 | 255 | 14 | 182.14 |
|   | 1 | 1.8 | 1B | 280 | 255 | 18 | 141.67 |
|   | 1.5 | 2.6 | 1B | 280 | 255 | 26 | 98.08 |
|   | 2 | 3.4 | 1B | 280 | 255 | 34 | 75.00 |
|   | 3 | 4.8 | 1B | 280 | 255 | 48 | 53.13 |
|   | 5 | 7.6 | 1C | 280 | 255 | 76 | 33.55 |
|   | 7.5 | 11 | 1C | 280 | 255 | 110 | 23.18 |
|   | 10 | 14 | 1C | 280 | 255 | 140 | 18.21 |
| 2 | 15 | 21 | 2A | 500 | 440 | 210 | 20.95 |
|   | 20 | 27 | 2A | 500 | 440 | 270 | 16.30 |
|   | 25 | 34 | 2A | 500 | 440 | 340 | 12.94 |
| 3 | 30 | 40 | 3 | 800 | 730 | 400 | 18.25 |
|   | 40 | 52 | 3 | 800 | 730 | 520 | 14.04 |
|   | 50 | 65 | 3 | 800 | 730 | 650 | 11.23 |
| 4 | 60 | 77 | 4 | 1700 | 1530 | 770 | 19.87 |
|   | 75 | 96 | 4 | 1700 | 1530 | 960 | 15.94 |
|   | 100 | 124 | 4 | 1700 | 1530 | 1240 | 12.34 |
| 5 | 125 | 156 | 5 | 4000 | 3600 | 1560 | 23.08 |
|   | 150 | 180 | 5 | 4000 | 3600 | 1800 | 20.00 |
|   | 200 | 240 | 5 | 4000 | 3600 | 2400 | 15.00 |

Referring to table 4, for the control of a 30 HP motor having a rated full load current ($I_{FLC}$) of 40 amps, the motor control unit could be used with a Nema size 3 contactor and a 125 amp circuit breaker having a fixed instantaneous (magnetic) trip limit of 730 amps. A Nema-size 3 contactor has the ability to carry 90 amps of continuous current and the ability to interrupt a maximum of 800 amps. For this arrangement, the maximum current interruption capability of the contactor is 70 amps above that of the instantaneous trip of the circuit breaker. Thus, the circuit breaker will always open before a maximum current interrupting limit (800 amps) is reached for the contactor.

Referring back to FIG. 21, to have $I_{RATIOS}$ greater than 10, one of the phase currents ($I_A$, $I_B$, $I_C$) would be greater than 400 amps (40×10). Referring to step 2110, $I_{LIMIT}$ would be 18.25 (730 amps/40 amps). Accordingly, the motor would be protected from currents ranging between 0 and 400 amps by the motor control unit via the motor model simulation routine, between 400 and 730 amps by the motor control unit via the intermediate motor current protection routine, and above 730 amps, by the instantaneous trip limit of the circuit breaker.

In addition to eliminating gaps in tripping potential, the use of the intermediate motor current protection routine can reduce the number of contactor and circuit breaker combinations required to protect a given range of motor sizes. For example, for NEMA class 1 motors (0.25-10 HP), only 3 contactor sizes (1A, 1B, 1C) and 1 circuit breaker size are required to protect the range of motor sizes in NEMA class 1.

Another problem the intermediate motor protection routine can reduce is that of tripping accuracy. When used with the motor controller, the protection routine typically provides a higher level of tripping accuracy than standard electromechanical trip units. For example, tripping accuracy may be reduced from ±20% to ±5%.

GROUND FAULT INTERRUPT ROUTINE

As discussed above, the ground fault protection function of the motor control unit can be enabled and disabled using the function F12, depending upon the particular application of the motor control unit. When enabled, ground fault protection will cause contactor 105 to open contacts 103 in the event of a ground fault; when disabled, display LCD1 will display a notice that a ground fault condition exists, but will not cause contactor 105 to open contacts 103.

One embodiment of the ground fault interrupt routine is illustrated in the flowchart of FIG. 22. The first step of the routine is to increment a counter (COUNT) by one (step 2201A). In step 2202A $I_{GFI}$ is read and used in step 2204A to calculate a running average of the RMS ground fault interrupt current $I_{GFI-AVE}$. $I_{GFI-AVE}$ is calculated by averaging the current $I_{GFI}$ and the previously calculated $I_{GFI-AVE}$ (step 2204A). When the count is 22 (step 2206A), $I_{GFI-AVE}$ is compared with $I_{GFI-LIMIT}$, which in the preferred embodiment is 3 milliamps, and COUNT is set to zero (step 2207A).

For $I_{GFI-AVE}$ greater than $I_{GFI-LIMIT}$ (step 2208A), the ground fault interrupt LED (LED 102) is flashed ON and OFF (step 2210A), a ground fault interrupt message is provided at the LCD (step 2210A), and contactor 105 opens contacts 103 (step 2213A) if the ground fault interrupt is enabled (step 2212A). At the end of the routine, a return (step 2216A) is made to the background loop.

During the initialization task (step 502), COUNT, $I_{GFI}$, $I_{GFI-AVE}$, and $I_{GFI-LIMIT}$ are set to zero. Referring back to step 2206A, a count of 22 is required before any action is taken by the motor control unit. The purpose of this is to avoid spurious tripping during motor operation if a single $I_{GFI}$, which is based upon 60 readings of channel 3 of the A/D converter, indicates that there is a ground fault. In the preferred embodiment, it has been determined that the average of 3 $I_{GFI}$ values tends to eliminate spurious tripping. Accordingly, if $I_{GFI}$ is updated every 350 ms (3 $I_{GFI}$ updates in 1050 ms) and the interrupt routine is run about every 50 ms, the interrupt routine must be run at least 22 times (1100 ms) to ensure $I_{GFI}$ is updated at least 3 times for purposes of calculating $I_{GFI-AVE}$ (step 2204A).

Figure 22B:
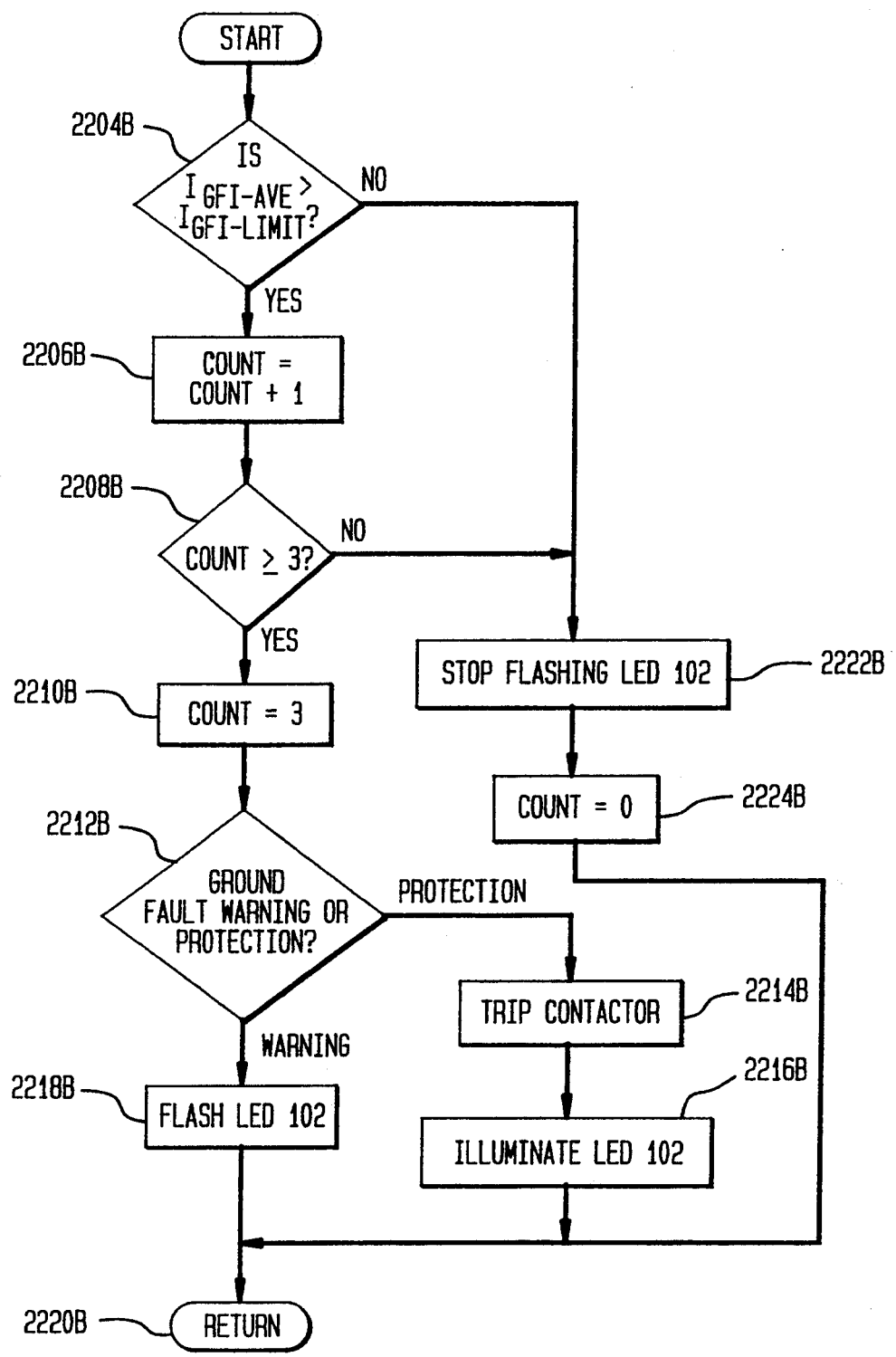
FIG. 22B is a flow chart illustrating a second implementation of the ground fault protection scheme.

Another embodiment of the ground fault detection routine is illustrated in the flow chart of FIG. 22B. The routine runs every 350 ms upon the computation of a new averaged ground fault current value $I_{GFI-AVE}$ by the A/D interrupt routine.

The first step of the ground fault detection routine compares the ground fault current value $I_{GFI-AVE}$ to the pickup current (step 2204B), or ground fault limit value $I_{GFI-LIMIT}$. In a preferred embodiment, the pickup current is a function of the overload class, but could also be a function of other parameters, such as motor rating and/or contactor size. If $I_{GFI-AVE}$ current exceeds $I_{GFI-LIMIT}$, execution proceeds to step 2206B where COUNT is compared to 3.

If the count is less than 3, the flashing of LED102 is stopped (step 2222B), COUNT is set to zero (step 2224B), and the ground fault detection routine is exited at RETURN step 2220B. If the count is 3 or greater, indicating that $I_{GFI-AVE}$ exceeded $I_{GFI-LIMIT}$ for at least three consecutive measurement periods, or three times 350 ms (1050 ms), a ground fault condition is determined to exist.

The use of three consecutive ground fault detections is one way of avoiding false detections due to noise. It should be appreciated that values other than three could be used, depending on the noise level and system requirements. Other filtering techniques could also be used effectively.

If $I_{GFI-AVE}$ exceeds the $I_{GFI-LIMIT}$ pickup level, the count is limited to three to prevent the counter from overflowing (step 2210B). Next it is determined whether ground fault protection or warning has been selected through control function F12 (step 2212B). If protection is selected, contactor 105 trips, contacts 103 open and the motor is disconnected from power (step 2214B). The ground fault (LED102) is then illuminated (step 2216B). Other action which could be taken might include the display of a message on the LCD. The routine is then exited at step 2220B. If, on the other hand, ground fault warning is selected, LED102 is set to flash off and on (step 2218B) before the routine is exited. With warning selected, the motor is not disconnected.

If the ground fault condition subsides, i.e., $I_{GFI-AVE}$ is less than $I_{GFI-LIMIT}$, execution from step 2204B proceeds to step 2222B, which stops the flashing of the ground fault LED (LED102). If the LED was not flashing, step 2222B has no effect. The counter (COUNT) is reset to zero in step 2224B before the routine is exited at step 2220B.

While one embodiment of a motor controller and several modifications thereof have been shown and described in detail herein, various other changes and modifications may be made without departing from the scope of the present invention. For example, the motor controller can be used with a single phase motor coupled to a power source by neutral and power electrical conductors. Additionally, the motor controller may be used with a two-phase motor.

We claim:

1. A method for sensing a ground fault in a motor control system including a motor coupled to at least two conductors, the method comprising the steps of:
   generating a first unrectified signal indicative of the current level in a first conductor;
   generating a second unrectified signal indicative of the current level in a second conductor;
   summing the first and second unrectified signals to generate an unrectified sum signal indicative of the sum of the current levels;
   rectifying the sum signal to produce a rectified sum signal and data representative thereof;
   comparing the data to a predetermined limit; and
   generating indicia of a ground fault in response to the data exceeding the predetermined limit for more than a predetermined time period.

2. The method of claim 1, further comprising the step of disengaging the motor from the conductors in response to the generation of indicia of ground fault.

3. The method of claim 2, further comprising the steps of:
   rectifying the first unrectified signal;
   rectifying the second unrectified signal;
   determining the greater of the first and second rectified signals;

comparing the greater rectified signal to a designated trip limit;

generating a trip signal upon the greater rectified signal exceeding the trip limit; and disengaging the motor from the conductors in response to the generation of a trip signal.

4. The method of claim 2, further comprising the steps of:

rectifying the first unrectified signal;

rectifying the second unrectified signal;

comparing the rectified first and second signals to a designated trip limit;

generating a trip signal upon the first rectified signal exceeding the trip limit;

generating a trip signal upon the second rectified signal exceeding the trip limit; and disengaging the motor from the conductors in response to the generation of a trip signal.

5. An apparatus for sensing a ground fault in a motor control system, the apparatus comprising:

means for generating a first unrectified signal indicative of the current level in a first conductor coupled to the motor;

means for generating a second unrectified signal indicative of the current level in a second conductor coupled to the motor;

means for summing the first and second unrectified signals to generate an unrectified sum signal indicative of the sum of the current levels;

means for rectifying the sum signal to produce a rectified sum signal;

means for generating data representative of the rectified sum signal;

means for comparing the data representative of the rectified sum signal to a predetermined limit; and means for generating indicia of a ground fault upon the data exceeding the predetermined limit for more than a predetermined time period.

6. The apparatus of claim 5, further comprising means for disengaging the motor from the conductors in response to the generation of indicia of a ground fault.

7. The apparatus of claim 5, wherein the first conductor is a neutral conductor.

8. The apparatus of claim 5, wherein the means for generating a first unrectified signal comprises a current transformer coupled to the first conductor, and the means for generating a second unrectified signal comprises a current transformer coupled to the second conductor.

9. The apparatus of claim 5, wherein the means for rectifying the sum signal comprises a first operational amplifier and a second operational amplifier, the sum signal being applied to the non-inverting input of the first operational amplifier and the inverting input of the second operational amplifier.

10. The apparatus of claim 5, wherein the means for comparing and the means for generating comprise a microprocessor including an analog-to-digital convertor to which the sum signal is applied.

11. The apparatus of claim 6, wherein the means for disengaging comprises a contactor including a pair of contacts associated with each conductor of the system, the contactor separating the contacts of each pair of contacts in response to the generation of indicia of a ground fault.

12. The apparatus of claim 6, further comprising:

means for rectifying the first unrectified signal;

means for rectifying the second unrectified signal;

means for determining the greater of the first and second rectified signals;

means for comparing the greater rectified signal to a designated trip limit; and means for generating a trip signal upon the greater rectified signal exceeding the trip limit, wherein the means for disengaging the motor, disengages the motor from the conductors in response to the generation of a trip signal.

13. The apparatus of claim 6, further comprising:

means for rectifying the first unrectified signal;

means for rectifying the second unrectified signal;

means for comparing the rectified first and second signals to a designated trip limit;

means for generating a trip signal upon the first rectified signal exceeding the trip limit; and means for generating a trip signal upon the second rectified signal exceeding the trip limit; wherein the means for disengaging the motor, disengages the motor from the conductors in response to the generation of a trip signal.

14. A motor control for sensing a ground fault in an electric motor coupled to a three phase system, comprising:

a first current transformer disposed to generate an unrectified first voltage substantially proportional to the current level in a first phase;

a second current transformer disposed to generate an unrectified second voltage substantially proportional to the current level in a second phase;

a third current transformer disposed to generate an unrectified third voltage substantially proportional to the current level in a third phase;

means for generating, from the first, second and third unrectified signals, an unrectified sum signal indicative of the sum of the current levels;

means for rectifying the sum signal so as to produce a rectified sum signal;

means for generating data representative of the rectified sum signal;

means for storing data representative of a sum limit and data representative of a predetermined time period;

means for comparing the data representative of the rectified sum signal to the data representative of the sum; and means for generating indicia of a ground fault upon the data representative of the rectified sum signal exceeding the data representative of the sum for more than the predetermined time period as defined by the data representative of the predetermined time period;

means responsive to a control signal applied thereto, for selectively engaging and disengaging the motor from the first, second and third phases; and means, responsive to the generation of indicia of a ground fault, for applying a control signal to the means for selectively engaging.

15. The apparatus of claim 14, wherein the means for disengaging comprises a contactor including a pair of contacts associated with each phase of the system, the contactor separating the contacts of each pair in response to the control signal.

16. The apparatus of claim 14, wherein the means for rectifying the sum signal comprises a first operational amplifier and a second operational amplifier, the sum signal being applied to the non-inverting input of the first operational amplifier and the inverting input of the second operational amplifier.

17. The apparatus of claim 14, wherein the means for comparing and the means for generating comprise a microprocessor including an analog-to-digital convertor to which the sum signal is applied.

18. The apparatus of claim 14, further comprising:
means for rectifying the unrectified first voltage;
means for rectifying the unrectified second voltage;
means for rectifying the unrectified third voltage;
means for determining the greater of the rectified first, second and third voltages;
means for comparing the greater rectified voltage to a designated trip limit; and
means for generating a trip signal upon the greater rectified signal exceeding the trip limit, wherein the means for disengaging the motor, disengages the motor from the phases in response to the generation of a trip signal.

19. The apparatus of claim 14, further comprising:
means for rectifying the unrectified first voltage;
means for rectifying the unrectified second voltage;
means for rectifying the unrectified third voltage;
means for comparing the rectified first, second and third voltages to a designated trip limit;
means for generating a trip signal upon the first rectified voltage exceeding the trip limit;
means for generating a trip signal upon the second rectified voltage exceeding the trip limit; and
means for generating a trip signal upon the third rectified voltage exceeding the trip limit; wherein the means for disengaging the motor, disengages the motor from the phases in response to the generation of a trip signal.

20. An apparatus for sensing a ground fault in a motor control system, the apparatus comprising:
a plurality of current transformers, each of which is disposed to generate a signal indicative of the current level in one of a plurality of conductors;
means for generating, from the signals generated by the current transformers, a sum signal indicative of the sum of the current levels in the conductors;
a microprocessor coupled to the means for generating, the microprocessor being programmed to determine whether the sum signal falls within a range defined by at least one designated limit, the microprocessor further comprising means for storing data representative of a predetermined time period based upon a digital model of a motor being controlled by the motor control system; and
means, coupled to the microprocessor, for generating indicia of a ground fault upon the sum signal falling outside the designated limit for more than the predetermined time period as defined by the data representative thereof.

21. The apparatus of claim 20 wherein the sum signal is rectified and the microprocessor is programmed to compare the sum signal to a single designated limit.

22. The method of claim 1 further comprising the step of generalizing data representative of the root mean square value of the rectified sum signal.

23. The apparatus of claim 5 further comprising means for generating data representative of the root mean square value of the rectified sum signal.

* * * * *